(12) United States Patent
Nakajima

(10) Patent No.: US 7,457,782 B2
(45) Date of Patent: *Nov. 25, 2008

(54) ELECTRONIC SETTLEMENT SYSTEM, SETTLEMENT APPARATUS AND TERMINAL

(75) Inventor: Keiichi Nakajima, Tokyo (JP)

(73) Assignee: SOFTBANKBB Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/344,131

(22) Filed: Feb. 1, 2006

(65) Prior Publication Data

US 2006/0129504 A1    Jun. 15, 2006

Related U.S. Application Data

(63) Continuation of application No. 09/786,208, filed as application No. PCT/JP99/04178 on Aug. 2, 1999.

(51) Int. Cl.
G06F 17/60 (2006.01)

(52) U.S. Cl. .......................... 705/75; 705/72
(58) Field of Classification Search ................... 705/75, 705/72
See application file for complete search history.

(56) References Cited

U.S. PATENT DOCUMENTS

| | | | |
|---|---|---|---|
| 5,267,314 A | 11/1993 | Stambler | |
| 5,321,242 A | 6/1994 | Heath, Jr. | |
| 5,590,199 A | 12/1996 | Krajewski et al. | |
| 5,591,949 A | 1/1997 | Bernstein | |
| 5,604,802 A | 2/1997 | Holloway | |
| 5,608,778 A | 3/1997 | Partridge | |
| 5,615,110 A | 3/1997 | Wong | |
| 5,708,422 A | 1/1998 | Blonder et al. | |
| 5,715,314 A | 2/1998 | Payne et al. | |
| 5,724,424 A | 3/1998 | Gifford | |
| 5,745,886 A | 4/1998 | Rosen | |
| 5,826,241 A | 10/1998 | Stein et al. | |
| 5,883,810 A | 3/1999 | Franklin et al. | |
| 5,889,863 A | 3/1999 | Weber | |
| 5,890,137 A | 3/1999 | Koreeda | |

(Continued)

FOREIGN PATENT DOCUMENTS

EP    0935221 A2    11/1999

(Continued)

OTHER PUBLICATIONS

Payment Switches . . . Networks, 1995 IEEE 26-31(Gifford et al).

(Continued)

Primary Examiner—Pierre E Elisca
(74) Attorney, Agent, or Firm—Stroock & Stroock & Lavan LLP

(57) ABSTRACT

An electronic settlement system for settling a transaction through a communication network comprises a settlement apparatus which performs the settlement of the transaction; a billing terminal connecting to the settlement apparatus via the communication network; and a paying terminal, connecting to the settlement apparatus via the communication network, wherein the settlement apparatus performs the settlement of a transaction by synchronizing a communication to the billing terminal with a communication to the paying terminal when the settlement apparatus sets up a transaction identifying number which identifies the transaction and when the paying terminal transmits the same transaction identifying number to the settlement apparatus.

52 Claims, 45 Drawing Sheets

U.S. PATENT DOCUMENTS

| | | | |
|---|---|---|---|
| 5,899,980 | A | 5/1999 | Wilf et al. |
| 5,903,878 | A | 5/1999 | Talati et al. |
| 5,914,472 | A | 6/1999 | Foladare et al. |
| 5,924,078 | A | 7/1999 | Naftzger |
| 5,974,146 | A | 10/1999 | Randle et al. |
| 5,986,565 | A | 11/1999 | Isaka |
| 5,988,497 | A | 11/1999 | Wallace |
| 5,991,749 | A | 11/1999 | Morrill, Jr. |
| 6,038,549 | A | 3/2000 | Davis et al. |
| 6,092,202 | A | 7/2000 | Veil et al. |
| 6,128,600 | A | 10/2000 | Imamura et al. |
| 6,178,409 | B1 | 1/2001 | Weber et al. |
| 6,282,522 | B1 | 8/2001 | Davis et al. |
| 6,324,525 | B1 | 11/2001 | Kramer |
| 6,332,133 | B1 | 12/2001 | Takayama |
| 6,332,134 | B1 | 12/2001 | Foster |
| 6,332,154 | B2 | 12/2001 | Beck et al. |
| 6,366,893 | B2 | 4/2002 | Hannula et al. |
| 6,405,176 | B1 | 6/2002 | Toohey |
| 6,629,135 | B1 | 9/2003 | Ross, Jr. et al. |
| 6,796,491 | B2 | 9/2004 | Nakajima |
| 6,970,852 | B1 | 11/2005 | Sendo et al. |
| 7,014,106 | B2 | 3/2006 | Nakajima |
| 7,296,755 | B2 | 11/2007 | Nakajima |
| 2002/0073046 | A1 | 6/2002 | David |
| 2006/0253340 | A1* | 11/2006 | Levchin et al. ............... 705/26 |

FOREIGN PATENT DOCUMENTS

| | | | |
|---|---|---|---|
| JP | 8-16740 | | 1/1996 |
| JP | 08-96043 | | 4/1996 |
| JP | 8-339407 | | 12/1996 |
| JP | 9-116960 | | 5/1997 |
| JP | 10-198739 | | 7/1998 |
| JP | 10-207946 | | 8/1998 |
| JP | 10-289267 | | 10/1998 |
| JP | 11-45366 | | 2/1999 |
| JP | 11-85014 | A | 3/1999 |
| JP | 11-96252 | | 4/1999 |
| JP | 11-224236 | | 8/1999 |
| JP | 11-511882 | A | 10/1999 |
| JP | 2002042030 | A * | 2/2002 |
| WO | 96/36934 | | 11/1996 |
| WO | 97/45814 | | 12/1997 |
| WO | 97/49074 | | 12/1997 |
| WO | 98/21677 | | 5/1998 |
| WO | WO 99/09502 | | 2/1999 |
| WO | 99/66436 | A1 | 12/1999 |
| WO | 00/49551 | | 8/2000 |
| WO | 01/09807 | | 2/2001 |
| WO | 01/09808 | | 2/2001 |
| WO | WO 01/09806 | A | 2/2001 |

OTHER PUBLICATIONS

Mobile Commerce: Nairn, "Mobile Commerce Visions of 'An Internet with Wings,'" Financial Times (Jul. 1998), Proquest #30857907.
Steinberg, "Smart Cards Finally Draw a Good Hand/Smart Card Technology Finally Draws a Good Hand/Smart Cards Play Into Net Security," Austin American Statesman (Dec. 1997), Proquest #25116767.
Microsoft Press Computer Dictionary, p. 456 (3d ed. 1997).
"Open Market Introduces Industry-Defining Software for Internet Commerce," PR Newswire (Feb. 1998), Proquest #26408772.
U.S. Appl. No. 60/131,369, filed Apr. 28, 1999, Sherman.
U.S. Appl. No. 09/630,563, filed Aug. 2, 2000, Nakajima.
U.S. Appl. No. 09/630,557, filed Aug. 2, 2000, Nakajima.
U.S. Appl. No. 11/043,050, filed Aug. 2, 2000, Nakajima.
"Open Market Receives Patents for Core Internet Commerce Technology; Patents Cover Internet Marketing, Order Management and Payment," PR Newswire (Mar. 1998), Proquest #26881564.
Mobile Commerce: McDonald, "Smartcard Chip Reduces EFTPOS Security Risk-Tobin," Dominion (Mar. 1998), Proquest #28386959.
Dunlap, "Open Market Pact Invests in E-commerce," Computer Reseller News, n. 788, p. 103 (May 1998), Proquest #29397051.
U.S. Appl. No. 60/131,785, filed Apr. 30, 1999 (including Exhibit A).
U.S. Appl. No. 60/144,633, filed Jul. 19, 1999 (including Exhibit A).
U.S. Appl. No. 60/172,311, filed Dec. 17, 1999 (including Exhibit A).
"Geoworks First to Deliver Shopping Discounts Direct to Mobile Phones and Pagers", PR Newswire, Jun. 22, 1999.
O'Mahony, D., et al. "Electronic Payment Systems", Artech House, pp. 62-63 (1997).
U.S. Appl. No. 60/146,628 (David).
U.S. Appl. No. 60/167,352 (David).
English translation of International Preliminary Examination Report in International patent appln. PCT/JP00/02014 (Oct. 16, 2001).

* cited by examiner

○○MAIL ORDER JULY 2000  TRANSACTION ID : 997611

ITEM : BIBELOT OF BIRD
PRICE : ¥1,980
ITEM NUMBER
  BLUE : 54321
  RED : 54322
YELLOW : 54323

ITEM : EXERCISE BICYCLE
PRICE : ¥56,000
ITEM NUMBER
  BLUE : 54331
  RED : 54332
YELLOW : 54333

ITEM : BOOTS
PRICE : ¥32,000
ITEM NUMBER : 6123+
23cm=23
24cm=24
25cm=26
27cm=27

FIG. 15

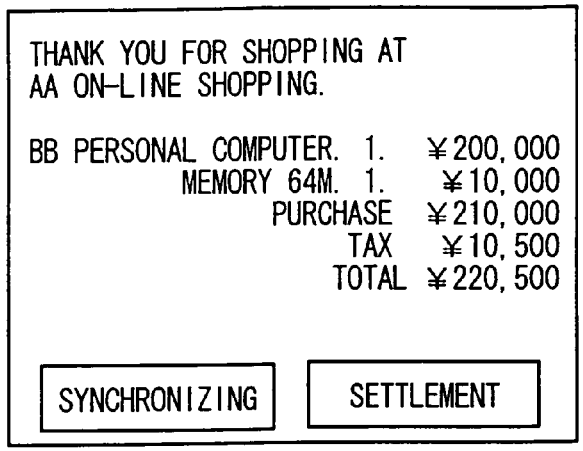
(a)
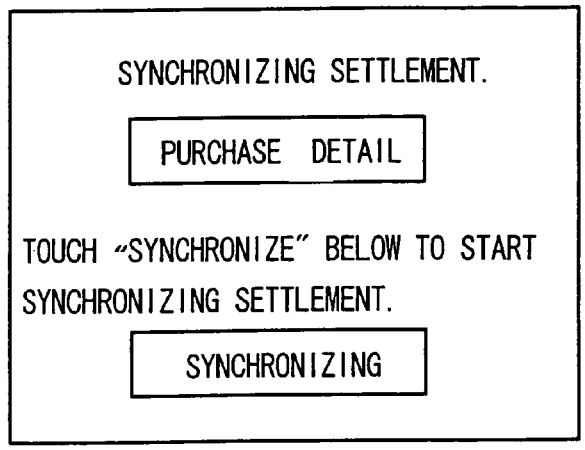
(b)
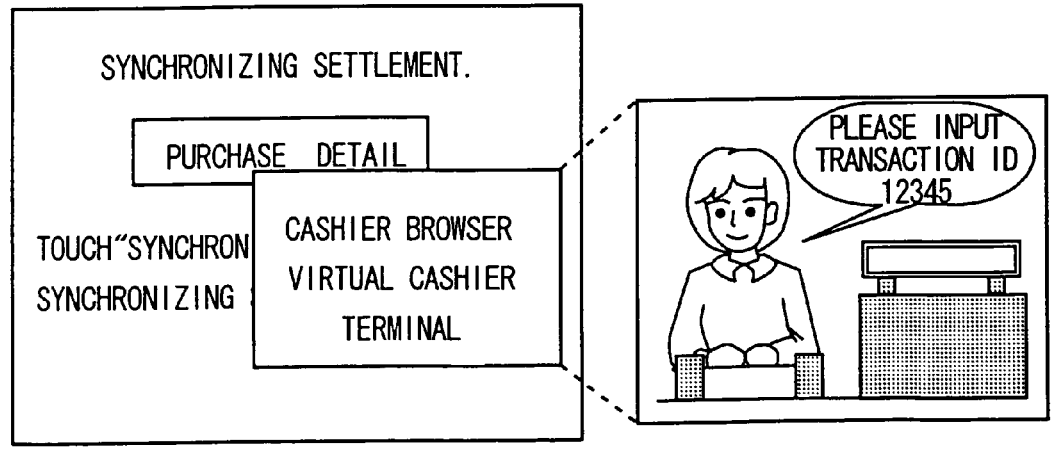
(c)
*FIG. 44*

ELECTRONIC SETTLEMENT SYSTEM, SETTLEMENT APPARATUS AND TERMINAL

This is a continuation application of U.S. application Ser. No. 09/786,208 filed May 8, 2001 which is the national phase of PCT/JP99/04178 filed on Aug. 2, 1999, the entire contents of which are incorporated herein by reference.

BACKGROUND OF THE INVENTION

1. Field of the Invention

The present invention relates to an electronic settlement system, a settlement apparatus, and its terminal.

2. Description of the Related Art

Conventionally, in an electronic settlement system, which executes a settlement of a commercial transaction electronically via a communication network, personal data such as a credit card number is sent in the form of digital data such as a credit card number via the Internet. Sending personal data such as a credit card number directly, the credit card number may be stolen and suffer from a false use. Thus, it is necessary to keep personal data from being leaked by using a high level of cryptology. To improve security, the electronic settlement system needs a complex authenticating procedure which, however, sacrifices convenience.

SUMMARY OF THE INVENTION

Therefore, an object of the present invention is to solve such a problem and provide a safe and convenient electronic settlement system.

Therefore, it is an object of the present invention to provide an electronic settlement system, a settlement apparatus, and its terminal which overcomes the above issues in the related art. This object is achieved by combinations described in the independent claims. The dependent claims define further advantageous and exemplary combinations of the present invention.

According to the first aspect of the present invention, an electronic settlement system for settling a transaction through a communication network comprises: a settlement apparatus which performs the settlement of the transaction; a billing terminal connecting to the settlement apparatus via the communication network; and a paying terminal, connecting to the settlement apparatus via the communication network, wherein the settlement apparatus performs the settlement of a transaction by synchronizing a communication to the billing terminal with a communication to the paying terminal when the settlement apparatus sets up a transaction identifying number which identifies the transaction and when the paying terminal transmits the same transaction identifying number to the settlement apparatus.

The billing terminal may connect to the settlement apparatus via a commercial telephone line or a private line, and the paying terminal connects to the settlement apparatus via a radiotelephone communication.

According to the second aspect of the present invention, a settlement apparatus performing a settlement of a transaction, which communicates with a billing terminal performing billing of the transaction and with a paying terminal performing paying of the transaction, the apparatus comprises: a first communication unit connecting to the billing terminal via a first communication network; a second communication unit connecting to the paying terminal via a second communication network; and a processing unit for processing the settlement of the transaction, the processing unit synchronizing a communication to the billing terminal with a communication to the paying terminal when the processing unit sets up a transaction identifying number to identify the transaction, and when the paying terminal transmits to the settlement apparatus the same transaction identifying number.

The first communication unit may connect to the billing terminal via at least one of a commercial telephone line and a private line, and the second communication unit connects to the paying terminal via radiotelephone communication.

The first communication unit may receives a purchase amount of the transaction from the billing terminal; the second communication unit transmits the purchase amount to the paying terminal so that the paying terminal confirms the purchase amount, and receives a final purchase confirmation signal; the processing unit may perform a settlement processing after the second communication unit receives the final purchase confirmation signal from the paying terminal; the first communication unit may transmit a settlement completion notification, which notifies completion of the settlement processing performed by the processing unit to the billing terminal; and the second communication unit may transmit to the paying terminal a receipt which notifies the receiving of the purchase amount of the settlement processed by the processing unit.

The apparatus may further comprises a billing terminal database storing information about the billing terminal, wherein the first communication unit receives from the billing terminal an identifying number to identify the billing terminal, and the processing unit may retrieve information about the billing terminal from the billing terminal database and confirms a registration of the billing terminal, based on the identifying number.

The second communication unit may transmit to the paying terminal the information about the billing terminal, for the paying terminal to confirm the billing terminal, retrieved from the billing terminal database.

The apparatus may further comprises a paying terminal database which stores information about the paying terminal, wherein the second communication unit detects a calling telephone number of the paying terminal, and the processing unit may retrieve information about a user of the paying terminal from the paying terminal database based on the calling telephone number, and the processing unit inquires about at least one of a registration status of the user, a payment history of the user, and available amount of the user.

The processing unit may retrieve at least a part of attribute information of the user of the paying terminal from the paying terminal database, and the first communication unit transmits to the billing terminal at least a part of the attribute information of the user of the paying terminal.

When the second communication unit receives a message which demands a purchase history of the user of the paying terminal, the processing unit retrieves the purchase history of the user from the paying terminal database, and the second communication unit transmits the purchase history to the paying terminal.

The first communication unit may transmit to the billing terminal a transaction identifying number in order to identify the transaction, and the processing unit may synchronize a communication to the billing terminal with a communication to the paying terminal, and the first communication unit transmits to the billing terminal a synchronization confirmation signal which indicates establishment of synchronization, when the billing terminal notifies the transaction identifying number to at least one of the paying terminal and a user of the paying terminal, and when the paying terminal transmits to the settlement apparatus the same transaction identifying number.

The processing unit retrieves authentication information of the user of the paying terminal from the paying terminal database, and the first communication unit, for the billing terminal to authenticate the user, may transmit the authentication information of the user to the billing terminal. The authentication information of the user may be a facial portrait of the user.

The first communication unit may receive a signal requesting password authentication of the user from the billing terminal; the processing unit may retrieve information about the password of the user of the paying terminal from the paying terminal database; the second communication unit may transmit an order of a password request to the paying terminal and receives a password inputted by the paying terminal from the paying terminal; the processing unit, receiving the password from the paying terminal, may inquire about the information about the password retrieved from the paying terminal database; and the first communication unit may authenticate the user by transmitting a password inquiry result performed by the processing unit to the billing terminal.

The processing unit may retrieve authentication information registered by the user of the paying terminal from the paying terminal database; the second communication unit may transmit an order to inquire about the authentication information to the paying terminal and receives an answer of the paying terminal inputting corresponding to the order from the paying terminal; and the processing unit may authenticate the user by verifying the answer received from the paying terminal against the authentication information retrieved from the paying terminal database.

The authentication information registered by the user of the paying terminal, which the processing unit retrieves from the paying terminal database, may be at least one of a password of the user, a voice data spoken from the user, a face image data of the user, an image data of an iris or retina of the user, and an image data of finger print of the user, and the answer of the processing unit receiving from the paying terminal in order to inquire with the authentication information may be at least one of character data, voice data, and image data.

The apparatus may further comprise a billing terminal database which stores information about the billing terminal, wherein: the processing unit retrieves information about the billing terminal from the billing terminal database so that the billing terminal confirms the paying terminal, the second communication unit transmits to the paying terminal the information about the billing terminal in addition to the transaction identifying number for identifying the transaction, and when the paying terminal confirms the information about the billing terminal and transmits the transaction identifying number to the settlement apparatus, the processing unit synchronizes the communication to the billing terminal with the communication to the paying terminal, and the first communication unit transmits a synchronization confirmation signal which indicates establishment of synchronization with the billing terminal.

The first communication unit may receive from the billing terminal an item ordering information which is for a user of the paying terminal to input an order of an item, the second communication unit may transmit the item ordering information to the paying terminal, and when the paying terminal transmits to the settlement apparatus an order of an item, inputted by the user of the paying terminal based on the item ordering information, the first communication unit transmits the order of an item to the billing terminal.

The apparatus may further comprise a voice database which stores user voice data of the paying terminal, wherein: the second communication unit transmits a message prompting the paying terminal to input a user voice and receives the user voice from the paying terminal, and the processing unit, by inquiring about the voice of the user using the voice database, authenticates the user.

The settlement apparatus may authenticate the user, by the processing unit retrieving authentication information registered by the user of the paying terminal from the paying terminal database, the second communication unit may transmit an instruction which inquires the authentication information to the paying terminal, and the paying terminal receives an answer inputted corresponding to the instruction from the paying terminal, and the processing unit may inquire the answer received from the paying terminal to the authentication information retrieved from the paying terminal database.

The authentication information, the processing unit retrieving from the paying terminal database and registered by the user of the paying terminal may be at least one of a password of the user, voice data spoken by the user, facial portrait image data of the user, at least one of iris and retina data of the user, and finger print image data of the user; and the answer of the processing unit receiving from the paying terminal in order to inquire with the authentication information is at least one of character data, voice data, and image data.

According to the third aspect of the present invention, a billing terminal performing billing of a transaction against a paying terminal paying for the transaction, by communicating with a settlement apparatus settling the transaction, comprises: a communication unit which connects to the settlement apparatus via a communication network, the communication unit transmitting an identification number to identify the billing terminal to the settlement apparatus and receiving from the settlement apparatus a synchronization confirmation signal indicating establishment of synchronization with the paying terminal; and a processing unit which performs billing of the transaction.

The communication unit may connect to the settlement apparatus via at least one of a commercial telephone line, a private line, and radiotelephone communication. The communication unit may receive from the settlement apparatus at least a part of attribute information of the user of the paying terminal.

The apparatus may further comprise a display unit displaying a status of the transaction performed by the processing unit; wherein the communication unit receives a transaction identifying number to identify the transaction from the settlement apparatus, the display unit, by indicating the transaction identifying number, notifies the transaction identifying number to at least one of the paying terminal and a user of the paying terminal, and when the communication unit receives from the settlement apparatus a synchronization confirmation signal indicating the establishment of synchronization with the paying terminal, the display unit indicates that the communication unit receives the synchronization confirmation signal.

The apparatus may further comprise a short range communication unit, the short range communication unit transmitting the transaction identifying number to the paying terminal by communicating with the paying terminal via at least one of an optical communication and a wireless communication.

The communication unit may transmit to the settlement apparatus a purchase amount of the transaction and receives from the settlement apparatus a settlement completion notification to notify a completion of the settlement processing.

The communication unit may receive from the settlement apparatus authentication information of the user of the paying terminal, and the processing unit may authenticate the user based on the authentication information received from the settlement apparatus. The authentication information of the user may be a facial portrait of the user.

The communication unit may transmit to the settlement apparatus a signal to demand password authentication of the user, and receives from the settlement apparatus a result of the password authentication of the user when the processing unit is not able to authenticate the user using the facial portrait of the user.

The apparatus may further comprise: an item choice unit by which the user of the paying terminal is prompted to choose a purchasing item, the item choice unit prompting the user to choose an item when the communication unit receives from the settlement apparatus the synchronization confirmation signal indicating the establishment of synchronization with the paying terminal; and an item sending unit through which a purchased item to be sent out, wherein the communication unit transmits to the settlement apparatus a price of the item chosen by the user as the purchase amount of the transaction, and when the communication unit receives the settlement completion notification from the settlement apparatus, the item sending unit sends out the item chosen by the user based on the settlement completion notification.

The communication unit may transmit to the settlement apparatus order information to prompt the user of the paying terminal to input an order of purchasing an item and receives from the settlement apparatus an order inputted by the user of the paying terminal based on the order information, the communication unit may transmit to the settlement apparatus the purchase amount calculated by the communication unit and receives from the settlement apparatus a settlement completion notification to notify a completion of the settlement processing.

According to the fourth aspect of the present invention, a billing terminal for performing billing of a transaction, communicating with a settlement apparatus performing settlement of the transaction against a paying terminal performing a payment of the transaction, and communicating with a computer terminal indicating a status of the transaction to provide information about the transaction, the billing terminal comprises: a first communication unit connecting to the settlement apparatus via a communication network, the first communication unit transmitting an identifying number identifying the billing terminal to the settlement apparatus and receiving a transaction identifying number identifying the transaction from the settlement apparatus, and the first communication unit receiving from the settlement apparatus a synchronization confirmation signal indicating the establishment of synchronization with the paying terminal; a second communication unit connecting to the computer terminal via the communication network, the second communication unit transmitting to the computer terminal for a user of the paying terminal the transaction identifying number in order to notify the transaction identifying number; and a processing unit performing billing of the transaction.

The second communication unit may receive from the computer terminal a purchase amount of the transaction, and when the first communication unit transmits the purchase amount to the settlement apparatus and receives from the settlement apparatus a settlement completion notification which notifies a completion of the settlement processing.

The second communication unit, for the computer terminal to indicate a state of the transaction, may transmit to the computer terminal at least one of the synchronization confirmation signal and the settlement completion notification for the first communication unit receiving from the settlement apparatus.

According to the fifth aspect of the present invention, an authentication apparatus for communicating with a first terminal and with a second terminal demanding to authenticate a user of the first terminal, and performing the authentication demanded by the second terminal, the apparatus comprises: a user database storing authentication information registered by a user of the first terminal; a first communication unit connecting to the first terminal via a first communication network, the first communication unit transmits to the first terminal an order to inquire the authentication information and receives from the first terminal an answer inputted by the first terminal corresponding to the order; a second communication unit connecting to the second terminal via a second communication network, the second communication unit receives from the second terminal an authentication demand to authenticate the user of the first terminal; and a processing unit performing the authentication, the processing unit sets up an identifying number to identify the authentication demanded by the second terminal, and when the first terminal transmits the same identifying number as the identifying number to the authentication apparatus, synchronizes a communication to the first terminal with a communication to the second terminal, retrieves from the user database authentication information to authenticate the user of the first terminal, and by inquiring the answer received from the first terminal with the authentication information retrieved from the user database, authenticates the user of the first terminal; wherein the second communication unit, by transmitting to the second terminal an authentication result judged by the processing unit, may authenticate the user of the first terminal.

The authentication information, the processing unit retrieving from the user database, registered by the user of the first terminal may be at least one of a password of the user, voice data spoken by the user, facial portrait image data of the user, at least one of iris and retina data of the user, and finger print image data of the user; and the answer of the processing unit receiving from the first terminal in order to inquire with the authentication information is at least one of character data, voice data, and image data.

According to the sixth aspect of the present invention, a recording medium which stores a program for a computer, communicating with a billing terminal performing billing of a transaction and with a paying terminal performing payment of the transaction, and performing a settlement of transaction, the program comprises: a first communication module which operates the computer to communicate to the billing terminal via a commercial telephone line or a private line; a second communication module which operates the computer to communicate to the paying terminal via a radiotelephone communication; and a processing module which performs the settlement of transaction, the processing module setting a transaction identifying number which identifies the transaction and the processing module synchronizing a communication to the billing terminal with a communication to the paying terminal when the paying terminal transmits a transaction identifying number the same transaction identifying number to the settlement apparatus.

According to the seventh aspect of the present invention, a program for a computer, communicating with a billing terminal performing billing of a transaction and with a paying terminal performing paying of the transaction, and performing a settlement of transaction, the program comprises:

a first communication module which operates the computer to communicate to the billing terminal via a commercial telephone line or a private line;

a second communication module which operates the computer to communicate to the paying terminal via a radio telephone communication; and a processing module which performs the settlement of transaction, the processing module setting a transaction identifying number which identifies the transaction and the processing module synchronizing a communication to the billing terminal with a communication to the paying terminal when the paying terminal transmits a transaction identifying number the same transaction identifying number to the settlement apparatus.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIG. 15 shows an example of a mail order catalog.

FIG. 44 shows examples of information displayed on a user computer 22.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

FIRST EMBODIMENT

An electronic settlement system applying the first embodiment of the present invention will be explained as follows.

Applying the electronic settlement system of the present embodiment, when a consumer purchases an item and pays its expense, the consumer may execute a settlement electronically via a network. The consumer is referred to as a user in the following.

Figure 1:
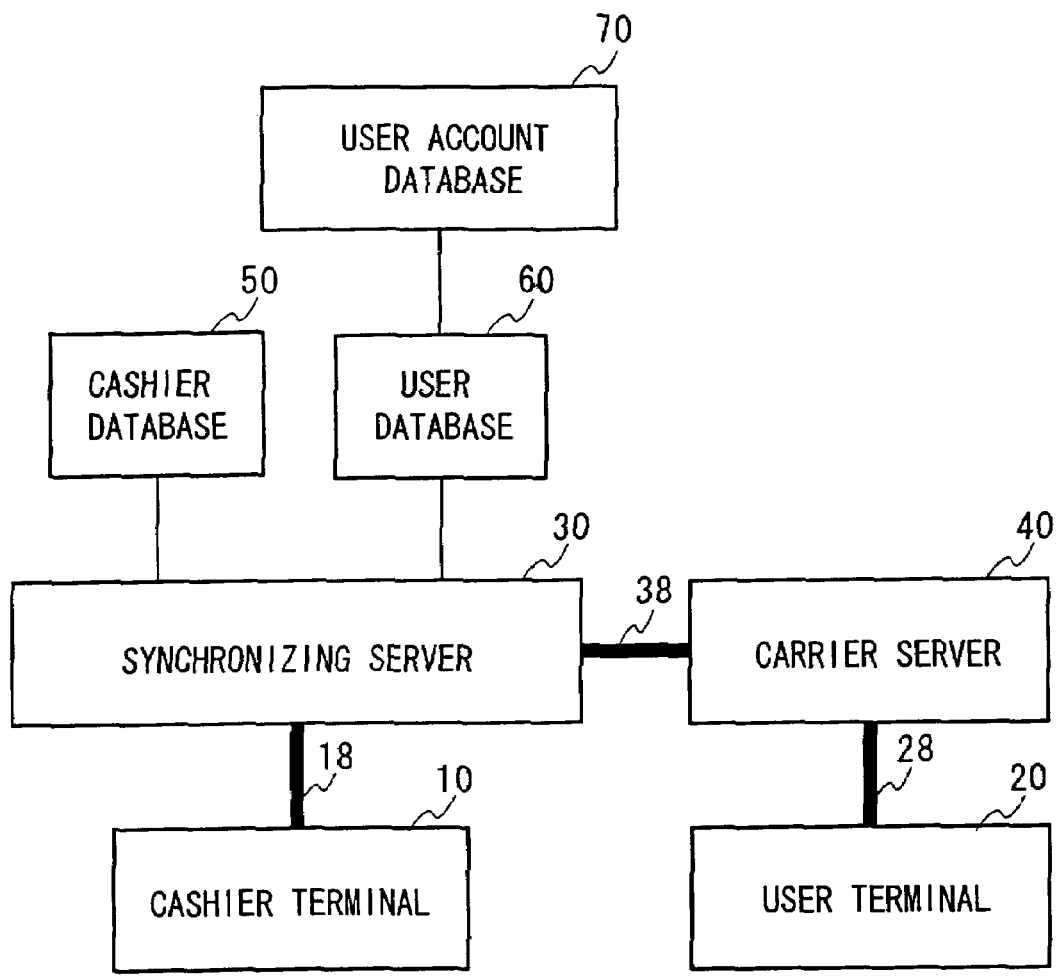
FIG. 1 is a block diagram showing a configuration of an electronic settlement system of a first embodiment of the present invention.

FIG. 1 is a block diagram showing a configuration of an electronic settlement system of the present embodiment. The electronic settlement system of the present embodiment has a cashier terminal 10 as an example of a billing terminal, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

A communication line 18, which is a communication path to connect the cashier terminal 10 with the synchronizing server 30, may be either a commercial telephone line or a private line. A radio communication channel 28 is a communication path of a radiotelephone communication to connect a user terminal 20 with a carrier server 40. A communication path 38 is a communication path to connect the carrier server 40 with the synchronizing server 30, and may be either a commercial telephone line or a private line.

Figure 2:
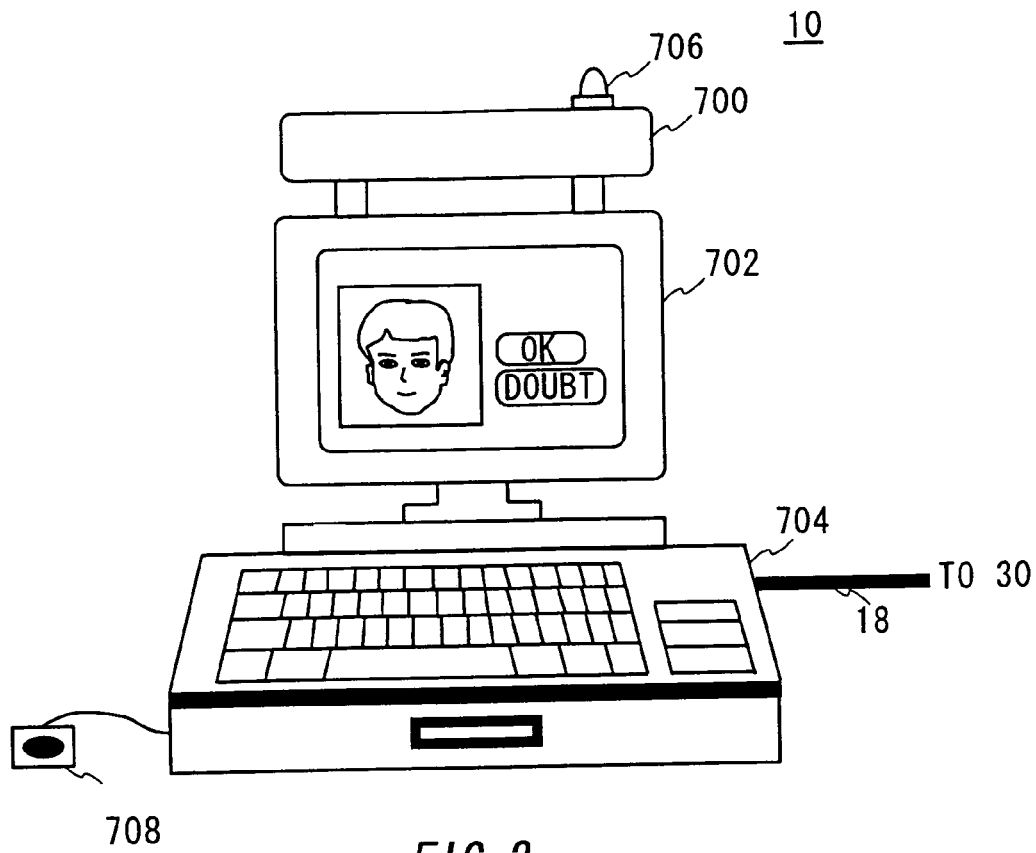
FIG. 2 shows a configuration of a cashier terminal 10.

The cashier terminal 10 calculates a purchase amount of items that the user purchased in a retailer's shop, and charges the user the purchase amount. FIG. 2 shows a configuration of a cashier terminal 10. The cashier terminal 10 has a user-side indicating unit 700, a clerk-side indicating unit 702, a cashier body 704, a synchronization indicator 706, and an infrared communicating unit 708. The cashier terminal 10 also has a communicating function connecting to the synchronizing server 30 via a commercial telephone line or a private line, which is not shown in the figure.

The user-side indicating unit 700 has a display screen on the opposite side to the clerk which is a back side of the cashier terminal 10 made with liquid crystal (or LCD) in order to display character information. The user-side indicating unit 700 displays a purchase amount, a "transaction ID" described in the following, and so on, and notifies information to the user. The clerk-side indicating unit 702 indicates a purchase amount calculating processing, an electronic settlement processing, and so on. The synchronization indicator 706 is a light that glows in order to indicate an establishment of "synchronizing status", which is described in the following, when the synchronization is established. The infrared communicating unit 708 communicates data via infrared communication to an infrared communication unit 808 of the user terminal 20.

The user terminal 20 directs the user to pay a value of the merchandise using credit means such as a credit card or a bankcard. An example of the user terminal 20 is a radiotelephone communication means such as a cellular phone. Another example of the user terminal 20 is a portable terminal such as a PDA or a notebook type personal computer and so on, which may communicate by connecting to a radio communication means such as a cellular phone.

Figure 3:
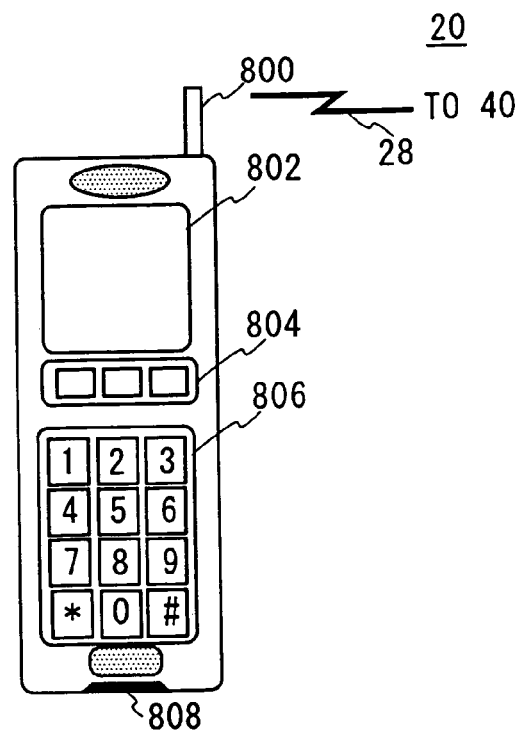
FIG. 3 shows a configuration of a cellular phone as an example of a user terminal 20.

FIG. 3 shows a configuration of a cellular phone as an example of a user terminal 20. The user terminal 20 has an antenna 800, a display unit 802, a console unit 804, a keypad 806, and an infrared communication unit 808. The user terminal 20 communicates to the carrier server 40 through the antenna 800 via a radio communication channel 28. The user terminal 20 has a data packet communication facility and may transmit and receive digital data. The display unit 802 displays character information and image information transmitted and received by the data packet communication facility. Using the console 804, a menu or buttons displayed on the display unit 802 is selected. The keypad 806 provides buttons to input telephone numbers, a password, and so on. Using the infrared communication unit 808, data is transmitted to the infrared communicating unit 708 of the cashier terminal 10.

The user terminal 20 connects to the carrier server 40 via the radio communication channel 28. The carrier server 40 connects to the synchronizing server 30 via the communication line 38. Therefore, the user terminal 20 communicates with the synchronizing server 30.

The synchronizing server 30 performs a settlement processing in a transaction between the retailer and the user. The synchronizing server 30 connects to the cashier database 50 for accumulating information from the cashier terminal 10, the user database 60 for accumulating information from the user terminal 20, and the user account database 70 for accumulating information of the credit account or the bank account of users; and searches each database and retrieves the information. The synchronizing server 30, the cashier database 50, the user database 60, and the user account database 70 may be arranged in a network of a credit company or a bank network. However, only the user account database 70 may be arranged in the network of a credit company or the bank network whereas the synchronizing server 30 may be connected to the user account database 70 via the private line.

The synchronizing server 30 connects to the cashier terminal 10 and the user terminal 20, and performs data communication thereamong. The cashier terminal 10 does not directly communicate with the user terminal 20.

The synchronizing server 30 acquires information about the billing of a commodity transaction by communication to the cashier terminal 10, acquires information about the paying of a commodity transaction by communication to the user terminal 20, and processes the settlement in transactions between the cashier terminal 10 and the user terminal 20 by synchronizing the communication to the cashier terminal 10 with the communication to the user terminal 20.

Figure 4:
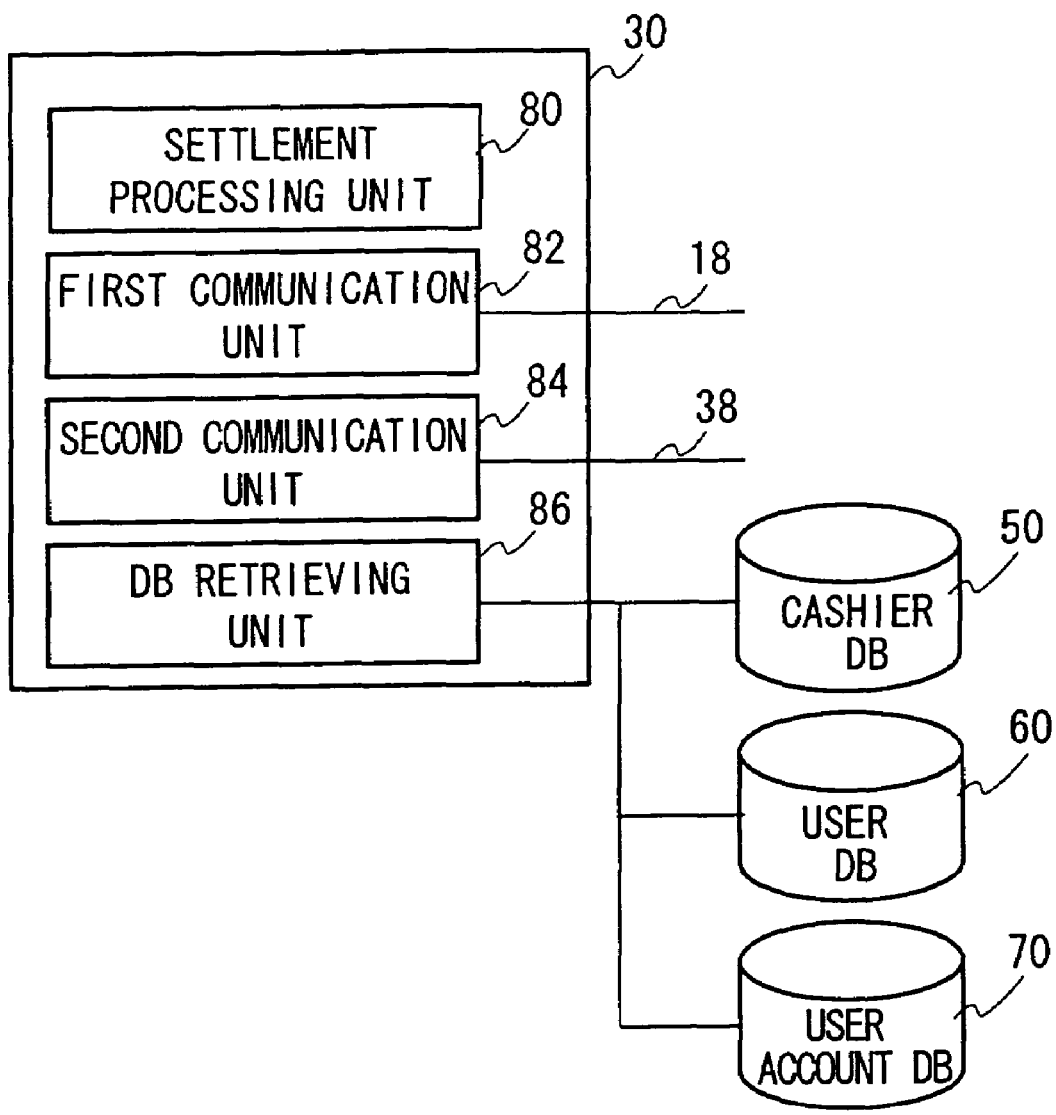
FIG. 4 is a schematic diagram showing a configuration of a synchronizing server 30.

FIG. 4 is a configuration figure of the synchronizing server 30. The synchronizing server 30 has a settlement processing unit 80, a first communication unit 82 for processing data communications via the communication line 18, a second communication unit 84 for processing data communications via the communication line 38 and the radio communication channel 28, a cashier database 50, and a database retrieving unit 86 which accesses the user database 60 and the user account database 70 and retrieves information from those databases.

A configuration of a "synchronizing settlement" and a "synchronizing authentication" using the electronic settlement system of the present embodiment is described as follows.

A "synchronizing settlement" is a method that does not directly communicate between the cashier terminal 10 and the user terminal 20, but rather processes a transaction settlement between the cashier terminal 10 and the user terminal 20, by synchronizing communication in real-time between the cashier terminal 10 and the user terminal 20 via the synchronizing server 30 which communicates with both the cashier terminal 10 and the user terminal 20.

In the electronic settlement system, transaction settlements are performed between a plurality of cashier terminals 10 and a plurality of user terminals 20. Accordingly, the synchronizing server 30 specifies the cashier terminal 10 billing a certain transaction and the user terminal 20 paying for the transaction, and then synchronizes the communication between the cashier terminal 10 and the user terminal 20, so that it processes the transaction of settlement between the cashier terminal 10 and the user terminal 20.

In order to synchronize the communication to the cashier terminal 10 with the communication to the user terminal 20, a transaction ID is defined as an example of a transaction identifying number in order to identify a certain transaction. Whenever a cashier terminal 10 connects to and communicates with the synchronizing server 30, the synchronizing server 30 defines a transaction ID, and transmits it to the cashier terminal 10. The cashier terminal 10 indicates the transaction ID received from the synchronizing server 30 on a user-side indicating unit 700, and shows the user the transaction ID.

The user, using the user terminal 20, inputs the shown transaction ID, and transmits the transaction ID to connect to the synchronizing server 30. If the transaction ID received from the user terminal 20 matches a transaction ID of one of the plurality of cashier terminals 10 which have already issued transaction ID's, the synchronizing server 30 allows the user terminal 20 to synchronize with the cashier terminal 10 and to communicate with each other. If a matching transaction ID is not able to be found, the user terminal 20 is not allowed to synchronize with any cashier terminals 10. Thus, for a certain transaction identified by the transaction ID, the synchronizing server 30 specifies the cashier terminal 10 billing the transaction and the user terminal 20 paying for the transaction by means of the transaction ID, synchronizes the communication between the cashier terminal 10 and the user terminal 20, and processes the settlement. Therefore, the settlement of transactions is performed between the cashier terminal 10 and the user terminal 20 without a direct communication therebetween.

A system of a "synchronizing authentication" will be explained in the following. A "synchronizing authentication" is an authentication method where the cashier terminal 10 authenticates the user of the user terminal 20 by synchronizing a communication to the cashier terminal 10 with that to the user terminal 20 via the synchronizing server 30, which communicates with both the cashier terminal 10 and the user terminal 20. But the cashier terminal 10 does not communicate to the user terminal 20 directly, and the user terminal 20 does not communicate with the cashier terminal 10 directly. Between the cashier terminal 10 and the user terminal 20, information about the authentication is not transmitted directly to each other.

Here, as an example, a case where a clerk using a cashier terminal 10 authenticates if the user of a user terminal 20 is the owner of the user terminal 20, will be explained.

A cellular phone, as an example of a user terminal 20, has a predetermined calling telephone number unique for each cellular phone, so that the predetermined calling telephone number is used with every dialing. The calling telephone number is unique to each cellular phone, and any other cellular phone is not able to make a phone call with the same calling telephone number. Therefore, as long as the original owner uses his or her cellular phone, the calling telephone number of a cellular phone may be used for specifying user identification. That is, a cellular phone may work as an ID like a driving license.

Concerning a case where the owner of a cellular phone lost his or her cellular phone and someone else uses the lost cellular phone, the cellular phone may be uniquely specified with the calling telephone number, but the user of the cellular phone may not be specified to the owner of the cellular phone. The electronic settlement system stores data corresponding to a calling telephone number of each cellular phone with the information of the owner of each cellular phone in the user database 60, and authenticates if the user of a cellular phone is the actual owner.

When the synchronizing server 30 connects to the user terminal 20, the synchronizing server 30 detects a calling telephone number of the user terminal 20, retrieves the user database 60 based on the calling telephone number, extracts information about the user, and authenticates the user. There are several types of authentication methods, such as visual authentication, password authentication, voice authentication, and soon. These authentication methods may be combined with each other.

When using a visual authentication, the synchronizing server 30 retrieves a facial portrait data of the user from the user database 60, transmits to the cashier terminal 10, and prompts the clerk to authenticate if the user is the original owner. When using the password authentication, the synchronizing server 30 retrieves password information from the user database 60, transmits a password demanding instruction to the user terminal 20, and prompts the user to input the password from the user terminal 20 and to transmit the password to the synchronizing server 30. The synchronizing server 30 inquires about the transmitted password and the password registered in the user database 60, and transmits an authentication result to the cashier terminal 10. When using the voice authentication, in place of a password, voice data where the user speaks a predetermined word is recorded in a database in advance; the synchronizing server 30 prompts the user to input the vocalized voice data of the registered word from the user terminal 20, and prompts the user to transmit to the synchronizing server 30.

Furthermore, when the visual authentication alone is not enough, an accuracy of the authentication may be improved by multiple authentications combined with another authentication method such as the password authentication.

Applying the "synchronizing authentication", the cashier terminal 10 and the user terminal 20 do not communicate directly with each other. Thus, secret information such as a password is not sent between the cashier terminal 10 and the user terminal 20. The synchronizing server 30, which communicates with both the cashier terminal 10 and the user terminal 20, mediates the authentication processing. Thus, the clerk who uses the cashier terminal 10 may authenticate the user who uses the user terminal 20 indirectly. Therefore, the user, without telling security information such as a password to the clerk, nor transmitting password data and so on from the user terminal 20 to the cashier terminal 10, may authenticate himself or herself. The authentication of the user may be performed without a leak of the user's personal information. In case the data sent between the user terminal 20 and the synchronizing server 30 is stolen by wiretapping and so on, for example, because the personal information is not sent at all, no problem occurs.

Combining the "synchronizing settlement" with the "synchronizing authentication" may realize an electronic settlement system that ensures security, privacy protection, and reliability at a high level. Furthermore, a cellular phone or a portable terminal connecting for data communication with a cellular phone and so on has a portability, that is the user may take the terminal anywhere, and a simplicity, that is the user may communicate with a network via radiotelephone communication from anywhere. Therefore, an electronic settlement system of the present embodiment enables to realize an electronic settlement with high reliability, security, and convenience.

Figure 5:
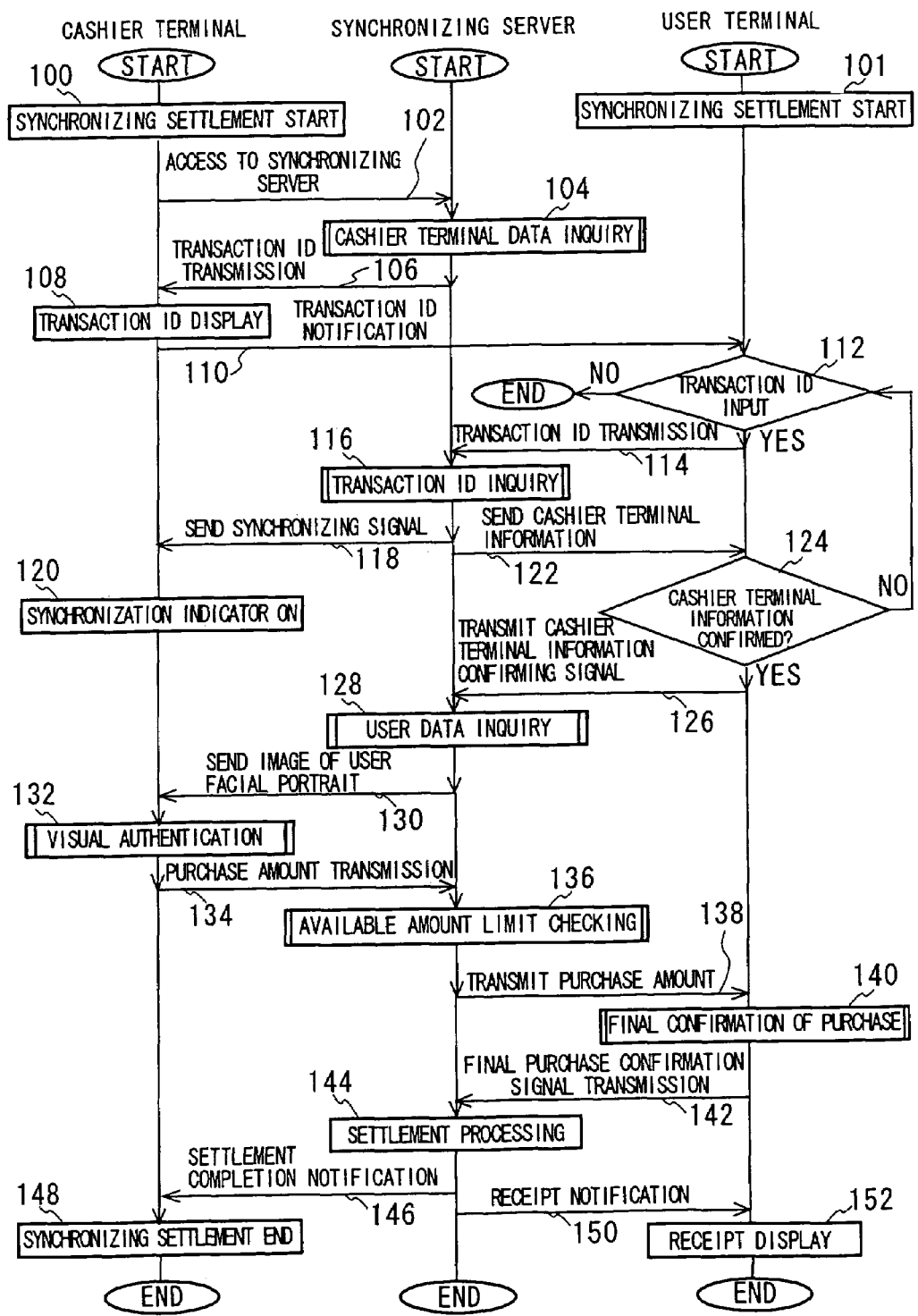
FIG. 5 is a flow chart showing a settlement processing in an electronic settlement system of the first embodiment.
Figure 10:
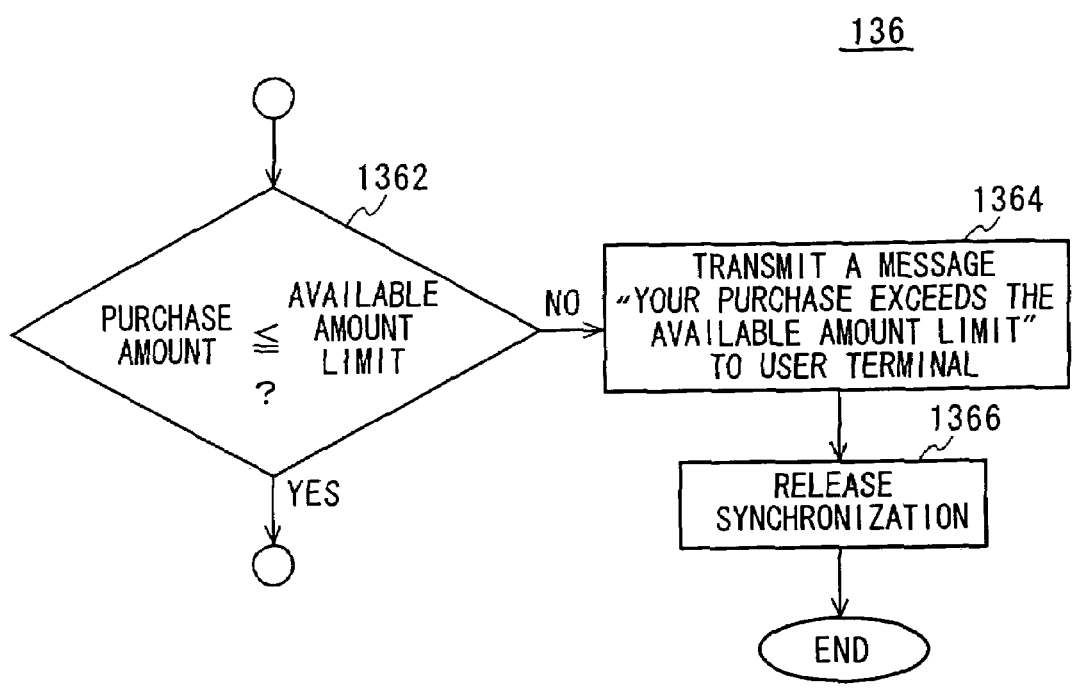
FIG. 10 is a flow chart showing an available amount checking 136 processing.
Figure 11:
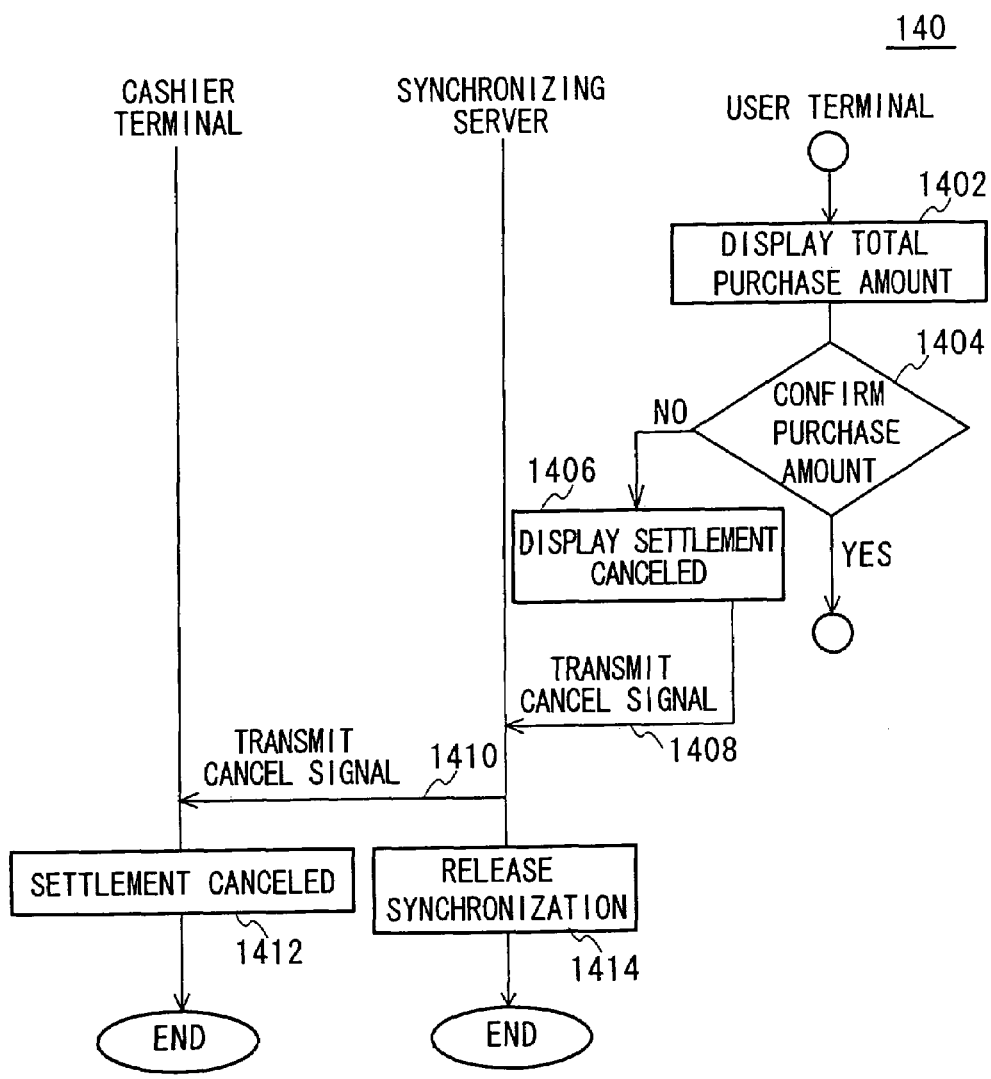
FIG. 11 is a flowchart showing a final purchase confirmation 140 processing.
Figure 12:
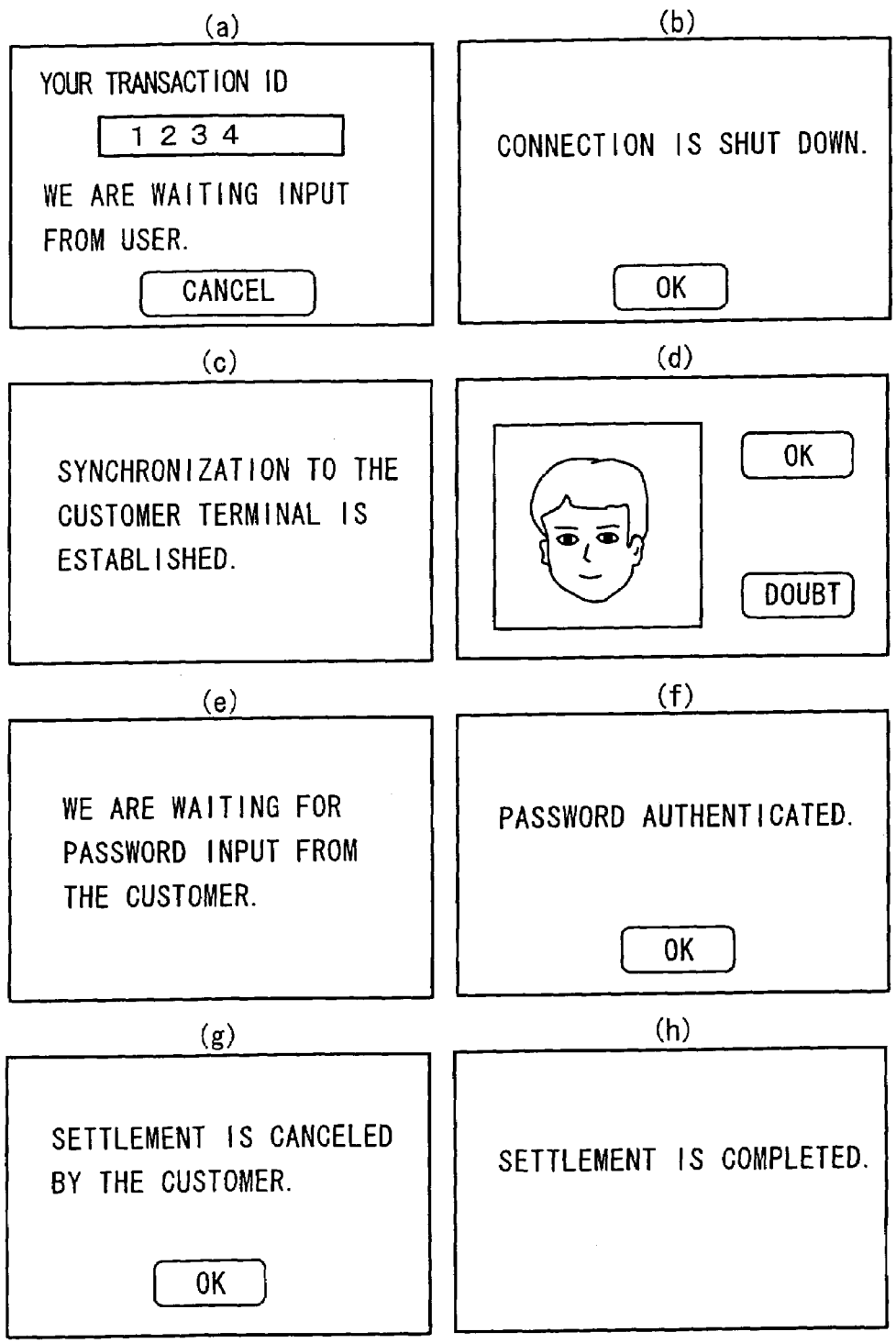
FIG. 12 shows examples of information indicated on a display unit 702 of a cashier terminal 10.
Figure 13:
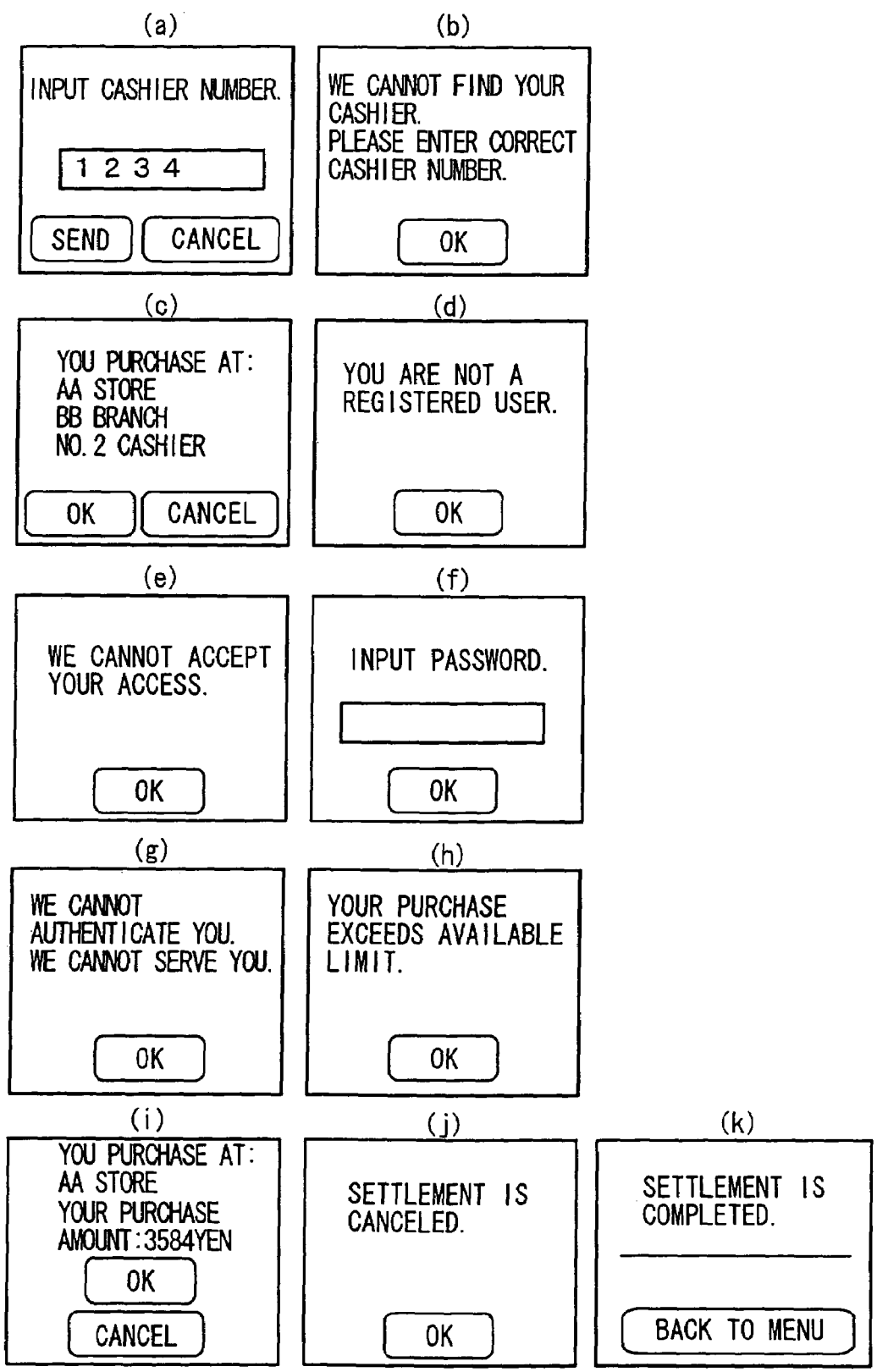
FIG. 13 shows examples of information indicated on a display unit 802 of a user terminal 20.

Referring to FIG. 5 to FIG. 13, processing of the electronic settlement of the present embodiment, where a user settles a payment with the electronic settlement system using a user terminal, is described as follows. FIG. 5 is a flow chart showing a settlement processing in an electronic settlement system of the first embodiment. FIG. 5 is a flow chart in chronological order showing the settlement processing between the cashier terminal 10, the user terminal 20, and the synchronizing server 30. Between the cashier terminal 10, the user terminal 20, and the synchronizing server 30, information interaction is indicated using arrows in a lateral direction. FIG. 6 to FIG. 11 are flow charts showing details of processing in FIG. 5. FIG. 12 shows examples of information displayed on the clerk-side indicating unit 702 of a cashier terminal 10. FIG. 13 shows examples of information displayed on a display unit 802 of a user terminal 20.

In the following, except a case where special notification is made, the interaction of information between the cashier terminal 10 and the synchronizing server 30 is performed via a communication line 18, and the interaction of information between the user terminal 20 and the synchronizing server 30 is performed via a radio communication channel 28 and a communication line 38. An access method from the cashier terminal 10 to the synchronizing server 30 may be either a dial up access method from the commercial telephone line or a method of access to a server gate via a private line. An access method from the user terminal 20 to the synchronizing server 30 is performed via a radiotelephone communication when the user uses a cellular phone as a user terminal 20.

Referring to FIG. 5, the settlement processing is described in the following. A user purchases an item from a retailer, and pays the value of the merchandise at a cashier over the counter. First, the user chooses an electronic settlement. The clerk, at the user's request of electronic settlement, chooses the electronic settlement menu on the cashier terminal 10, and the electronic settlement starts (100). The cashier terminal 10 accesses the synchronizing server 30 (102). The cashier terminal 10 transmits a cashier registration number which is unique to each cashier terminal when the cashier terminal 10 accesses the synchronizing server 30.

Corresponding to access from the cashier terminal 10, the synchronizing server 30 starts to connect the cashier terminal 10, and inquires the cashier terminal information based on the cashier registration number transmitted from the cashier terminal 10 (104).

Figure 6:
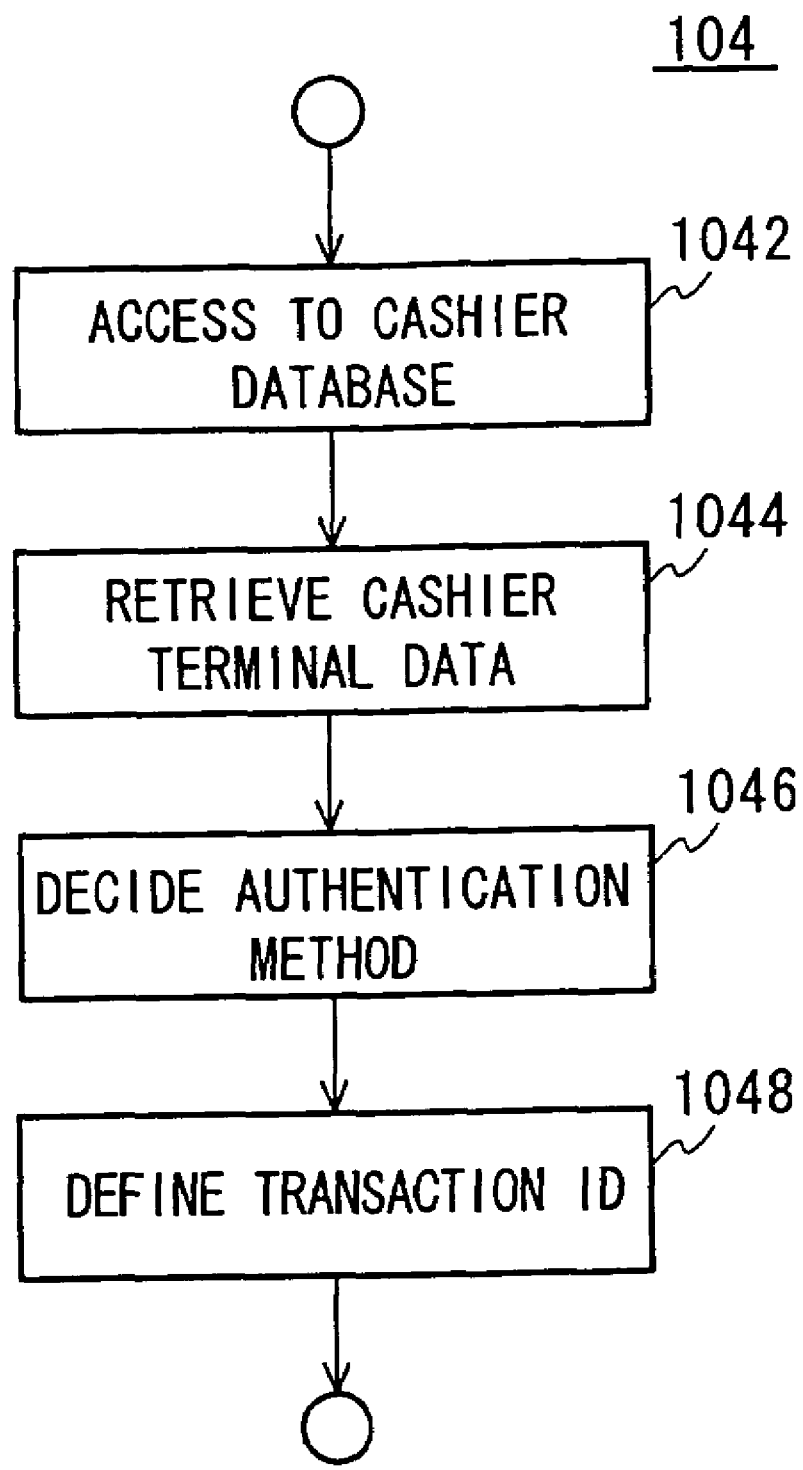
FIG. 6 is a flow chart showing cashier terminal information inquiry 104 processing.

Referring to FIG. 6, the cashier terminal information inquiry 104 processing will be described. The synchronizing server 30 accesses the cashier database 50 (1042) and retrieves the cashier terminal information of a cashier terminal matching to the cashier registration number (1044). A name of the retailer, a name of the shop, an authentication method, and so on are registered in the cashier terminal information. The authentication method may be chosen from a visual authentication method, a password authentication method, and so on. The cashier terminal information includes authentication methods to be used. The synchronizing server 30 decides to adopt the authentication method registered in the cashier terminal information (1046). Here, a case that adoption of a visual authentication method is selected for an authentication method is described as follows.

The synchronizing server 30 allocates a transaction ID to the cashier terminal 10 (1048). The transaction ID is a number for identifying the settlement that is going to be processed by the cashier terminal 10.

The transaction ID may be a sequence of numbers, for example, created by random number generation. For convenience of input from the user terminal 20, the transaction ID is preferably the smallest digit possible. On the other hand, the same cashier terminal identifying number could be allocated on a plurality of cashier terminals 10 or user terminals 20; in such a case, the synchronizing server 30 is not able to correspond a cashier terminal 10 to the user terminal 20 for the transaction. For that reason, the transaction ID is allocated in the way that the same transaction ID is not used twice or more in a predetermined period. On the other hand, the same transaction ID may be used again after the predetermined period. Thus, without increasing the digits of the transaction ID, uniqueness of the transaction ID may be maintained.

When a retailer has a plurality of branches, the transaction ID created at a branch by random number generation may compete with the transaction ID created at another branch. In such a case, in order to avoid the competition of the transaction IDs allocated by two or more branches, the range of the generated random numbers for transaction IDs allocated to each branch may be limited.

Therefore, a transaction ID, even though it is a number for identifying transactions, does not need to be a large digit number such as a purchase ID, which is a number unique to every transaction; but needs to be a digit small enough to keep the uniqueness only for a certain period.

Referring back to FIG. 5, processing after the cashier terminal information inquiry 104 will be described in the following. The synchronizing server 30 delivers the transaction ID to the cashier terminal 10 (106). Here, the synchronizing server 30 is on an "access wait" status that is waiting for the user terminal 20 to access using this transaction ID. On the other hand, the cashier terminal 10 that delivered the transaction ID is defined as being on a "synchronizing waiting" status.

The cashier terminal 10 displays the transaction ID transmitted from the synchronizing server 30 on a user-side indicating unit 700 (108). The cashier terminal 10 displays information shown in FIG. 12 (a), so that it indicates not only the transaction ID but also the "synchronizing wait" of the user terminal. The "synchronizing wait" is waiting while the user terminal accesses the synchronizing server 30 using the transaction ID. The clerk notifies the transaction ID displayed on the cashier terminal 10 to the user (110). The clerk may orally tell the user the transaction ID. Alternatively, the clerk may show the transaction ID displayed on the user-side indicating unit 700 of the cashier terminal 10.

The clerk may cancel the settlement processes by choosing "cancel" from the information displayed as shown in FIG. 12 (a). This cancel processing may be used when the user terminal 20 is not able to access the synchronizing server 30 because of poor radio conditions and so on, or the transmission is performed normally, but the synchronizing server 30 is not able to establish the synchronization even though the transaction ID is transmitted from the user terminal 20.

Information for inputting a "transaction ID" as shown in FIG. 13(a) is displayed on the user terminal 20. The user inputs the transaction ID notified from the clerk (112). The user chooses the "transaction ID" from the input information, and the transaction ID is transmitted to the synchronizing server 30 (114). The user may choose "cancel" in this processing to cancel the settlement processing and finish the processing. This cancellation processing may be used in a case where the settlement processing may not be performed even when inputting a transaction ID correctly, caused by a communication disorder and so on.

The synchronizing server 30 receives the transaction ID transmitted from the user terminal 20, and makes an inquiry to the transaction ID (116).

A "synchronization" of the cashier terminal 10 with the user terminal 20 produced by the inquiry of the transaction ID is described in the following. First, the synchronizing server 30 is on an "access wait" status, which is waiting to be accessed by the user terminal 20 and waiting for the transaction ID to be sent. On this "access wait" status, if a user terminal 20 using the same transaction ID to be allocated to the cashier terminal 10 accesses, the synchronizing server 30 establishes one to one "synchronizing "status between that cashier terminal 10 and the user terminal 20, and realizes a synchronization of the communication to the cashier terminal 10 with the communication to the user terminal 20. Access from a plurality of the user terminals 20 is not matched to one cashier terminal 10 for one transaction ID.

A time out limit is set up for the "access wait" status of the synchronizing server 30 which limits the access wait period with the user terminal 20 to a predetermined length, for example, 3 minutes. When no answer from the user terminal 20 for an issued transaction ID is obtained for a predetermined period, the synchronizing server 30 shuts down the connection to the cashier terminal 10, and it is initialized. This time out function is set up in order to avoid trouble for cases where a user cancels the processing or that a communicating condition of the user terminal 20 with the synchronizing server 30 is poor so that data communication is not able to be performed normally, and so on.

Figure 7:
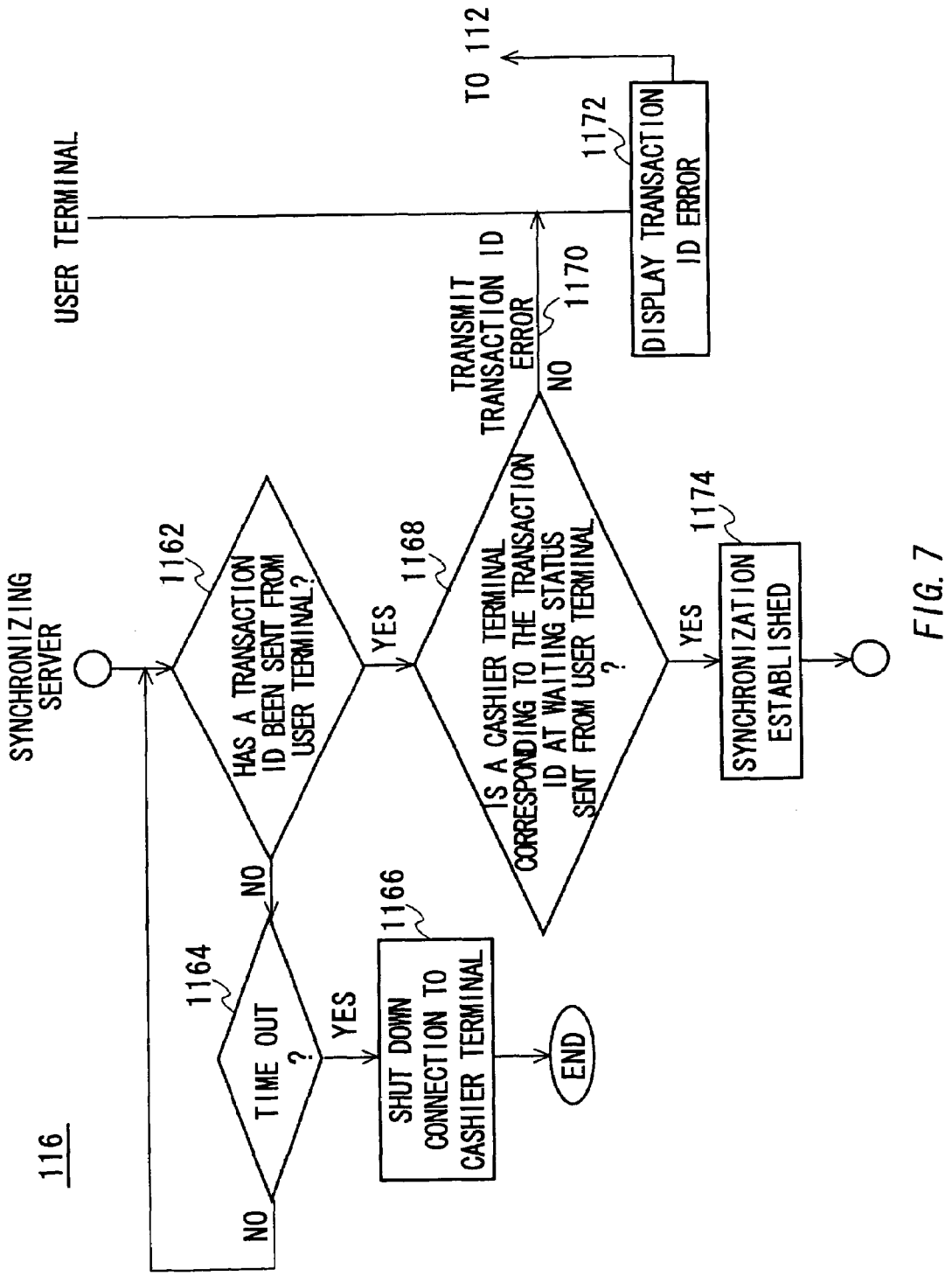
FIG. 7 is a flow chart showing a transaction ID inquiry 116 processing.

Referring to FIG. 7, the transaction ID inquiry 116 processing is described. As shown in FIG. 7, the synchronizing server 30 on the "access wait" status checks if access from the user terminal 20 has existed, and if a transaction ID confirming signal has been sent from the user terminal 20 (1162). If there has been no access, it checks if it exceeds the time out limit (1164), and in a case where it exceeds, it shuts the connection to the cashier terminal 10 down (1166) and finishes the processing. Then, information shown in FIG. 12(b), which indicates the forced termination of the connection, is displayed on the cashier terminal 10.

When the user terminal 20 transmits the transaction ID, it is checked whether a cashier terminal 10 on the "synchronizing wait" status corresponding to the transaction ID is found (1168) and if not, it transmits a synchronizing error message to the user terminal 20 (1170). The user terminal 20 displays the synchronizing error message shown in FIG. 13 (b) on the display (1172). If the user chooses "OK" here, it goes back to the processing 112, the user terminal 20 displays the information shown in FIG. 13 (a) again, and re-input of the transaction ID is prompted to the user.

When a cashier terminal 10, which corresponds to the transaction ID transmitted from the user terminal 20, is found and is on the "synchronizing wait" status, the synchronizing server 30 establishes a "synchronizing" status between the cashier terminal 10 and the user terminal 20 and synchronizes the communication to the cashier terminal 10 with the communication to the user terminal 20 (1174).

Referring back to FIG. 5 again, when the synchronization is established, the synchronizing server 30 sends a synchronizing signal to the cashier terminal 10 (118). The cashier terminal 10 receives the synchronizing signal from the synchronizing server 30 and lights a synchronization indicator 706 on the cashier terminal 10 (120). With this indicator, the clerk may tell if the synchronization is established.

When the synchronization starts, the synchronizing server 30 sends to the user terminal 20 the cashier terminal information retrieved from the cashier database 50 in the cashier terminal information inquiry 104. The user terminal 20 displays the information shown in FIG. 13 (c), and prompts the user to confirm the synchronized cashier terminal (124). When the user chooses "cancel", the processing goes back to the input of the transaction ID 112 processing. This cancellation is used when the user inputted an incorrect transaction ID and synchronizes with an incorrect cashier so that the settlement processing needs to be canceled and so on.

When the user chooses "OK" in FIG. 13 (c) displayed on the user terminal 20 and confirms the cashier terminal information, the user terminal 20 transmits a cashier terminal information confirmation signal to the synchronizing server 30 (126). The synchronizing server 30, receiving the cashier terminal information confirmation signal transmitted from the user terminal 20, performs the user information inquiry 128 processing.

Figure 8:
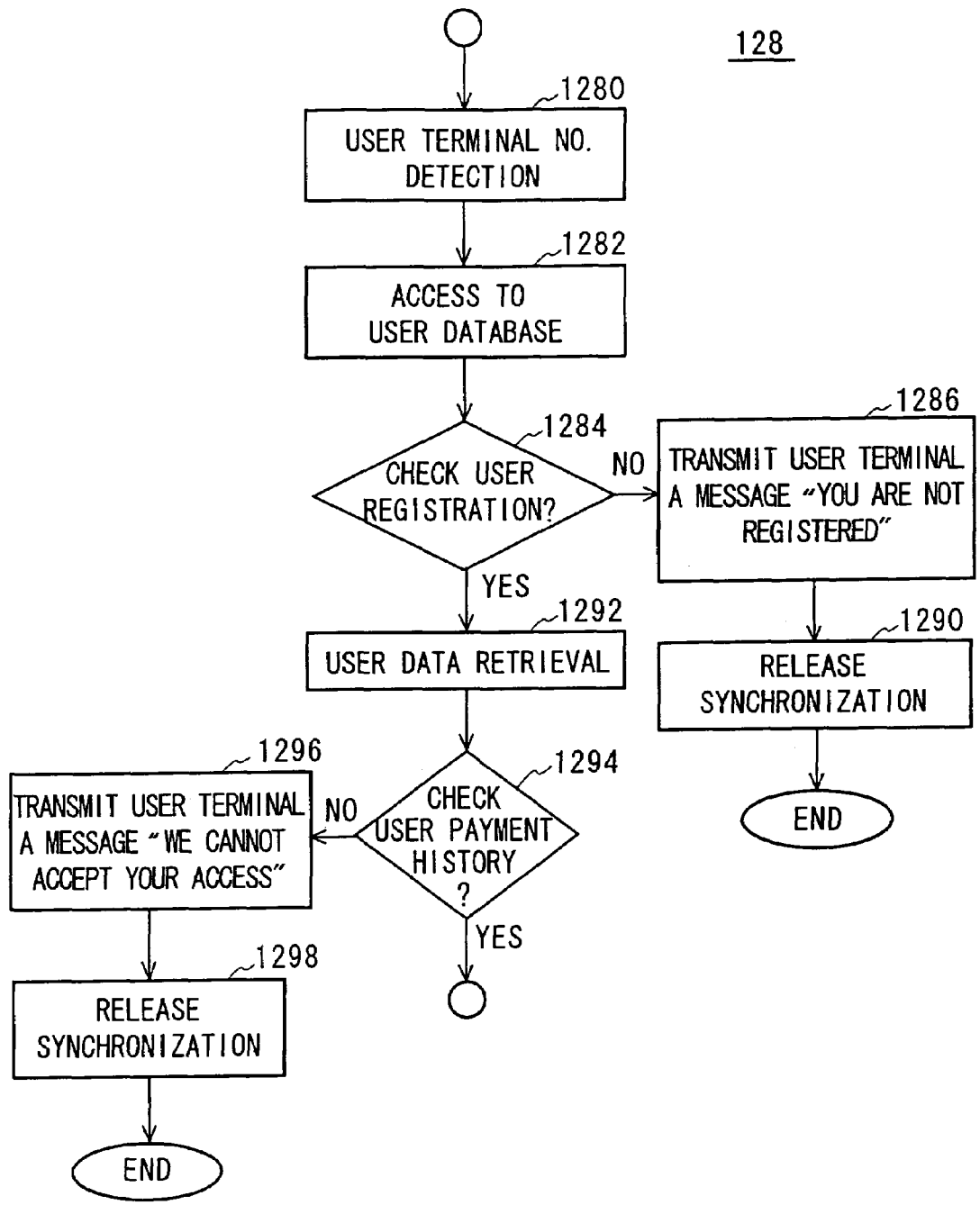
FIG. 8 is a flow chart showing a user data inquiry 128 processing.

Referring to FIG. 8, the processing of the user data inquiry 128 will be described. The synchronizing server 30 retrieves a user terminal number from a user terminal 20 (1280). When the user terminal 20 is a cellular phone, the user terminal number is the calling telephone number. The synchronizing server 30 accesses the user database 60 (1282) and checks if the user terminal 20 is registered based on the user terminal number (1284). When the user terminal is not registered, the synchronizing server 30 transmits to the user terminal 20 a message "you are not registered." (1286). Information shown in FIG. 13(d) notifying that the user does not have user registration is displayed on the user terminal 20. The synchronizing server 30 releases the synchronization of the cashier terminal 10 with the user terminal 20 (1290) and finishes the processing.

When the user registration is verified, user data is retrieved from the user database 60 (1292). Information about the payment history of the user is included in the user data. Whether the user has a problem with his or her payment history on his or her credit card or bankcard and so on is checked based on the information (1294). When any problem is found in his or her payment history, a message "we cannot accept your access." is transmitted to the user terminal 20 (1296). Information notifying that settlement is rejected, as shown in FIG. 13 (e), is displayed on the user terminal 20. The synchronizing server 30 releases the synchronization of the cashier terminal 10 with the user terminal 20 (1298) and finishes the processing.

When the user has no problem with his or her credit history, the synchronizing server 30 goes to the next step. Referring back to FIG. 5, the synchronizing server 30 performs a "synchronizing multiple authentication" based on the cashier terminal information inquiry 104. The synchronizing multiple authentication is an authentication having a plurality of authentication stages being performed between the cashier terminal 10 and the user terminal 20. The synchronizing server 30 performs the synchronizing multiple authentication after the synchronization with both the cashier terminal 10 and the user terminal 20 is established. Between the cashier terminal 10 and the user terminal 20, information for authentication is not sent directly to each other, but the information for authentication is sent between the cashier terminal 10 and the synchronizing server 30, and between the user terminal 20 and the synchronizing server 30. Because the synchronizing server 30 intermediates the authentications, the clerk may authenticate the user of the user terminal 20 with no exchange of personal information between the user and the clerk.

The synchronizing multiple authentication processing is described in a case where the visual authentication is adopted in the cashier terminal information inquiry 104. The synchronizing server 30 retrieves a user facial portrait image from the user database 60 in the user information inquiry 128, and transmits the facial portrait image data to the cashier terminal 10 (130). The cashier terminal 10 receives the user facial portrait image data from the synchronizing server 30, and performs the visual authentication (132).

Figure 9:
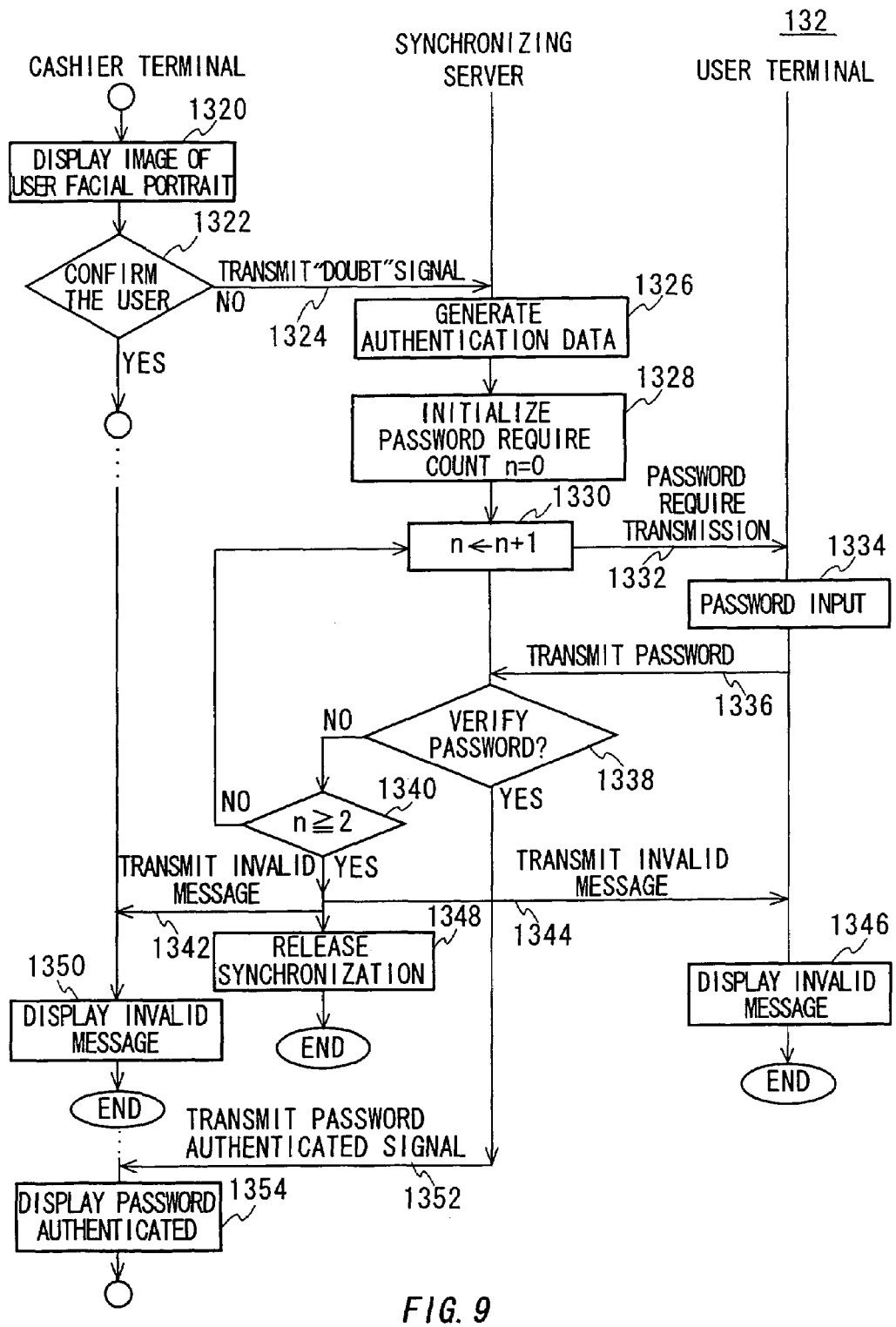
FIG. 9 shows a flow chart of a visual authentication 132 processing.

FIG. 9 shows the visual authentication 132 processing. The cashier terminal 10 displays a facial portrait image of the user (1320). FIG. 12 (d) shows an example of information displayed on the cashier terminal 10. The clerk verifies the user and the displayed facial portrait, and authenticates the user (1322). When the clerk is not able to ensure the user authentication or the payment is expensive, the clerk chooses "DOUBT" as displayed in FIG. 12 (*d*), and the cashier terminal 10 transmits a DOUBT signal to the synchronizing server 30 (1324). In this case, the cashier terminal 10 displays information that shows the password authentication is being processed such as shown in FIG. 12 (*e*) When the clerk chooses "OK" as displayed in FIG. 12 (*d*), the visual authentication 132 processing is completed.

In order to perform the password authentication, the synchronizing server 30, receiving the "DOUBT" signal from the cashier terminal 10, retrieves data necessary for authentication from the user database 60 and generates authentication data (1326). The synchronizing server 30 initializes a password require count variable n, which stores the password require count, to 0 (1328). The synchronizing server 30 increments n to n+1 (1330) and transmits a password request message to the user terminal 20 (1332). Information shown in FIG. 13(*f*) is displayed on the user terminal 20. The user inputs the password (1334). The user terminal 20 transmits the password inputted by the user to the synchronizing server 30 (1336). The synchronizing server 30 receives the password transmitted from the user terminal 20 and verifies the password (1338).

When the password transmitted from the user terminal 20 is incorrect, it is checked whether the required password count n is 2 or more (1340), if not, it goes back to the processing of 1330 and requests the password again. If the required password count n is 2 or more, an invalid message is transmitted to the user terminal 20 (1344). Because the authentication is not confirmed, information shown in FIG. 13(*g*) that the settlement service is not available is displayed on the user terminal 20 (1346). Also, an invalid message is transmitted to the cashier terminal 10 (1342). The cashier terminal 10 displays the information indicating that the password authentication is invalid (1350), and finishes the processing. The synchronizing server 30, after sending the invalid message to the user terminal 20 and the cashier terminal 10, releases the synchronization of the cashier terminal 10 with the user terminal 20 (1348).

In the password inquiry 1338 of the password authentication, if the synchronizing server 30 confirms the password, the synchronizing server 30 transmits to the cashier terminal 10 a password authentication OK signal (1348). The cashier terminal 10 displays information shown in FIG. 12 (*f*) indicating the completion of the password authentication (1350), and the visual authentication processing 132 is finished.

Referring back to FIG. 5, after the cashier terminal 10 finishes the visual authentication processing 132, the cashier terminal 10 transmits to the synchronizing server 30 purchase amount information, including the purchase amount (134). The synchronizing server 30, receiving the purchase amount information from the cashier terminal 10, performs available amount check processing 136.

Referring to FIG. 10, the processing of the available amount checking 136 will be described as follows. The synchronizing server 30 compares the purchase amount transmitted from the cashier terminal 10 with the available amount limit retrieved from the user database 60 in the user data inquiry 128 (1362). If the purchase amount does not exceed the available amount limit, the inquiry processing is finished. If the purchase amount exceeds the available amount limit, a message "your purchase exceeds your available amount limit" is transmitted to the user terminal 20 (1364). The synchronizing status of the cashier terminal 10 with the user terminal 20 is released (1366). Then, information shown in FIG. 13(*h*) is displayed on the user terminal 20.

Referring back to FIG. 5 again, the processing after the available amount checking 136 is completed will be described. The synchronizing server 30 transmits purchase amount information including the purchase amount to the user terminal 20 (138). The user terminal 20, receiving purchase amount information from the synchronizing server 30, performs the processing of the final purchase confirmation 140.

Referring to FIG. 11, the processing of the final purchase confirmation 140 will be described as follows. The user terminal 20 displays information shown in FIG. 13(*i*) in order to display the purchase amount (1402). The user confirms if the purchase amount is correct (1404). If correct, the user chooses "OK" on the display and finishes the processing of the final purchase confirmation 140. If the purchase amount is incorrect, the user chooses to "cancel". When the user chooses to "cancel", information which shows the settlement is canceled, as shown in FIG. 13(*j*), is displayed on the user terminal 20 (1406), and the user terminal 20 transmits a cancel signal to the synchronizing server 30 (1408). The synchronizing server 30, receiving the cancel signal from the user terminal 20, transmits a cancel signal to the cashier terminal 10 (1410). The cashier terminal 10 cancels the settlement, displays information shown in FIG. 12(*g*) which indicates that the settlement is canceled by the user, and finishes the processing (1412). The synchronizing server 30, after transmitting the cancel signal to the cashier terminal 10, releases the synchronization of the communication to the cashier terminal 10 with the communication to the user terminal 20 (1414).

Referring back to FIG. 5 again, the processing after the final purchase confirmation 140 is finished will be described. The user terminal 20 transmits a final purchase confirmation signal to the synchronizing server 30 (142). The synchronizing server 30, receiving the final purchase confirmation signal from the user terminal 20, accesses the user account database 70 and performs the settlement processing which records the purchase information (144). When the settlement is completed, the synchronizing server 30 transmits a settlement completion notification to the cashier terminal 10 (146), and transmits a receipt to the user terminal 20 (150). The cashier terminal 10 displays information shown in FIG. 12(*h*) of the completion of the settlement (148). The user terminal 20 displays information shown in FIG. 13(*k*) to show completion of the settlement (152).

In the above described settlement processing, when the synchronizing server 30 transmits the settlement completion notification 146 to the cashier terminal 10, the synchronizing server 30 may retrieve a part of the attribute information about the user of the user terminal 20 which performs the payment of the settlement from the user database 60, and may transmit the information to the cashier terminal 10. The attribute information about the user transmitted to the cashier terminal 10 preferably may be information about sex or age of a user and so on. On the other hand, personal information such as a name, an address, and a credit card number is not suitable to be included in the attribute information. The cashier terminal 10 obtains the attribute information so that the retailer may retrieve the information about the user who performed the payment of the settlement, and may store the information about the item and the user data. Thus, the cashier terminal 10 may form a purchase history database in the retailer's database. The retailer may detect buying behavior, such as an age group for users of a certain item from the purchase history stored in the database, for marketing.

When the synchronizing server 30 receives the purchase amount of items from the cashier terminal 10, the synchronizing server 30 may also receive the name and/or price of purchased items and detailed information of purchased items. The synchronizing server 30 may store this information in the user database 60 as a user purchase history. The user terminal 20 may inquire about the user purchase history to the synchronizing server 30, and receive the user purchase history from the synchronizing server 30.

The function and performance of the settlement processing for the electronic settlement system applying the present embodiment is described above. In the interaction of the above described settlement, if there is any communication trouble such as an interruption of communication, all of the information and temporally data about the processing are initialized and the processing is finished.

In the settlement processing described above, the clerk orally tells the transaction ID to the user or shows the user the transaction ID displayed on the user-side indicating unit 700 on the cashier terminal 10. But, the method to tell the transaction ID to the user or the user terminal 20 is not limited to these examples. The transaction ID received by the cashier terminal 10 may be sent from the infrared communicating unit 708 of the cashier terminal 10 to the infrared communication unit 808 of the user terminal 20. Thus, the user does not need to input a transaction ID into the user terminal 20, therefore the miss-input of the transaction ID is avoided. Furthermore, as a means to transmit the transaction ID from the cashier terminal 10 to the user terminal 20, a radio communication unit, the cashier terminal 10, and the user terminal 20 may have a wireless communication unit as an example of a short range communication unit, and using wireless communication for a portable terminal such as Bluetooth, sends transaction ID to each other.

The cashier terminal information inquiry 104 processing, the transaction ID inquiry 116 processing, the user information inquiry 128 processing, available limit inquiry 136 processing, and the settlement processing 144 processing, which are performed by the synchronizing server 30 in the above described settlement processing, is actually performed by the settlement processing unit 80 and data retrieving unit 86 of the synchronizing server 30.

The receiving of the access from the cashier terminal 10 102 processing, transaction ID transmission to the cashier terminal 10 106 processing, sending the synchronizing signal to the cashier terminal 10 118 processing, sending the user facial portrait image to the cashier terminal 10 130 processing, receiving the purchase amount information from the cashier terminal 10 134 processing, and notification of the settlement completion 146 processing, as the data communication processing of the synchronizing server 30 with the cashier terminal 10, are performed by a first communication unit 82 of the synchronizing server 30.

The receiving of the transaction ID from the user terminal 20 114 processing, sending to the user terminal 20 the cashier terminal information 122 processing, receiving from the user terminal 20 the cashier terminal information confirmation signal 126 processing, transmitting to the user terminal 20 purchase amount information 138 processing, receiving from the user terminal 20 the final purchase confirming signal 142 processing, and the notification of receipt to the user terminal 20 150 processing, as the data communication processing of the synchronizing server 30 with the user terminal 20, are performed by a second communication unit 84 of the synchronizing server 30.

The "synchronizing multiple authentication" applied in the electronic settlement system of the present embodiment is complemented here. The present embodiment may multiply authentication, which means a combination of a plurality of the authentication methods. Applying the synchronizing multiple authentication method, the user previously registers a plurality of passwords to the user database 60. A four-digit number is usually used for a personal identification number for a credit card or a bankcard. A user often chooses a simple combination of numbers, his or her birth date, telephone number, and so on, in order not to forget. Other people may easily guess the number so that the number suffers from a false use. Applying the "synchronizing multiple authentication" method, the user previously registers a plurality of personal information not known by others such as his or her mother's maiden name, name of grandfather or grandmother, name of his or her domicile of origin town, and so on. The synchronizing server 30 chooses at least one of the pieces of registered information, and transmits to the user terminal 20 a question which is asked to the user about the chosen registered information. Only the original owner of the user terminal 20 may answer the randomly chosen question. Thus, when the authentication using a facial portrait is not enough, further inquiries about a password or personal information are used so that the accuracy of the authentication may be improved. For the user, without using a combination of numbers difficult to remember, personal inerrable information that is not known by others and hard to forget may be used for his or her password. Because the synchronizing server 30 intermediates the authentication between the user terminal 20 and the cashier terminal 10, no password information is sent from the user terminal 20 to the cashier terminal 10. Thus, the user's password is not known by the clerk, therefore the user may use the password without suffering from a false use.

Applying the electronic settlement system of the present embodiment, the clerk of the retailer authenticates the user with facial portrait data. The clerk further requests the user to input a password, and accuracy of authentication may be improved corresponding to the importance of a situation such as a doubtful case or for an expensive settlement. The user, using a portable apparatus having a wireless communication function such as a cellular phone or a portable terminal, may settle a transaction simply, conveniently, and safely.

SECOND EMBODIMENT

An electronic settlement system according to the second embodiment of the present invention will be explained as follows. Applying the electronic settlement system of the present embodiment, a user, who reads a mail order advertisement in a newspaper, a magazine, a mail order catalog and so on, may order an item and execute a settlement via a network using a user terminal such as a portable telephone or a portable terminal.

Figure 14:
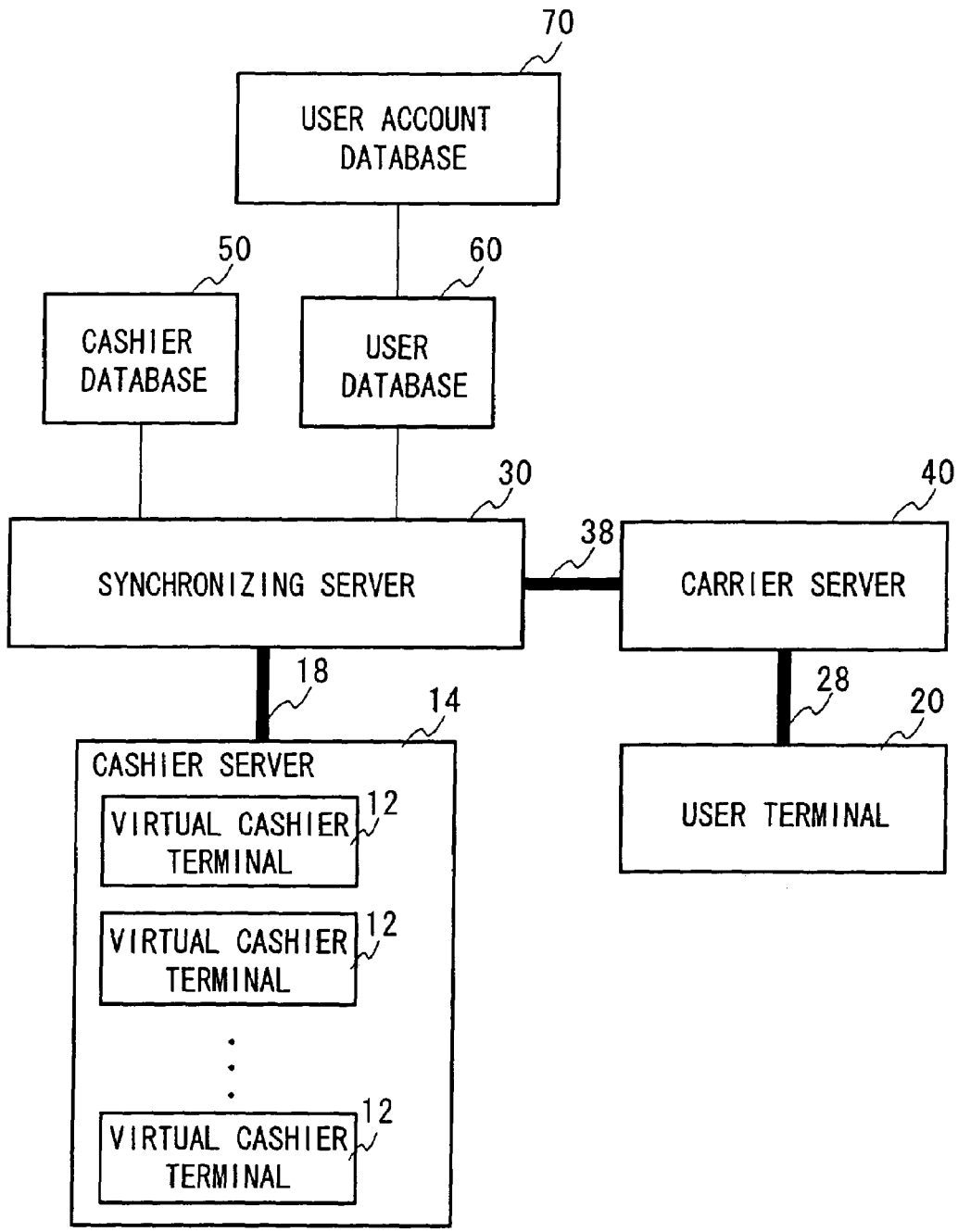
FIG. 14 is a block diagram showing a configuration of an electronic settlement system of a second embodiment of the present invention.

FIG. 14 is a block diagram showing a configuration of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

The cashier server 14 is a server system to represent distribution in a mail order, which is composed of virtual cashier terminals 12 in the server and performs billing of transactions to users.

The synchronizing server 30 performs a settlement of a commodity transaction processing between mail order retailers and users. The synchronizing server 30 connects the cashier server 14 with the user terminal 20 via a communication network and performs data communication.

As shown in FIG. 14, the virtual cashier terminal 12 in the cashier server 14 is connected to the synchronizing server 30 via the communication line 18 and performs data communication.

The user terminal 20 connects to the carrier server 40 via the radio communication channel 28. The carrier server 40 connects to the synchronizing server 30 via the communication line 38. A direct communicating means does not exist between the virtual casher terminal 12 and the user terminal 20.

The synchronizing server 30 acquires information about the billing of a commodity transaction by communicating to the virtual cashier terminal 12, and information about the paying of a commodity transaction by communicating to the user terminal 20. The synchronizing server 30 processes the settlement of transactions between the virtual cashier terminal 12 and the user terminal 20 by synchronizing the communication to the virtual cashier terminal 12 with the communication to the user terminal 20.

The other components marked the same as in FIG. 1 will not be described here because these components have the same performance and construction as the first embodiment.

FIG. 15 shows an example of a mail order catalog. A transaction ID in order to identify the mail order retailer and item numbers for each item is written in the catalog. A user checks such a mail order catalog, orders the item, and performs a settlement processing using a user terminal 20.

Figure 16:
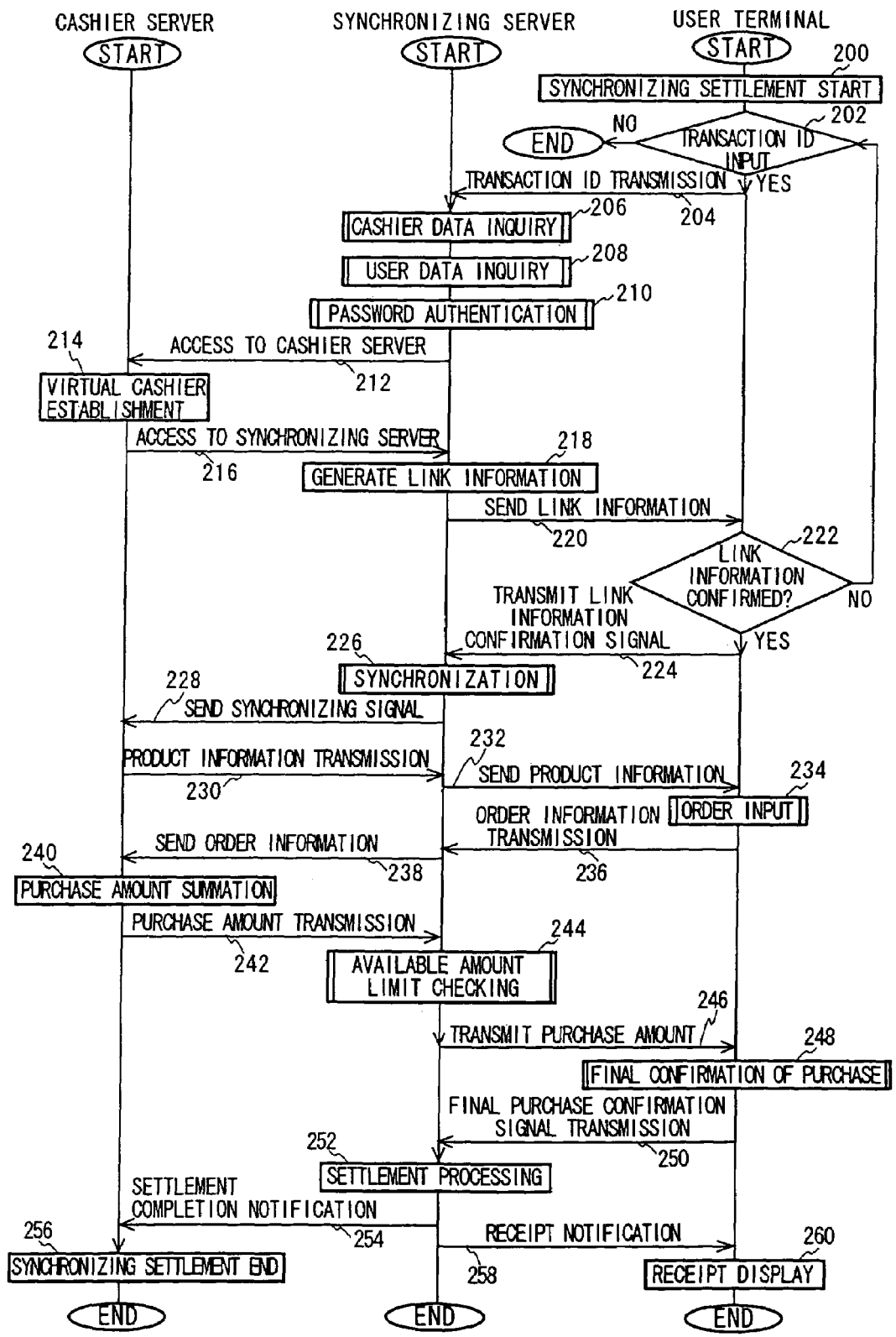
FIG. 16 is a flow chart showing a settlement processing in an electronic settlement system of the second embodiment.
Figure 22:
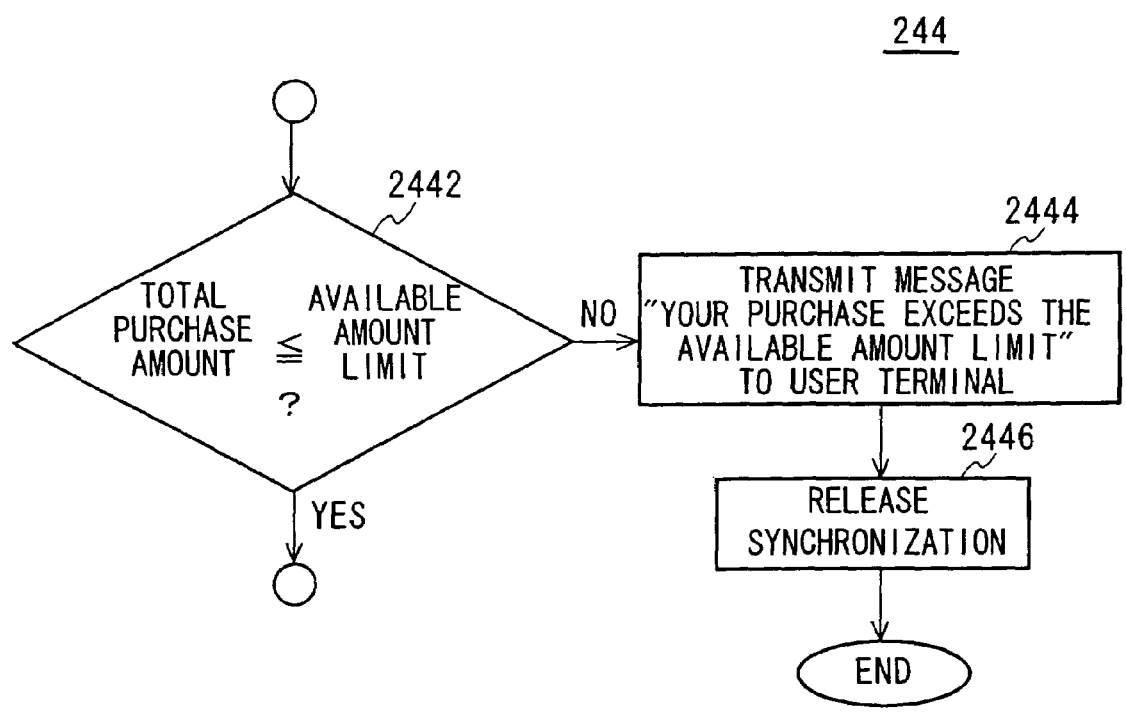
FIG. 22 is a flow chart showing an available amount checking 244 processing.
Figure 23:
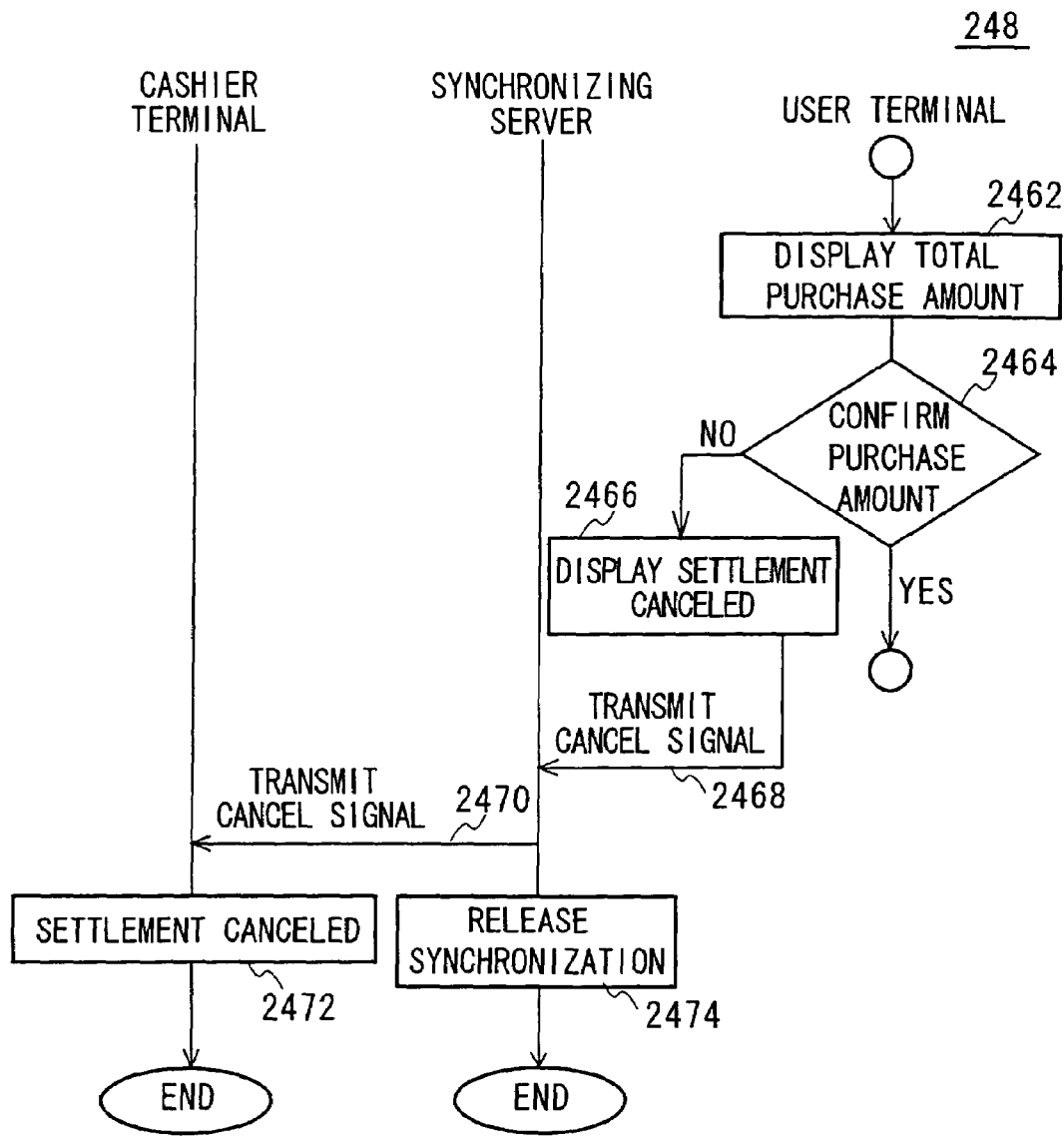
FIG. 23 is a flow chart showing a final purchase confirmation 248 processing.
Figure 24:
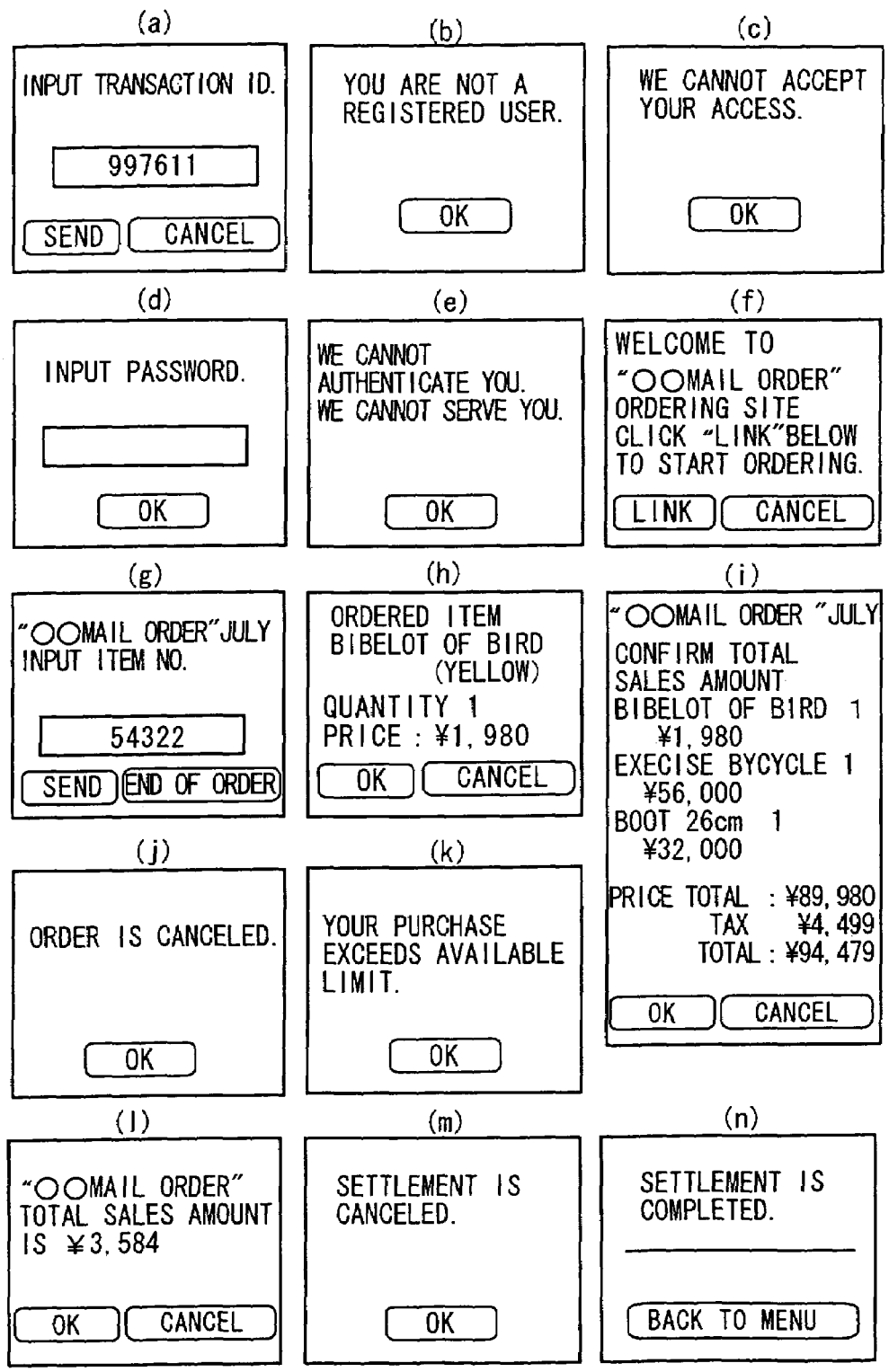
FIG. 24 shows examples of information indicated on a display unit 802 of a user terminal 20.

Referring to FIG. 16 to FIG. 24, processing of the electronic settlement of the present embodiment, which a user settles a payment with the electronic settlement system using a user terminal, is described as follows. FIG. 16 is a flow chart showing a settlement processing in an electronic settlement system of the present embodiment. FIG. 17 to FIG. 24 are flow-charts showing details of processing in FIG. 16. FIG. 24 shows examples of information displayed on a display unit 802 of a user terminal 20.

Referring to FIG. 16, processing of the electronic settlement is described as follows. A user starts electronic settlement by choosing a settlement menu from a user terminal 20 (200). Information prompting a user to input a "transaction ID", as shown in FIG. 24(*a*), is displayed on the user terminal 20. The user inputs the transaction ID listed in a mail order advertisement or a catalog (202). In the present embodiment the transaction ID is a number in order to identify a cashier server 14 performing a mail order distribution.

When the user chooses "send" in the transaction ID input information, the user terminal 20 is connected to the synchronizing server 30. The transaction ID is transmitted to the synchronizing server 30 (204). The user may choose "cancel" in the transaction ID input information if he or she wants to quit the settlement processing. This cancellation processing may be used in a case where the settlement processing may not be performed even when inputting a transaction ID correctly, caused by a communicating disorder and so on.

The synchronizing server 30 receives the transaction ID transmitted from the user terminal 20, and using the transaction ID, makes an inquiry to a cashier data (206).

Figure 17:
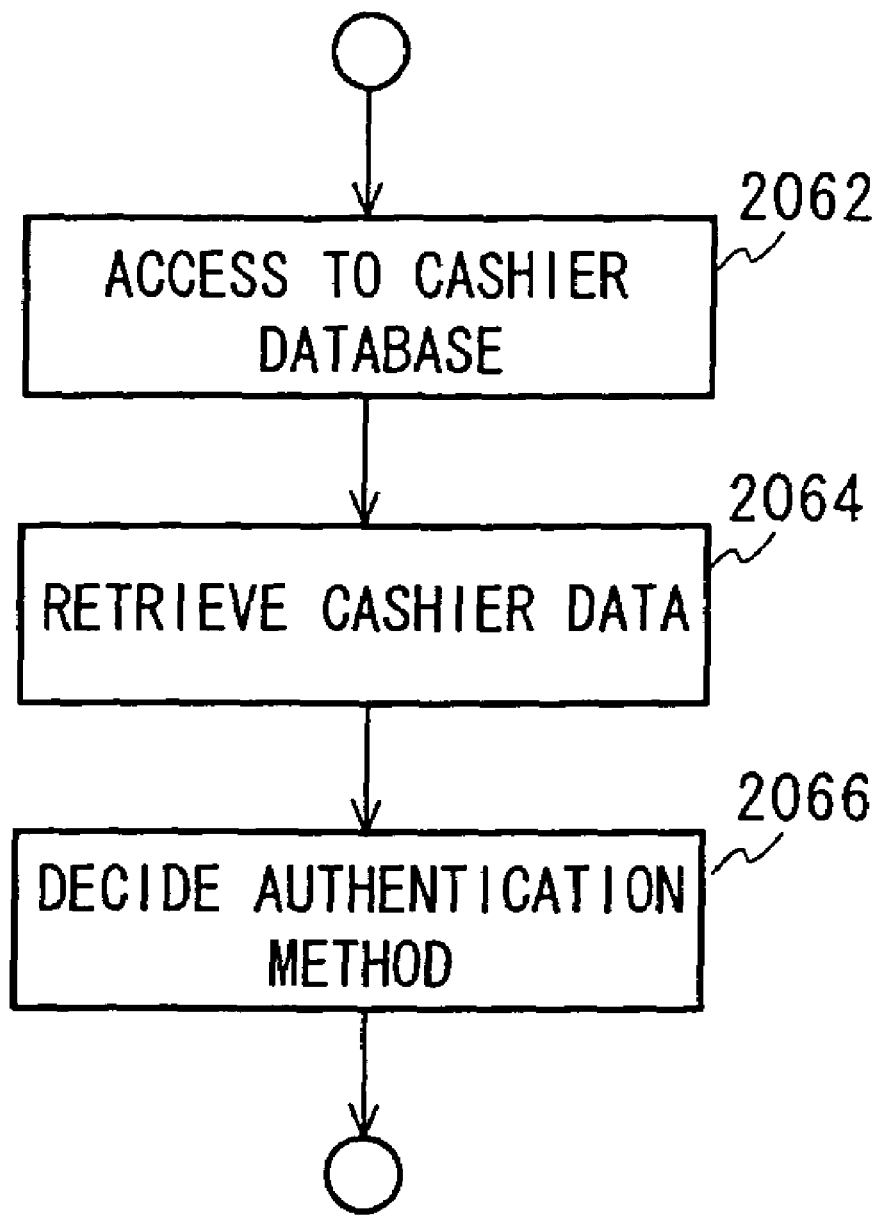
FIG. 17 is a flow chart showing a cashier data inquiry 206 processing.

Referring to FIG. 17, a processing of cashier data inquiry 206 is described as follows. The synchronizing server 30 accesses the cashier database 50 (2062) and retrieves cashier data that matches the transaction ID (2064). Information such as a retailer name, an authentication method, and an access number to the cashier server are registered as cashier data. The authentication method may be chosen from a voice authentication method, a password authentication method, and so on. The cashier data includes authentication methods to be used. The synchronizing server 30 decides to adopt the authentication method registered in the cashier data (2066). Here, a case in which it was decided that a password authentication method is to be adopted as an authentication method is described as follows.

Figure 18:
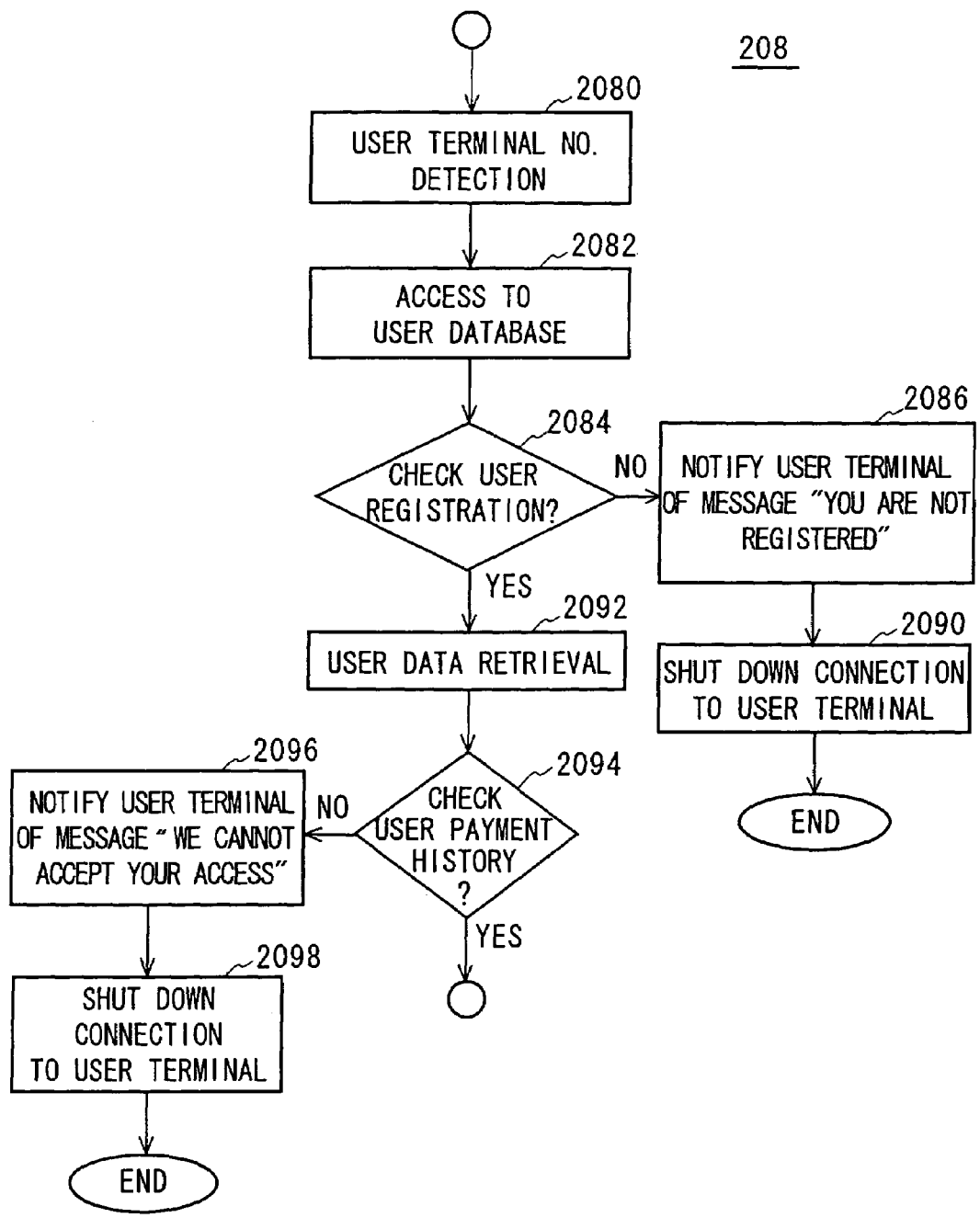
FIG. 18 is a flow chart showing a user data inquiry 208 processing.

Referring to FIG. 16 again, the synchronizing server 30 next processes the user data inquiry 208. Referring to FIG. 18, the processing of the user data inquiry 208 will be described. The synchronizing server 30 retrieves a user terminal number from user terminal 20. When the user terminal 20 is a cellular phone, a user terminal number is the calling telephone number. The synchronizing server 30 accesses the user database 60 (2082) and checks if the user terminal 20 is registered based on the user terminal number (2084). When the user terminal is not registered, the synchronizing server 30 transmits to the user terminal 20 a message "you are not registered." (2086). Information, notifying that the user does not have user registration, shown in FIG. 24(*b*), is displayed on the user terminal 20. The synchronizing server 30 shuts the connection to the user terminal 20 down (2090) and finishes the processing.

When the user registration is verified, user data is retrieved from the user database 60 (2092). Information about the payment history of the user is recorded in the user data. If the user has a problem in his or her payment history on his or her credit card, or his or her bankcard, and so on, it is checked based on the information (2094). When any problem is found in his or her payment history, a message "we cannot accept your access." is transmitted to the user terminal 20 (2096). Information notifying that settlement is rejected, shown in FIG. 24(*c*), is displayed on the user terminal 20. The synchronizing server 30 shuts the connection to the user terminal 20 down (2098), and finishes the processing.

Figure 19:
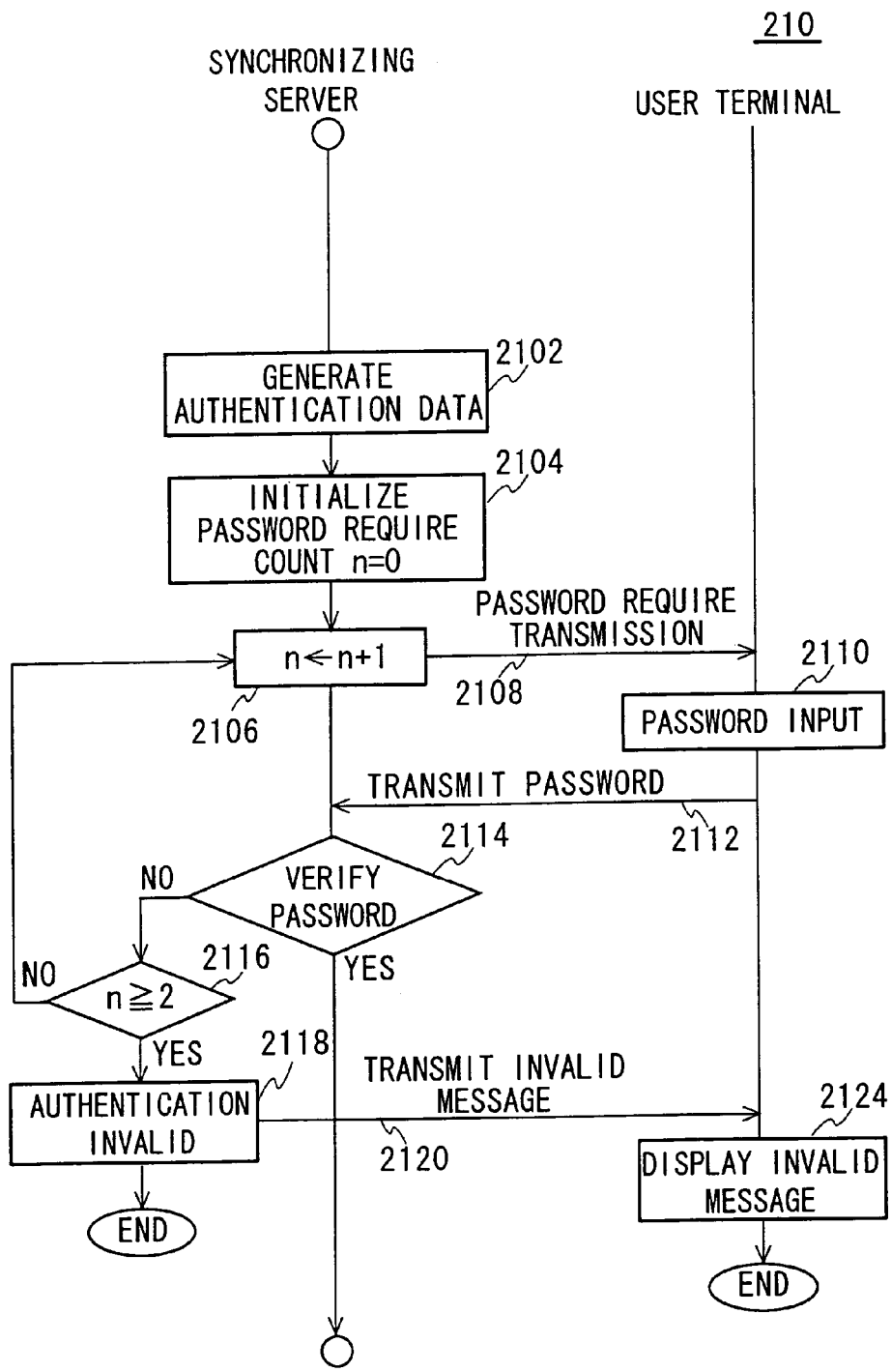
FIG. 19 is a flow chart showing a password authentication 210 processing.

Referring to FIG. 16 again, the synchronizing server 30 next processes the password authentication 210. Referring to FIG. 19, the processing of the password authentication 210 will be described as follows. The synchronizing server 30 authenticates the user terminal based on the authentication method decided in the user data inquiry 206. Here, a case that the password authentication is chosen for the authentication method is described as follows. In order to perform the password authentication, the synchronizing server 30 retrieves data necessary for authentication from the user database 60 and generates authentication data (2102). The synchronizing server 30 initializes a password require count variable n, which stores the password require count, to 0 (2104). The synchronizing server 30 increments n to n+1 (2106) and transmits a password request message to the user terminal 20 (2108). Information shown in FIG. 24(*d*) is displayed on the user terminal 20. The user inputs the password (2110). The user terminal 20 transmits the password inputted by the user to the synchronizing server 30 (2112). The synchronizing server 30 receives the password transmitted from the user terminal 20 and verifies the password (2114).

When the password transmitted from the user terminal 20 is incorrect, it is checked whether the required password count n is 2 or more (2116), if not, it goes back to the processing of 2106 and requests the password again. If the required password count n is 2 or more, the authentication processing is finished (2118) and an invalid message is transmitted to the user terminal 20 (2120). Because the authentication is not confirmed, information shown in FIG. 24(e) that the settlement service is not available is displayed on the user terminal 20 (2124).

In the password verification 2114, when the synchronizing server 30 verifies the correct password, the processing of the password authentication 210 is finished.

Referring back to FIG. 16 again, the synchronizing server 30 accesses the cashier server 14 using the access number for the cashier server that is retrieved in the processing of the cashier data inquiry 206 (212). The cashier server 14 activates the virtual cashier terminal 12 configured in the cashier server 14 (214). The virtual cashier terminal 12 is an apparatus or a processing working as a cashier terminal, and may be a terminal device provided in the cashier server or a program activated in the cashier server. The virtual cashier terminal 12 accesses the synchronizing server 30 (216).

The synchronizing server 30 creates "link information" (218) The link information includes cashier server identifying information to identify a virtual cashier terminal 12 connected to the synchronizing server 30 and cashier identifying information to identify the cashier server 14, such as the name of the retailer and a welcome message. The synchronizing server 30 sends the link information to the user terminal 20 (220). The user terminal 20, receiving the link information from the synchronizing server 30, displays the welcome message shown in FIG. 24(f) on the display. The user may confirm, by looking at this information, whether the site is the correct mail order site he or she wanted to connect to. When the user chooses "link" on the information, the user terminal 20 transmits a link information confirming signal to the synchronizing server 30 (224). The link information confirming signal includes the cashier terminal identifying information to identify the virtual cashier terminal 12 included in the link information.

When the user chooses "cancel" at this point, the electronic settlement may be canceled. This cancellation processing is performed in such a case that the user inputted a wrong transaction ID and an unwanted mail order site is shown in the display and so on.

Figure 20:
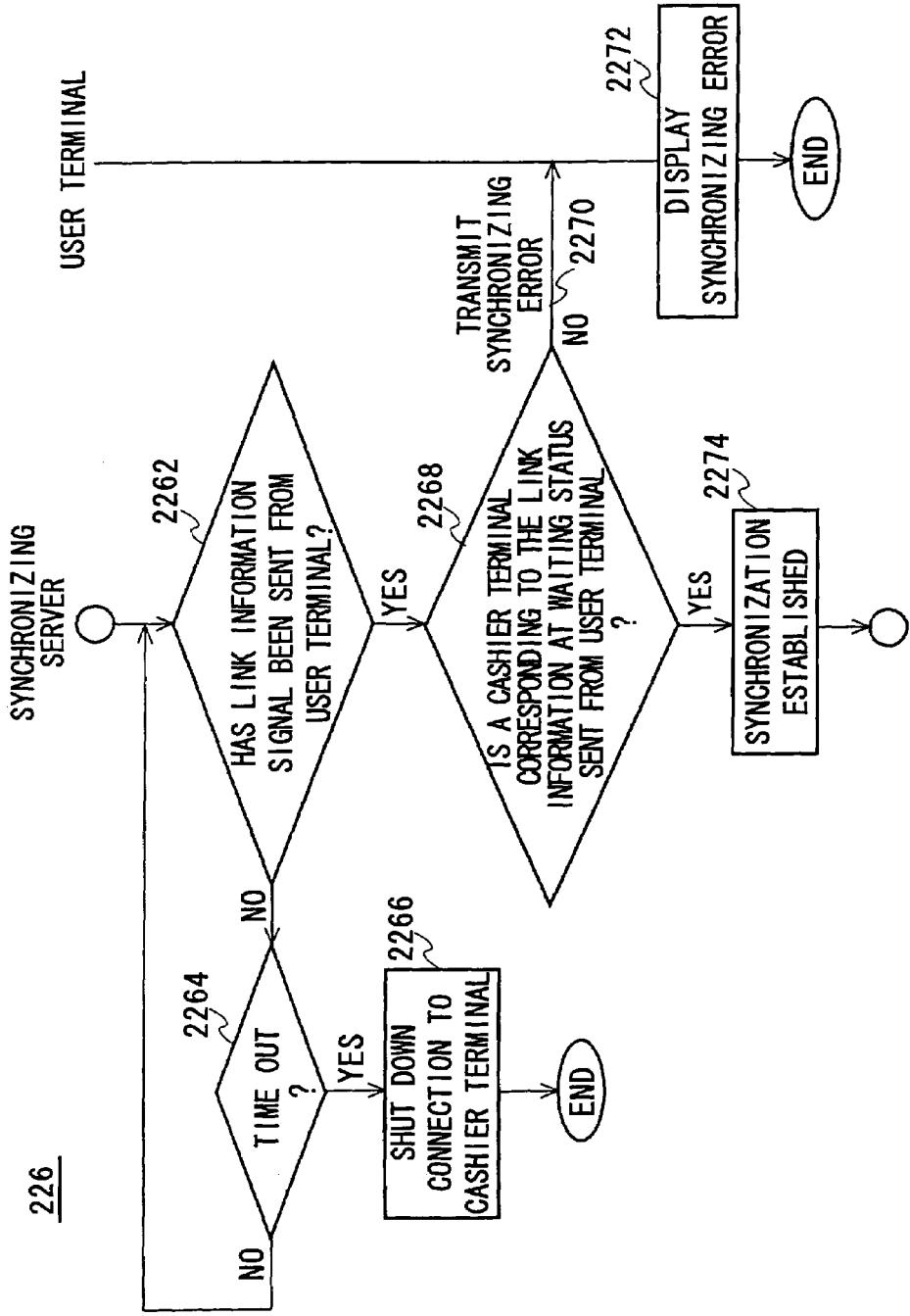
FIG. 20 is a flow chart showing synchronization 226 processing.

The synchronizing server 30 establishes synchronization when a link information confirming signal is received from the user terminal 20 (226). Referring to FIG. 20, a processing of the synchronization 226 will be described as follows.

The user terminal 20 transmits the link information confirming signal corresponding to the link information sent from the synchronizing server 30, so that the synchronizing server 30 establishes "synchronizing" status.

First, the synchronizing server 30 is on an "access wait" status, that is waiting to be accessed by the user terminal 20 and waiting for a link information confirming signal to be sent. In this "access wait" status, if a user terminal 20 using the same link information to be allocated to the virtual cashier terminal 12 accesses, the synchronizing server 30 establishes one to one "synchronizing" status between that virtual cashier terminal 12 and the user terminal 20, and realizes a synchronization of the communication to the virtual cashier terminal 12 with the communication to the user terminal 20. Access from a plurality of the user terminals 20 will not be matched for one link information.

A time out limit is set up for the "access wait" status of the synchronizing server 30, and limits the access wait period with the user terminal 20 to a predetermined length, for example, 3 minutes. When no answer is obtained for the link information issued from the user terminal 20 until the time out limit, the synchronizing server 30 shuts down the connection to the virtual cashier terminal 12, and initializes it. This time out function is set up in order to avoid trouble for cases where a user cancels the processing or that a communicating condition of the user terminal 20 with the synchronizing server 30 is poor so that data communication cannot be performed normally, and so on.

As shown in FIG. 20, the synchronizing server 30 on the "access wait" status checks if access from the user terminal 20 has existed, and if a link information confirming signal has been sent from the user terminal 20 (2262). If there has been no access, it checks if it exceeds the time out limit (2264), in a case where it exceeds, shuts the connection to the virtual cashier terminal 12 down (2266), and finishes the processing.

When the user terminal 20 transmits the link information confirming signal, it is checked whether a virtual cashier terminal 12 on the "synchronizing wait" status corresponding to that link information is found (2268), if not, it transmits a synchronizing error message to the user terminal 20 (2270). The user terminal 20 displays the synchronizing error message on the display (2272), and then the user terminal 20 shuts the settlement processing down, and finishes the settlement.

When a virtual cashier terminal 12, which corresponds to the link information transmitted from the user terminal 20, is found and on the "synchronizing wait" status, the synchronizing server 30 establishes a "synchronizing" status between that virtual cashier terminal 12 and the user terminal 20 and synchronizes the communication with the virtual cashier terminal 12 and the communication to the user terminal 20 (2274).

Referring back to FIG. 16 again, when the synchronization is established, the synchronizing server 30 sends a synchronizing signal to the virtual cashier terminal 12 (228). The virtual cashier terminal 12 receives the synchronizing signal from the synchronizing server 30 and transmits product information for mail ordering (230). The synchronizing server 30 sends the product information received from the virtual cashier terminal 12 to the user terminal 20 (232).

Figure 21:
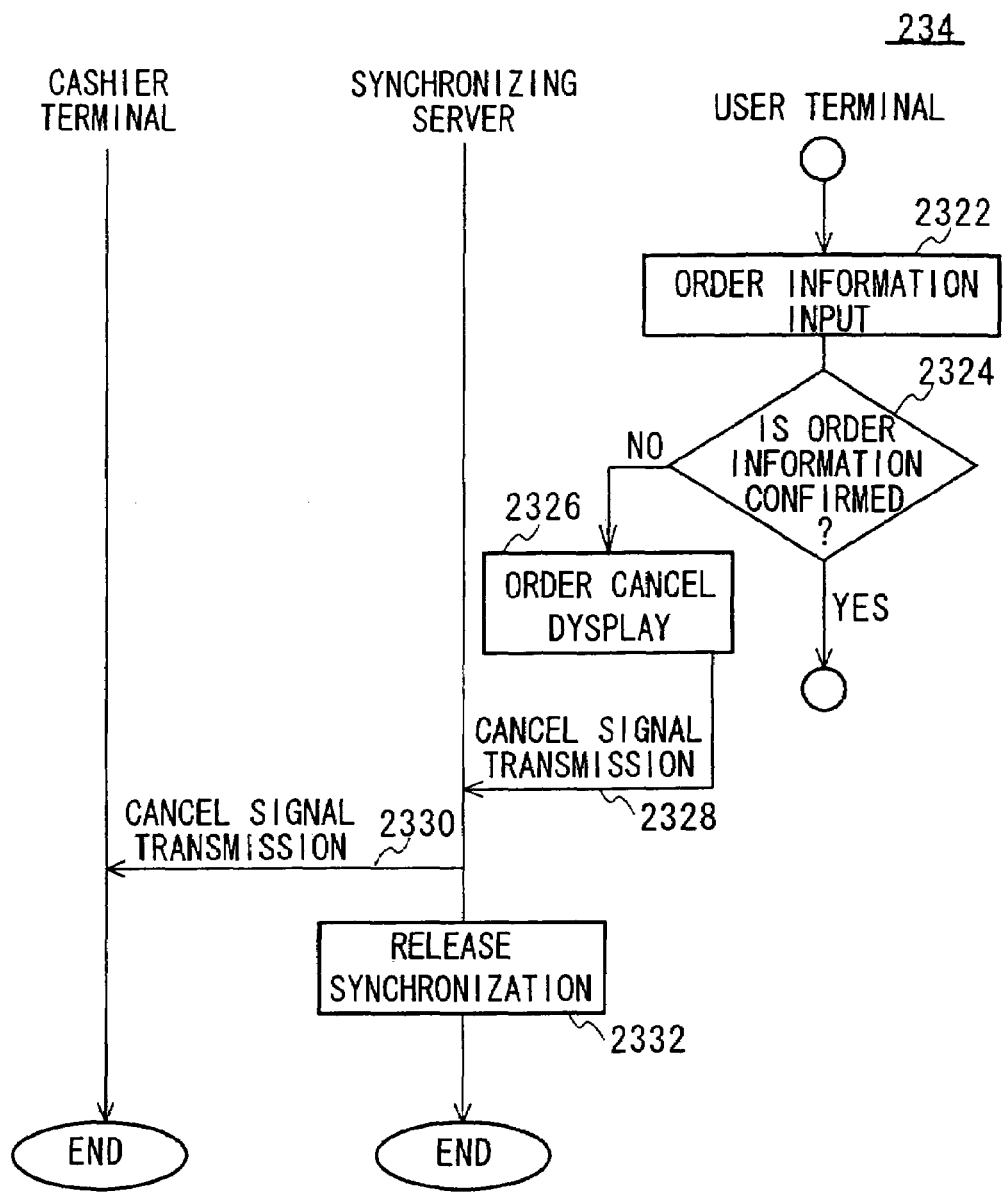
FIG. 21 is a flowchart showing an order input 234 processing.

The user terminal 20 prompts the user to input to the user terminal 20 an order of an item, based on the product information received from the synchronizing server 30 (234). Referring to FIG. 21, a processing of the order input 234 will be described as follows. Information for an order input as shown in FIG. 24(g) is displayed on the user terminal 20. The user, referring to the mail order catalog shown in FIG. 15, orders an item by inputting an item number (2322). When the user chooses "send" and transmits the item number, information shown in FIG. 24(h) is displayed so that the user may confirm the chosen item. If the user chooses "OK" in FIG. 24(h), the information returns back to FIG. 24(g), and the user may input another order for the next item. If the user chooses "cancel" in FIG. 24(h), that order may be canceled. In the information shown in FIG. 24(g), when the user chooses "end of order", information shown in FIG. 24(i) is displayed and all the ordered items may be confirmed (2324). If the user chooses "OK" in the information shown in FIG. 24(i), the processing of the order input 234 will be finished. If the user chooses "cancel" in the information shown in FIG. 24(i), the orders are canceled and information shown in FIG. 24(j) is displayed (2326), and the user terminal 20 transmits a cancel signal to the synchronizing server 30 (2328). The synchronizing server 30, which receives the cancel signal from the user terminal 20, transmits a cancel signal to the virtual cashier terminal 12. Then, the synchronizing server 30 releases the synchronizing status of the user terminal 20 with the virtual cashier terminal 12 (2332).

Referring back to FIG. 16 again, a processing after the user terminal 20 has finished the order input 234 processing will be described as follows. The user terminal 20 transmits order information to the synchronizing server 30 (236). The synchronizing server 30 sends order information received from the user terminal 20 to the virtual cashier terminal 12 in the synchronizing status with the user terminal 20 (238).

The virtual cashier terminal 12 calculates a purchase amount based on the order information received from the synchronizing server 30 (240), and transmits to the synchronizing server 30 the purchase amount information including the purchase amount (242). The synchronizing server 30, receiving the purchase amount information from the virtual cashier terminal 12, performs the processing of the available amount checking 244.

Referring to FIG. 22, the processing of the available amount checking 244 will be described as follows. The synchronizing server 30 compares the purchase amount transmitted from the virtual cashier terminal 12 with the available amount limit retrieved from the user database 60 in the user data inquiry 208 (2442), if the purchase amount does not exceed the available amount limit, the inquiry processing is finished. If the purchase amount exceeds the available amount limit, a message "your purchase exceeds your available amount limit" is transmitted to the user terminal 20 (2444). The synchronizing status of the virtual cashier terminal 12 with the user terminal 20 is released (2446). Then, information shown in FIG. 24(*k*) is displayed on the user terminal 20.

Referring back to FIG. 16 again, the processing after available amount checking 244 is completed will be described. The synchronizing server 30 transmits purchase amount information including the purchase amount to the user terminal 20 (246). The user terminal 20, receiving purchase amount information from the synchronizing server 30, performs the processing of the final purchase confirmation 248.

Referring to FIG. 23, the processing of the final purchase confirmation 248 will be described as follows. The user terminal 20 displays information shown in FIG. 24(*l*) in order to display the purchase amount (2462). The user confirms if the purchase amount is correct (2464). If correct, the user chooses "OK" on the display and finishes the processing of the final purchase confirmation 248. If the purchase amount is incorrect, the user chooses "cancel". When the user chooses "cancel", information which shows the settlement is canceled as shown in FIG. 24(*m*) is displayed on the user terminal 20 (2466), the user terminal 20 transmits a cancel signal to the synchronizing server 30 (2468). The synchronizing server 30, receiving the cancel signal from the user terminal 20, transmits a cancel signal to the virtual cashier terminal 12 (2470). The virtual cashier terminal 12 cancels the settlement, and finishes the processing (2472). The synchronizing server 30, after transmitting the cancel signal to the virtual cashier terminal 12, releases the synchronization of the communication to the virtual cashier terminal 12 with the communication to the user terminal 20, and finishes the processing (2474).

Referring back to FIG. 16 again, the processing after final purchase confirmation 248 is finished will be described. The user terminal 20 transmits a final purchase confirmation signal to the synchronizing server 30 (250). The synchronizing server 30, receiving the final purchase confirmation signal from the user terminal 20, accesses the user account database 70 and performs the settlement processing which records the purchase information (252). When the settlement is completed, the synchronizing server 30 transmits a settlement completion notification to the virtual cashier terminal 12 (254), and transmits a receipt to the user terminal 20 (258). The virtual cashier terminal 12 confirms the completion of the settlement and finishes the synchronizing settlement (256). The user terminal 20 displays information shown in FIG. 24(*n*) of the completion of the settlement (152).

An electronic settlement system of the present embodiment enables users electronic ordering and payment of mail orders including magazines, catalogs, and so on. The user may confirm if he or she is connected to the mail order site he or she wanted before performing his or her order with the link information displayed on the portable terminal. The retailer of mail order may specify the authentication method so that the settlement may be performed after the authentication of the user with the user password and so on.

THIRD EMBODIMENT

An electronic settlement system according to the third embodiment of the present invention will be described as follows. Applying the electronic settlement system of the present embodiment, as the second embodiment, a user may order items and perform settlement via a network. The electronic settlement system of the present embodiment adopts voice authentication for the authentication method for user authentication. The rest of the embodiment is almost the same as the second embodiment.

Figure 25:
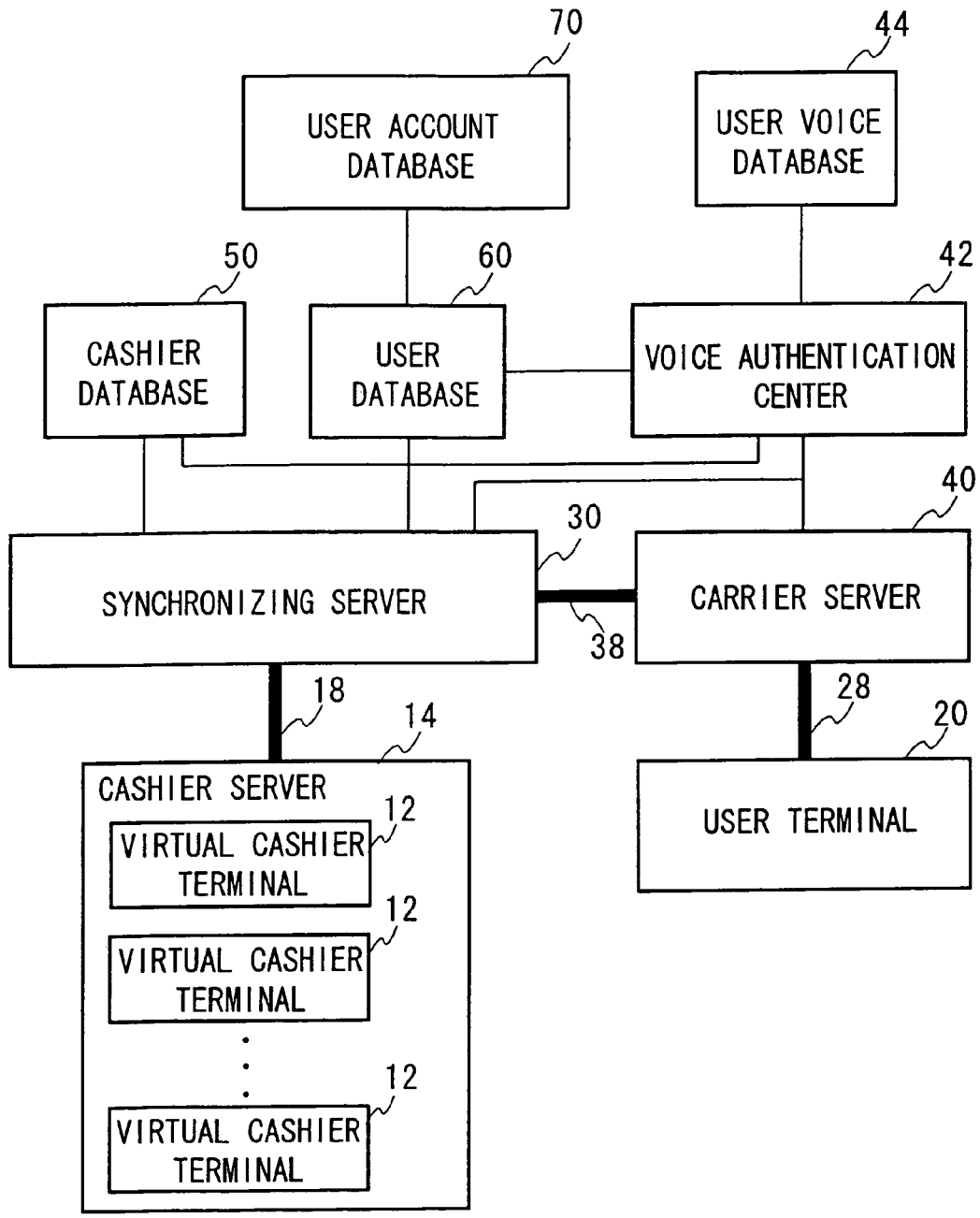
FIG. 25 is a block diagram showing a configuration figure of an electronic settlement system of a third embodiment of the present invention.

FIG. 25 is a block diagram showing a configuration figure of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement apparatus, a carrier server 40, a cashier database 50 as an example of a billing terminal database, a user database 60 as an example of a paying terminal database, a user account database 70, a voice authentication center 42, and a user voice database 44.

The voice authentication center 42 connects to the carrier server 40. When a user terminal 20 dials via a radiotelephone communication, the voice authentication center 42 authenticates the user by the voice from the user terminal 20. The voice authentication center 42 has a user voice database 44, and inquires a user voice from the user terminal 20 to the user voice registered in advance in the user voice database 44. The user voice database 44 stores voice information registered by the user of the user terminal 20 in advance. The voice information of the user is, for example, the voice data of a predetermined registered word the user speaks.

The voice authentication center 42 connects to the cashier database 50 and the user database 60, and checks registration status and payment history of the user. The voice authentication center 42 may also retrieve the cashier server registered in the cashier database 50 based on the transaction ID the user transmitted, and checks the registration of the cashier server.

The other components marked the same as in FIG. 14 will not be described here because these components have the same performance and construction as the second embodiment.

Figure 26:
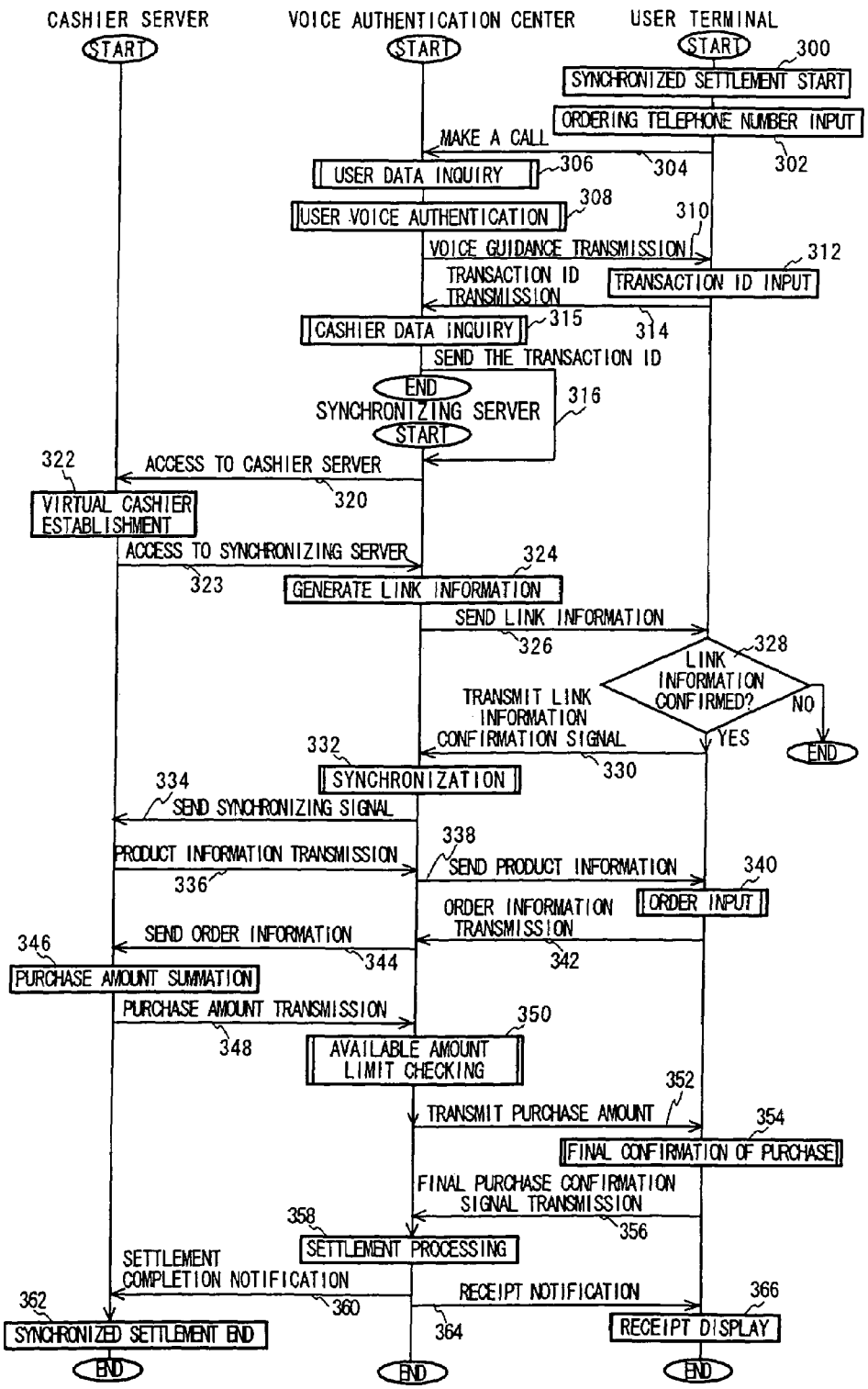
FIG. 26 is a flow chart showing processing a settlement using an electronic settlement system of the third embodiment.
Figure 27:
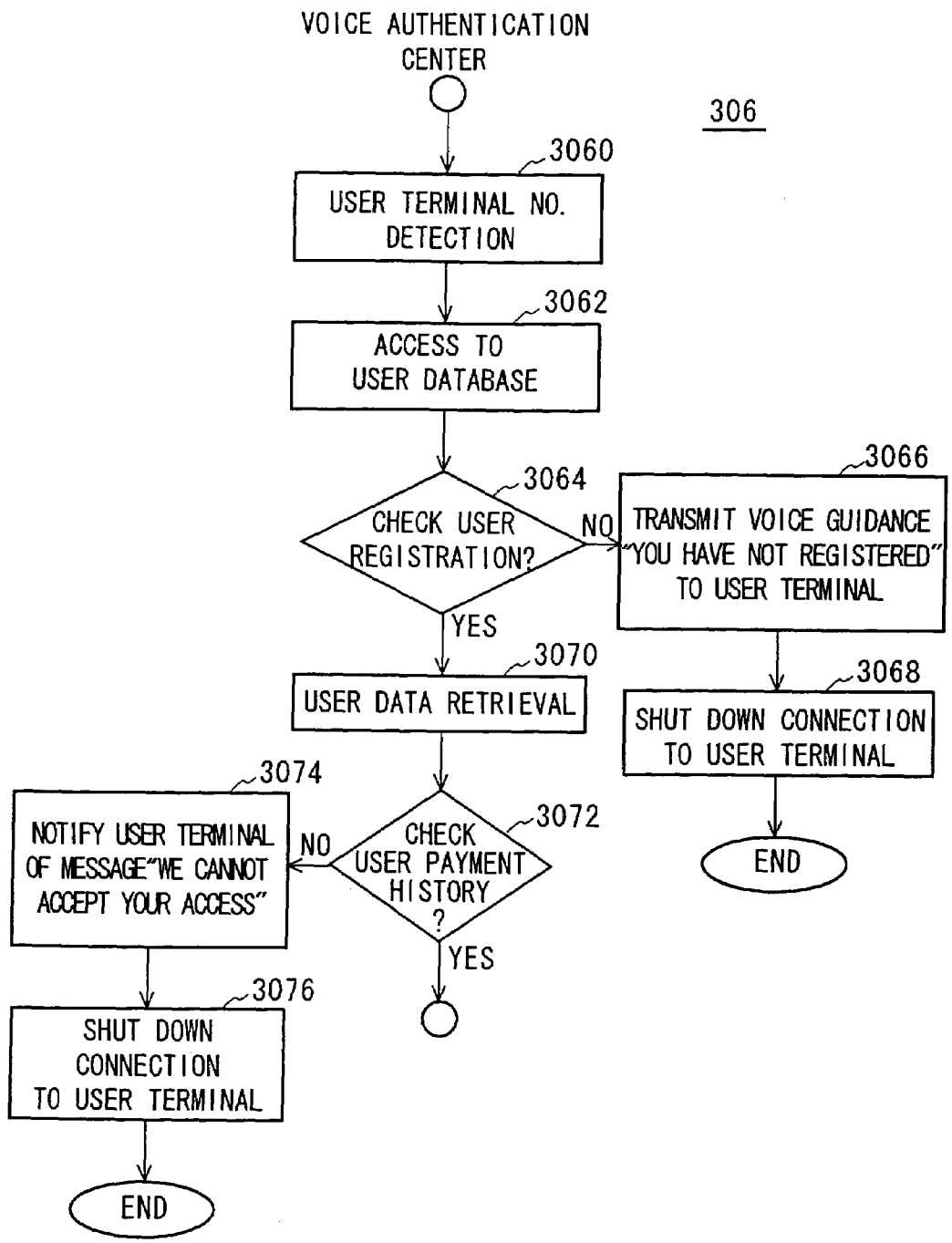
FIG. 27 is a flow chart showing a user data inquiry 306 processing.
Figure 28:
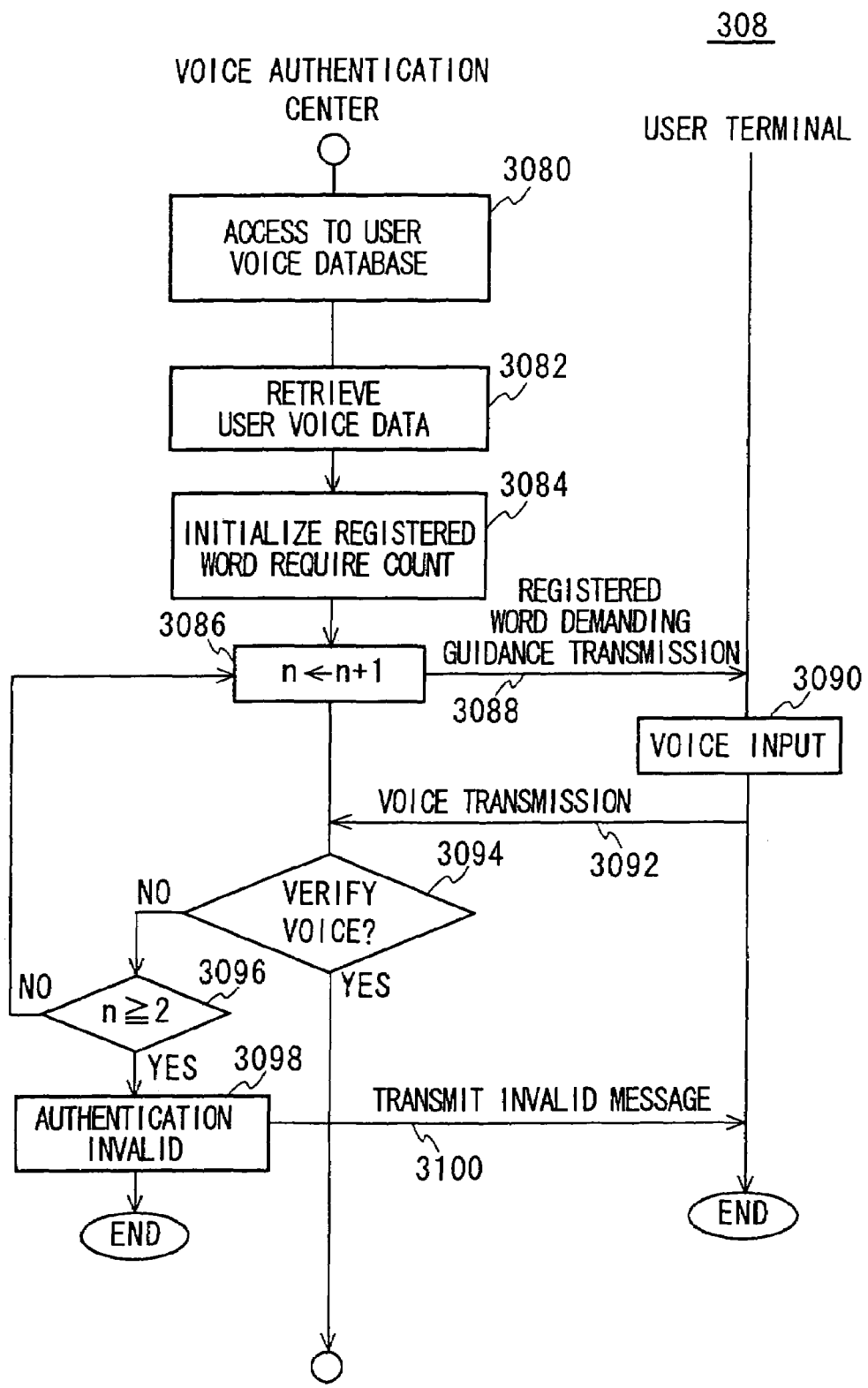
FIG. 28 is a flow chart showing a voice authentication 308 processing.
Figure 29:
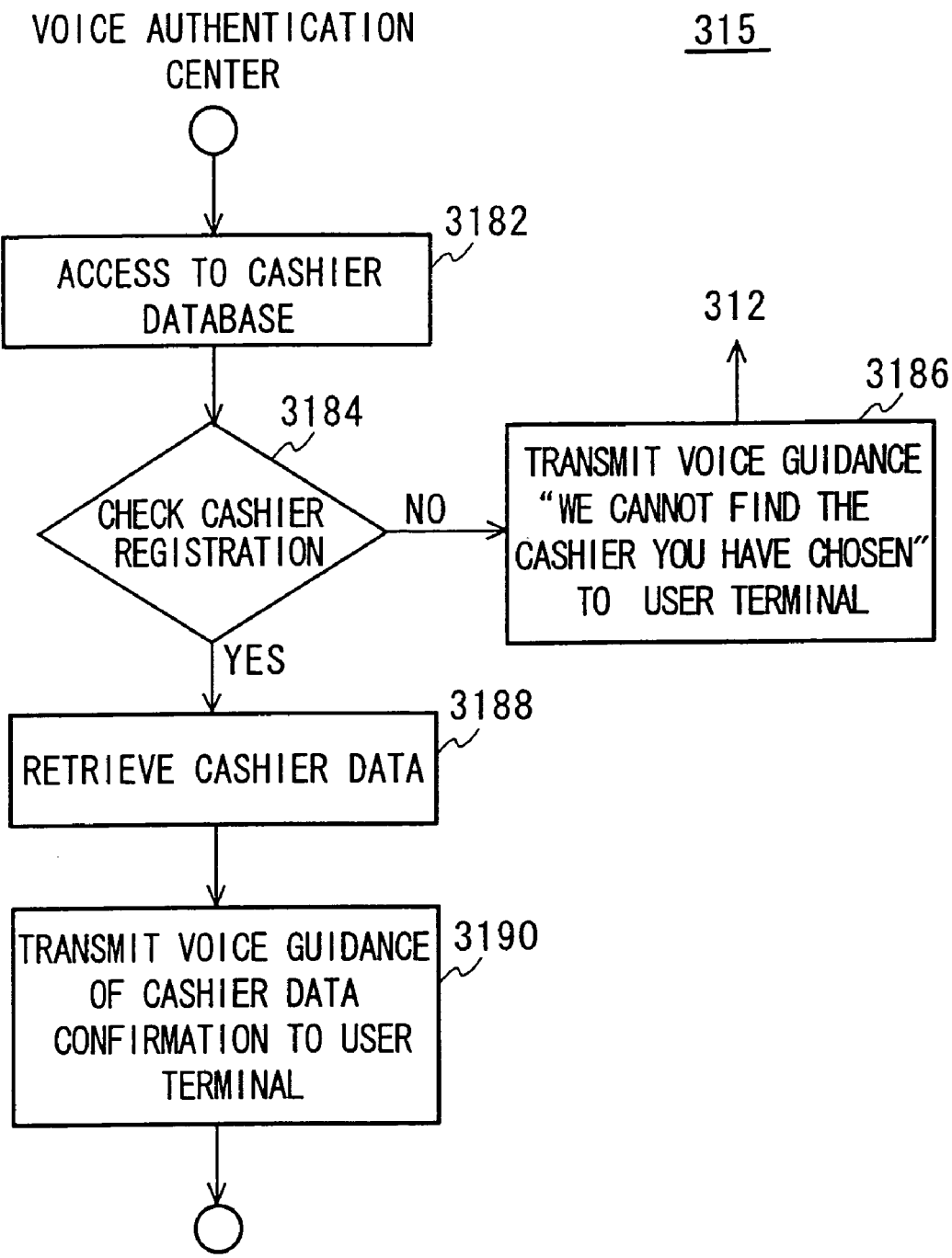
FIG. 29 is a flow chart showing a cashier data inquiry 315 processing.

Referring to FIG. 26 to FIG. 29, processing of the electronic settlement of the present embodiment is described as follows. FIG. 26 is a flow chart showing the settlement processing according to the electronic settlement system of the present embodiment. FIG. 27 to FIG. 29 show detailed flow charts of the processing in FIG. 26.

A difference of the present embodiment from the second embodiment is that the user terminal 20 is connected to the voice authentication center 42 via the carrier server 40 when a user terminal 20 chooses the synchronizing settlement menu and starts a settlement, and a voice authentication is performed. Other processing's are the same as the second embodiment. Here, the processing that is different from the second embodiment will be described.

First, the user chooses the electronic settlement menu from the user terminal 20 and starts an electronic settlement (300). Information directing the user to input an "ordering telephone number" is displayed on the user terminal 20. The user inputs an "ordering telephone number" listed in an advertisement of a mail order or a catalog (302), and a telephone call is made (304). "Ordering telephone number" is a telephone number of the voice authentication center 42. The user terminal 20 is connected to the voice authentication center 42 with a telephone communication line. Information from the user terminal 20 to the voice authentication center 42 is transmitted by voice or inputted by keypad. Information from the voice authentication center 42 to the user terminal 20 is sent by voice direction or voice guidance providing information.

When the voice authentication center 42 receives a telephone call from the user terminal 20, the voice authentication center 42 inquires the user data (306). Referring to FIG. 27, a processing of user data inquiry 306 is described as follows. The voice authentication center 42, receiving the telephone call from the user terminal 20, detects a user terminal number of the user terminal 20 (3060).

An example of the user terminal number of the user terminal 20 is a calling telephone number. When the user terminal 20 is set a calling number delivery service, the receiver may detect the calling telephone number. When the user terminal 20 does not set a calling number delivery service, the receiver may not detect the calling telephone number. In such a case the voice authentication center 42 sends to the user terminal 20 a voice guidance prompting the user to set the calling number delivery service of the user terminal 20.

The voice authentication center 42 accesses the user database 60 (3062), and checks if the user terminal 20 has registered based on the user terminal number (3064). If the user terminal 20 does not have a user registration, the voice authentication center 42 transmits to the user terminal 20 voice guidance notifying the user terminal 20 is not registered in the database (3066), shuts down the connection to the user terminal 20 (3068), and finishes the processing.

When the user registration is verified, the user data is retrieved from the user database 60 (3070). Information about payment history of the user is recorded in the user data. The voice authentication center 42 checks if the user has a problem in his or her payment history on his or her credit card or his or her bankcard based on the information (3072). When any problem is found in his or her payment history, the voice authentication center 42 transmits the user terminal 20 voice guidance to notify that the authentication service is not available (3074), shuts the connection to the user terminal 20 down (3076), and finishes the processing. When the user has no problem with his payment history, the voice authentication center 42 finishes the processing of the user data inquiry 306, and goes to the next step.

Referring back to FIG. 26, the voice authentication center 42, after the processing of the user data inquiry 306, performs the processing of voice authentication 308. Referring to FIG. 28, the processing of the voice authentication 308 will be described as follows. The voice authentication center 42 accesses the user voice database 44 (3080), and detects user voice information for the user of the user terminal 20 from the user voice database 44 based on the user terminal number of the user terminal 20 previously detected (3082). The user voice information is voice data of a predetermined registered word the user speaks. A registered word require count variable n, which stores the registered word require count, is initialized to 0 (3084). The registered word require count is incremented from n to n+1 (3086). A voice guidance requiring the user to speak the word, which is previously registered, is transmitted to the user terminal 20 (3088). This voice guidance may be a voice message that says, "Please speak the registered word clearly after the beep. When finished, please push #.". The user terminal 20 receives this voice guidance. The user speaks the registered word, so that the voice of the user is input to the user terminal 20 (3090). The spoken user voice is transmitted to the voice authentication center 42 (3092). The voice authentication center 42 verifies the voice of the registered word transmitted from the user terminal 20 to the user voice of the registered word retrieved from the user voice database 44 (3094). When the voice transmitted from the user terminal 20 and the user voice retrieved from the user voice database 44 are judged to be the same by the voice verification, the processing of the voice authentication 308 is finished. In a case where the user terminal 20 does not match the registered user voice by the voice verification, the voice authentication center 42 checks whether the registered word require count n exceeds 2 (3096), if n does not exceeds 2, it goes back to the processing 3086, and repeats the request of the registered word. In a case that n exceeds 2, the voice authentication is invalid (3098), transmits voice guidance to the user terminal 20 (3100) notifying that the voice authentication is invalid, and finishes the processing.

Referring back to FIG. 26, the voice authentication center 42, finishing the processing of the voice authentication and having succeeded the user voice authentication, transmits voice guidance that prompts the user to input the transaction ID to the user terminal 20 (310). This voice guidance may be a voice message such as "You are authenticated. Please input a transaction ID.". The user inputs the transaction ID from the user terminal 20 (312). In the present embodiment, the transaction ID is a number to identify a cashier server 14 performing the mail order merchandise.

The input transaction ID is transmitted to the voice authentication center 42 (314). The voice authentication center 42 makes an inquiry to the cashier data based on the transaction ID received from the user terminal 20 (315). FIG. 29 shows the details of the cashier data inquiry 315. The processing of the cashier data inquiry 315 will be described as follows. The cashier database 50 is accessed (3182), and checked to see whether a cashier server corresponding to the transaction ID is registered (3184). When a cashier server 14 is not registered, voice guidance notifying that the cashier server corresponding to the transaction ID that is not able to find is transmitted to the user terminal 20 (3186). A voice message saying "We cannot find the cashier you have chosen" is sent to the user terminal, and it goes back to the input transaction ID 312 processing. A situation that the cashier server 14 corresponding to a transaction ID cannot be found may happen when the user input an incorrect transaction ID or when a transaction ID of the mail order retailer has passed the expiry date.

When the cashier server corresponding to the transaction ID is registered, the cashier data is retrieved (3188). Information such as a retailer name, an authentication method, and an access number to the cashier server 14 are registered as cashier data. An access number of the cashier server 14 is retrieved from the cashier data. The access number is, for example, a connecting telephone number of the cashier server 14. When the cashier data is retrieved, the voice guidance confirming the cashier data is transmitted to the user terminal 20. For example, voice message "OO mail order catalog July is chosen. If correct, please hang up and wait for a call back from the ordering center. If incorrect, please input the transaction ID again" is sent to the user terminal 20.

Referring back to FIG. 26, the voice authentication center 42, after the processing of the cashier data inquiry 315, transmits an order receiving instruction and sends the transaction ID to the synchronizing server 30. The voice authentication center 42 transmits voice guidance "please hang up and wait for a message from the ordering center" to the user terminal 20. The telephone connection between the voice authentication center 42 and the user terminal 20 is shut down (316).

The synchronizing server 30 receives an order receiving instruction from the voice authentication center 42 and receives the transaction ID (316). The synchronizing server 30 accesses the cashier server 14 corresponding to the transaction ID (320). The cashier server 14 activates a virtual cashier terminal 12 (322). The virtual cashier terminal 12 is an apparatus or a processing performing as a cashier. The virtual cashier terminal 12 may be a terminal device provided in the cashier server, or may be a program activated in the cashier server. The virtual cashier terminal 12 is connected to the synchronizing server 30 (323).

The synchronizing server 30, when the server connects to the virtual cashier terminal 12, creates a "link information" in order to identify a transaction to the virtual cashier terminal 12 (324). The link information in the present embodiment is an example of transaction identifying numbers that identify the transaction between the user terminal 20 and the virtual cashier terminal 12. The synchronizing server 30 synchronizes the communication to the user terminal 20 with the communication to the virtual cashier terminal 12 based on the link information, and processes the settlement of the transaction. The link information includes not only the transaction identifying number but also cashier identifying information that identifies a cashier server 14 such as a name of a mail order retailer or a welcome message.

The synchronizing server 30 sends the link information to the user terminal 20 (326). The user terminal 20, receiving the link information from the synchronizing server 30, displays a welcome message on the screen as shown in FIG. 24(f) of the second embodiment. The user, looking at the information, confirms whether the present site is the site he or she wants to connect to (328). When the user chooses the "link" on the display, the user terminal 20 transmits a link information confirming signal to the synchronizing server 30 (330). The link information confirming signal includes the cashier terminal identifying signal which is included in the link information in order to identify the virtual cashier terminal 12.

The user, choosing "cancel" on the display, may cancel the electronic settlement. This cancellation processing is performed in such a case where the user inputs an incorrect transaction ID, an unwanted mail order site is displayed.

The synchronizing server 30, receiving the link information confirming signal from the user terminal 20, establishes a synchronization (332).

The settlement processing after the synchronization processing (332) will not be described here, as the processing are the same as the first embodiment.

Here, in the present embodiment, the voice authentication center 42 performs the processing of cashier data inquiry 315 processing and transmits the transaction ID to the synchronizing server 30. As another case, at the point of the processing when the user voice authentication 308 processing is completed, the voice authentication center 42 may transmit the information of the completion to the synchronizing server 30. In this case, the synchronizing server 30 performs the processing from the voice guidance transmission 310 processing to the cashier data inquiry 315 processing.

The electronic settlement system of the present embodiment authenticates a user by his or her voice before the electronic settlement, so that may ensure a high quality authentication.

FOURTH EMBODIMENT

The electronic settlement system according to the fourth embodiment of the present invention will be described as follows. Applying the electronic settlement system of the present embodiment, as the second embodiment, a user may order items and perform settlement via a network. The electronic settlement system of the present embodiment adopts image authentication for an authentication method for user authentication. The rest of the embodiment is almost the same as the second embodiment.

Figure 30:
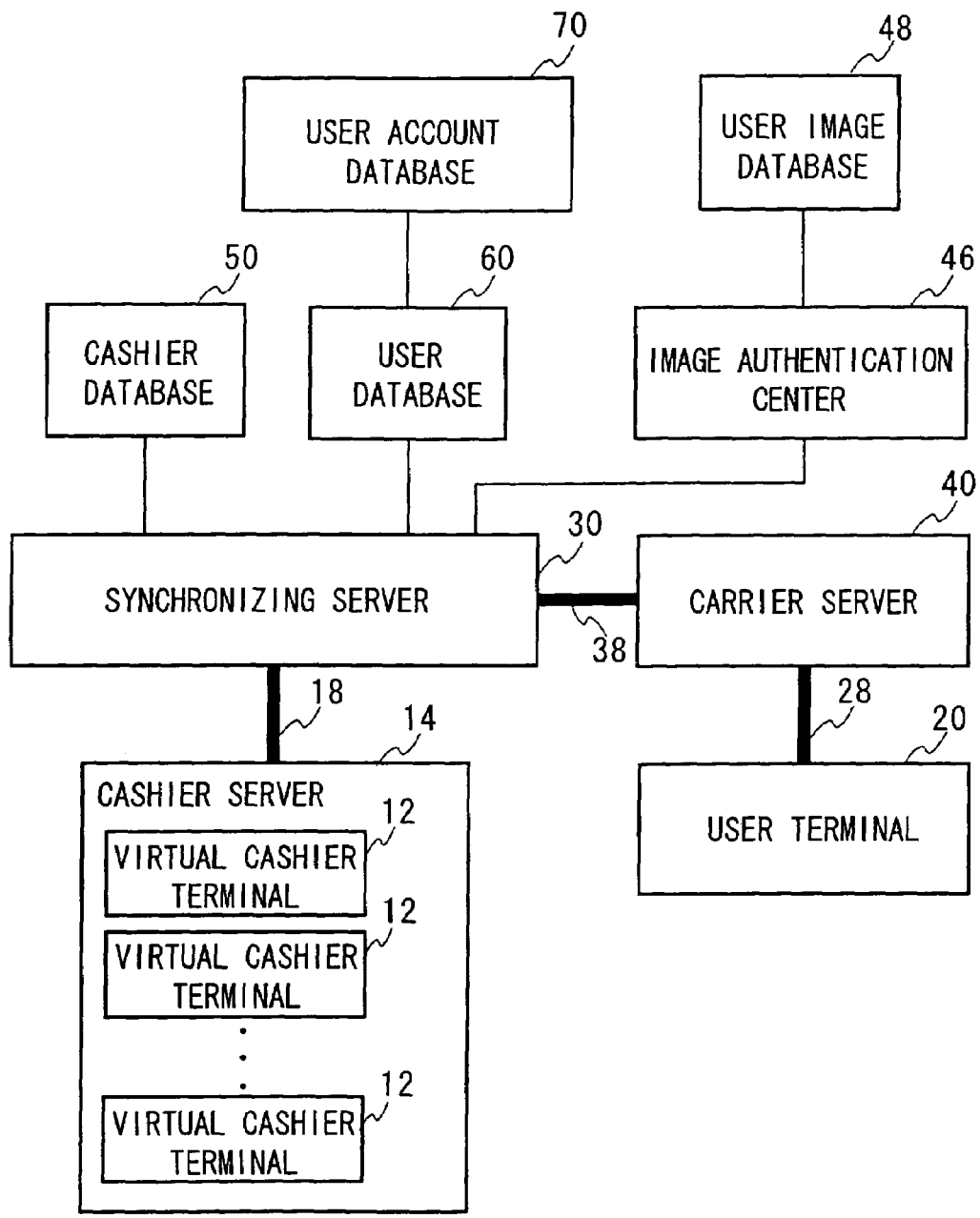
FIG. 30 is a block diagram showing a configuration figure of an electronic settlement system according to the fourth embodiment of the present invention.

FIG. 30 is a block diagram showing a configuration of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement apparatus, a carrier server 40, a cashier database 50 as an example of a billing terminal database, a user database 60 as an example of a paying terminal database, a user account database 70, an image authentication center 46, and a user image database 48.

The image authentication center 46 authenticates a user based on an image transmitted from the user terminal 20. The image authentication center 46 has a user image database 48, and verifies an image transmitted from the user terminal 20 with the user image previously registered in the user image database 48. Image data of a user's facial portrait, image data of an iris or a retina of the user, or image data of a user's fingerprint may be used for the user image. The user registers this image data as authentication data in the user image database 48 in advance.

Figure 31:
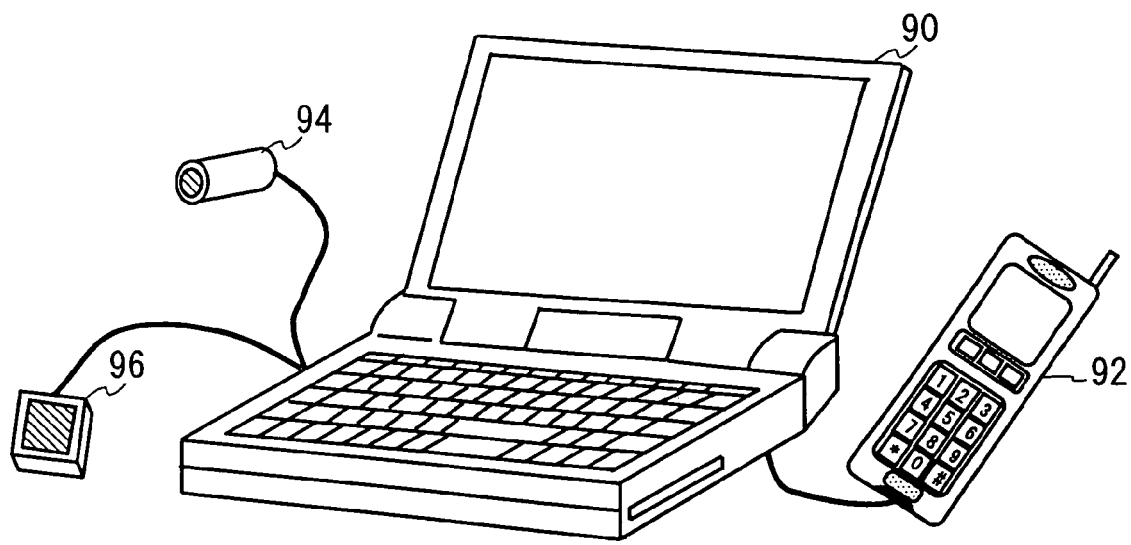
FIG. 31 shows a configuration of a portable terminal that has a communication facility as an example of a user terminal.

FIG. 31 shows a configuration of a portable terminal that includes communication facilities as an example of a user terminal 20 applying the present embodiment. The portable terminal 90 may connect to a cellular phone 92 and wirelessly communicate to networks. The portable terminal 90 may read in the user facial portrait image by connecting a CCD camera 94 or reading in a user fingerprint by connecting to a finger print scanner 96. The portable terminal 90 may include a wireless communication facility working as a cellular phone 92, a scanning function working as a CCD camera 94, and a fingerprint scanning function working as a finger print scanner 96 inside the portable terminal 90.

The other components marked the same as in FIG. 14 will not be described here because these components have the same performance and construction as the second embodiment.

Figure 32:
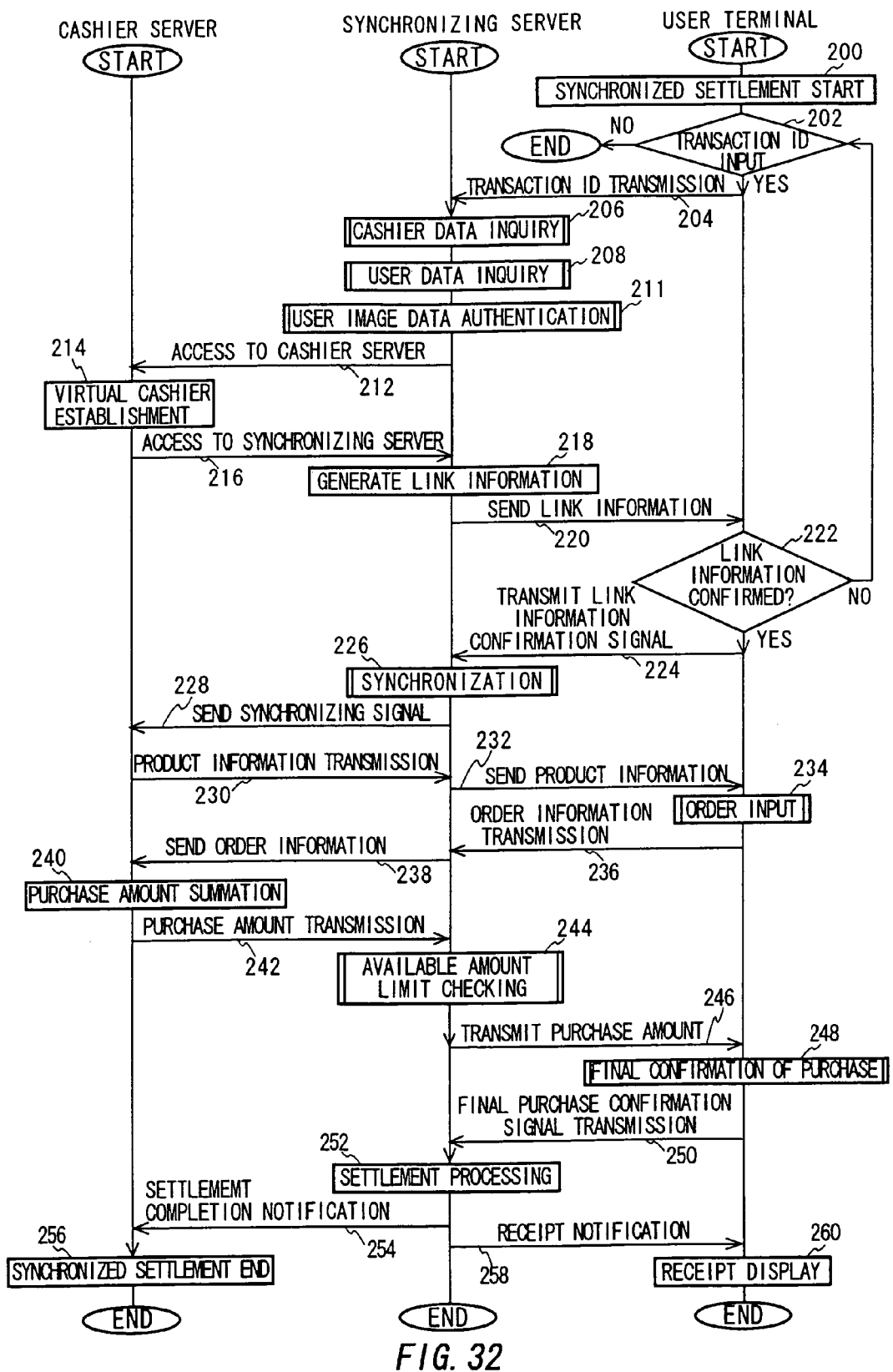
FIG. 32 is a flow chart showing the settlement processing using an electronic settlement system of the fourth embodiment.

FIG. 32 is a flow chart showing the settlement processing applying the electronic settlement system of the present embodiment. In FIG. 32, the processing and communications marked the same as in FIG. 14 will not described here because they are the same as the second embodiment. The processing of a user image data authentication 211, which is different from the second embodiment, will be described here.

Figure 33:
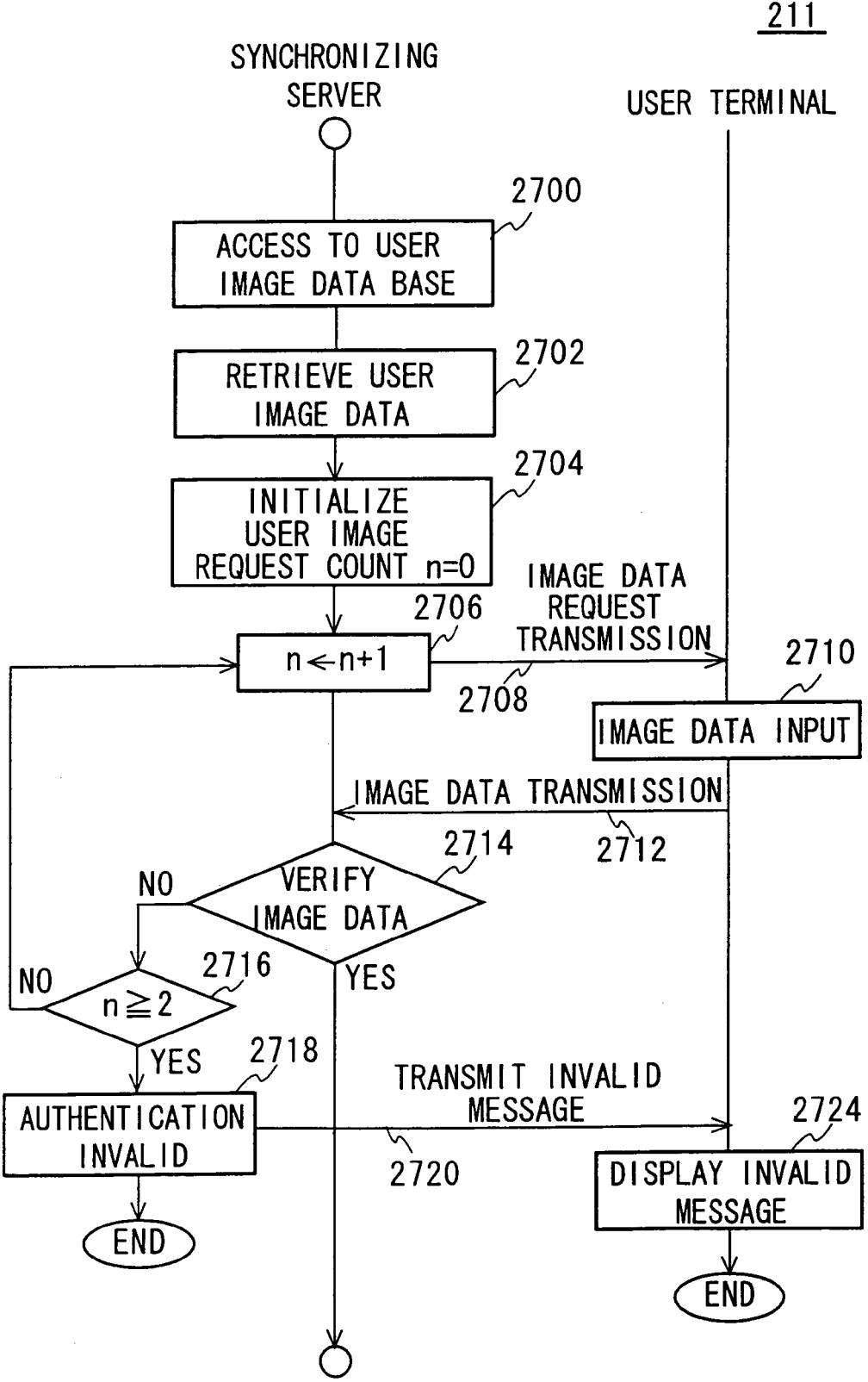
FIG. 33 is a flow chart showing a user image data authentication 211 processing.

FIG. 33 is a flow chart showing the processing of the user image data authentication 211. The synchronizing server 30 performs authentication of a user based on an authentication method decided from the cashier terminal information inquiry 206. The authentication method may be one of the following authentications, which use personal image information to identify the user as an individual; a facial portrait image authentication, an authentication using an image of an iris or a retina, an authentication using a finger print image, and so on. The synchronizing server 30, in order to perform image authentication, accesses the user image database 48 (2700) and retrieves user image data necessary for authentication and generates the authentication data (2702). The synchronizing server 30 initializes image data require count variable n, which stores the image data require count, to 0 (2704). The synchronizing server 30 increments n to n+1 (2706), and transmits an image data request message to the user terminal 20 (2708). Information prompting the user to input the image information such as a facial portrait image, an iris or retina image, or a finger print image of the user to the user terminal 20 is displayed on the user terminal 20. The user, using the CCD camera 94 or the finger print scanner 96 attached to the user terminal 20 and so on, inputs image data to the user terminal 20 (2710). The user terminal 20 transmits the image data inputted by the user to the synchronizing server 30 (2712). The synchronizing server 30 receives the image data transmitted from the user terminal 20, and makes an inquiry to the image data retrieved from the user image database 48 (2714).

If the image data transmitted from the user terminal 20 is not matched with the image data retrieved from the user image database 48, whether the image data require count n is 2 or more is checked (2716). If it is not 2 or more, it goes back to the processing 2706 and requests the image data again. If the image data require count n is 2 or more, the authentication processing is finished (2718) and an invalid message is transmitted to the user terminal 20 (2720). As the authentication is not confirmed, information indicating that the settlement service is not available is displayed on the user terminal 20 (2724).

In the image data verification 2714, when the synchronizing server 30 verifies that the image data has been transmitted from the user, the processing of the user image data authentication 211 is finished.

The electronic settlement system of the present embodiment may ensure a safe electronic settlement by prompting the user to transmit the image data that identifies an individual such as a facial portrait, iris or retina, or finger print in order to authenticate the user. With the image authentication, different from voice authentication that needs to connect a cellular phone to an audio carrier, the authentication and the settlement may be performed in succession using a data packet communication facility of a cellular phone.

FIFTH EMBODIMENT

The electronic settlement system applying the fifth embodiment of the present invention will be described in the following. Applying the electronic settlement system of the present embodiment, when the user purchases an item using a vending machine, the user may perform a settlement electronically via a network.

Figure 34:
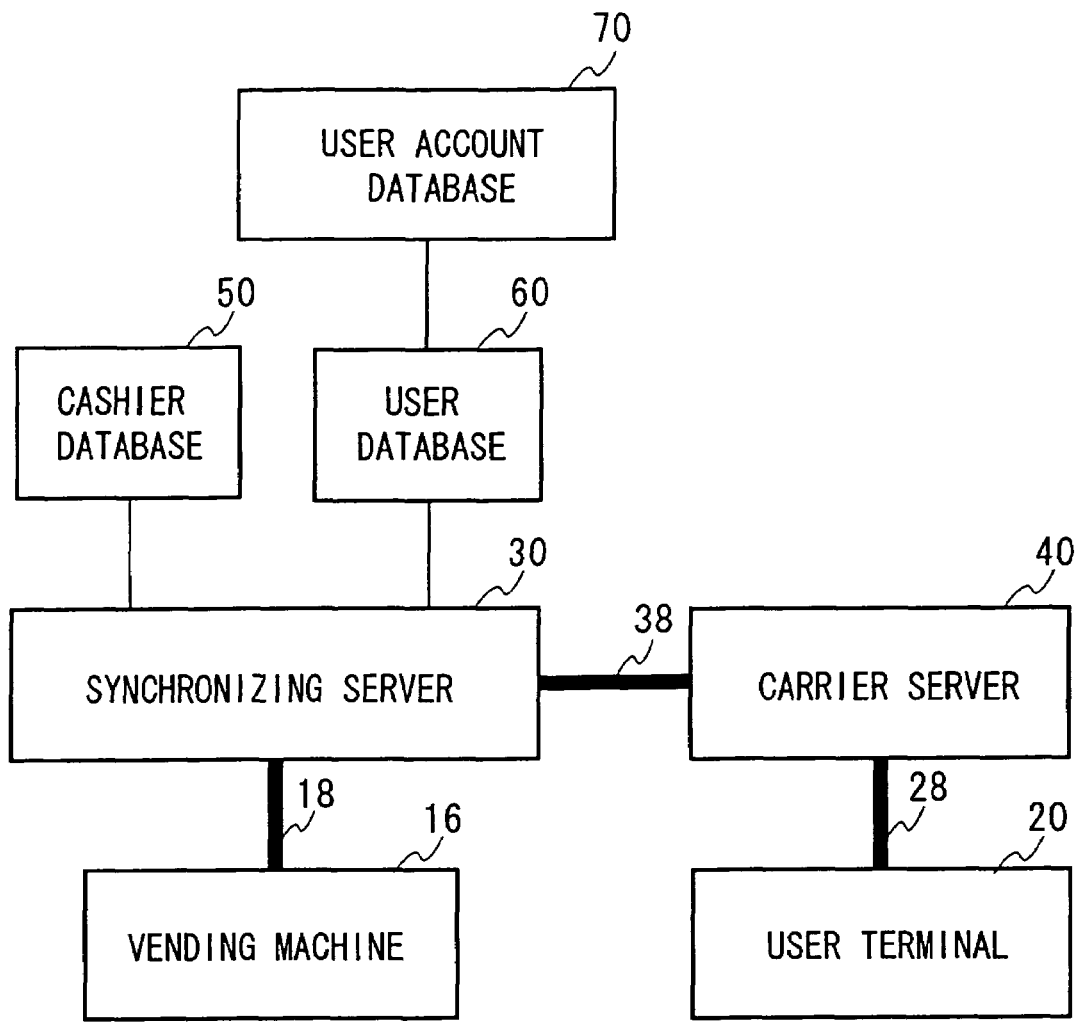
FIG. 34 is a block diagram showing a configuration of an electronic settlement system applying the fifth embodiment of the present invention.

FIG. 34 is a block diagram showing a configuration of an electronic settlement system applying the fifth embodiment of the present invention. The electronic settlement system of the present embodiment has a vending machine 16 as an example of a billing terminal, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

The vending machine 16 may connect to the synchronizing server 30 via a communication path. A communication means from the vending machine 16 to the synchronizing server 30 may be at least one of the followings: a communication using a commercial telephone line, a communication using a private line, and a communication using radiotelephone communication.

The rest of the components have the same numbers as FIG. 1. Here, these components have the same performance and construction as the first embodiment and will not be described.

Figure 35:
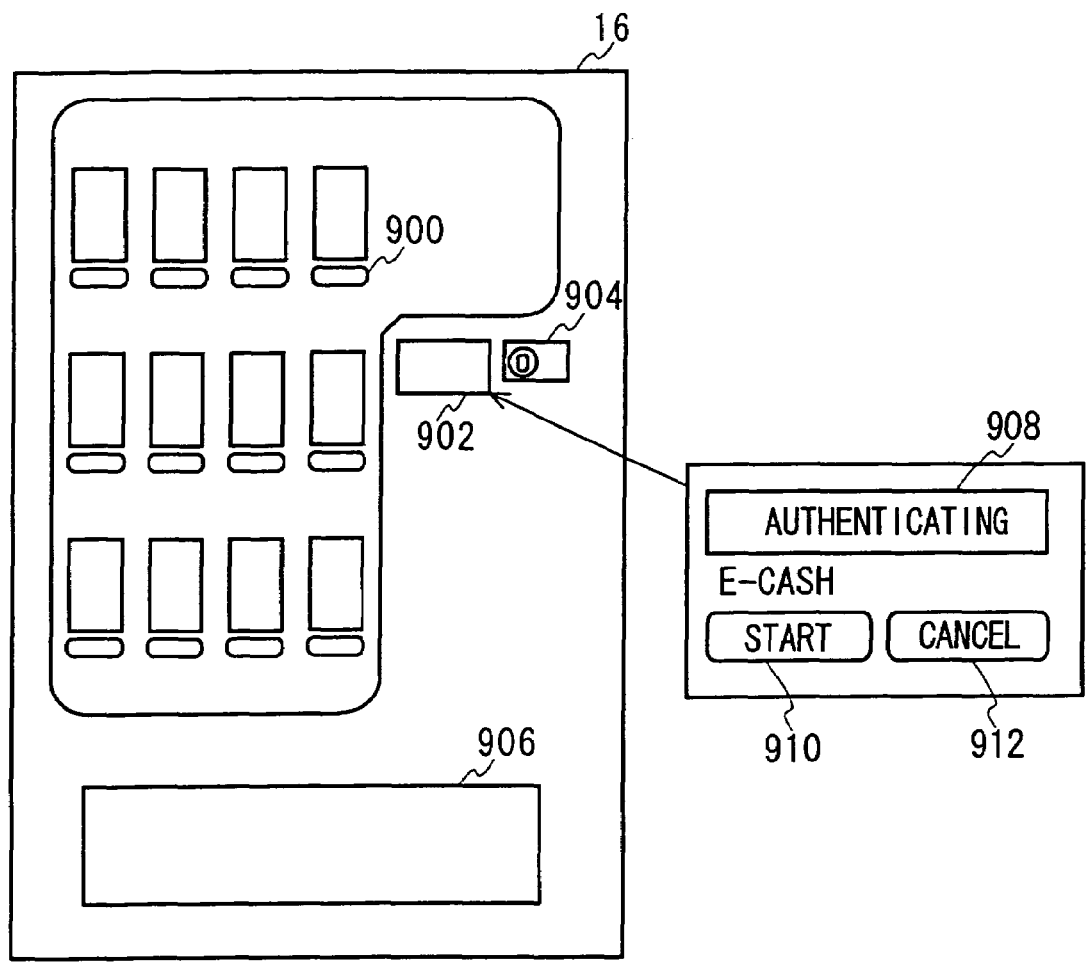
FIG. 35 shows a configuration figure of a vending machine 16.

FIG. 35 shows a configuration figure of a vending machine 16. The vending machine 16 has a plurality of keys 900 to choose an item, an operating unit 902 operating electronic settlement, a coin-inserting unit 904 to insert coins, and an item collection unit 906. The electronic settlement operating unit 902 has a display unit 908 displaying processing of the electronic settlement, a start key 910 directing the start of the electronic settlement, and a cancel key 912 directing the cancellation of the electronic settlement.

Figure 36:
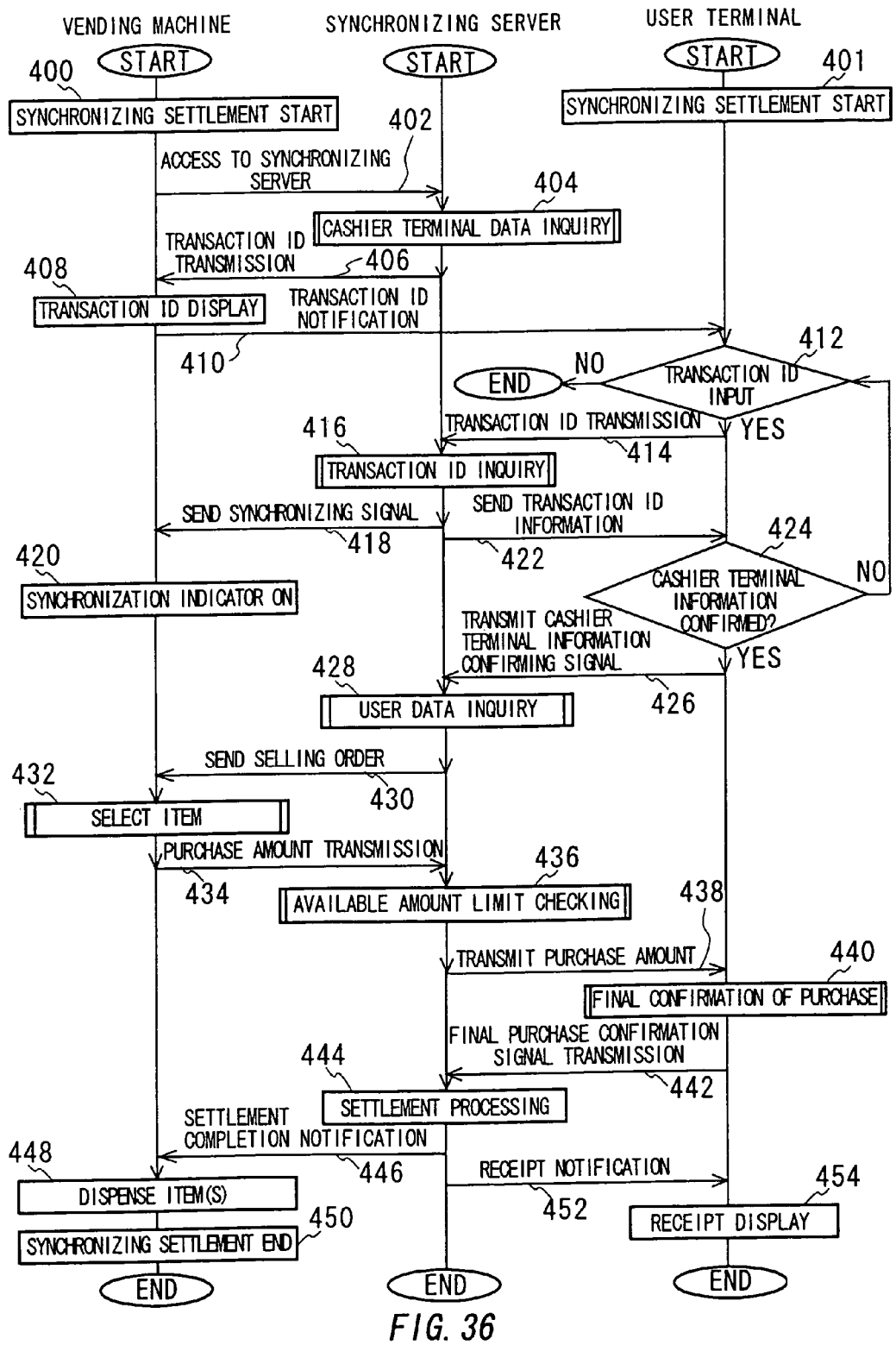
FIG. 36 is a flow chart showing a settlement processing in an electronic settlement system applying the fifth embodiment of the present invention.
Figure 37:
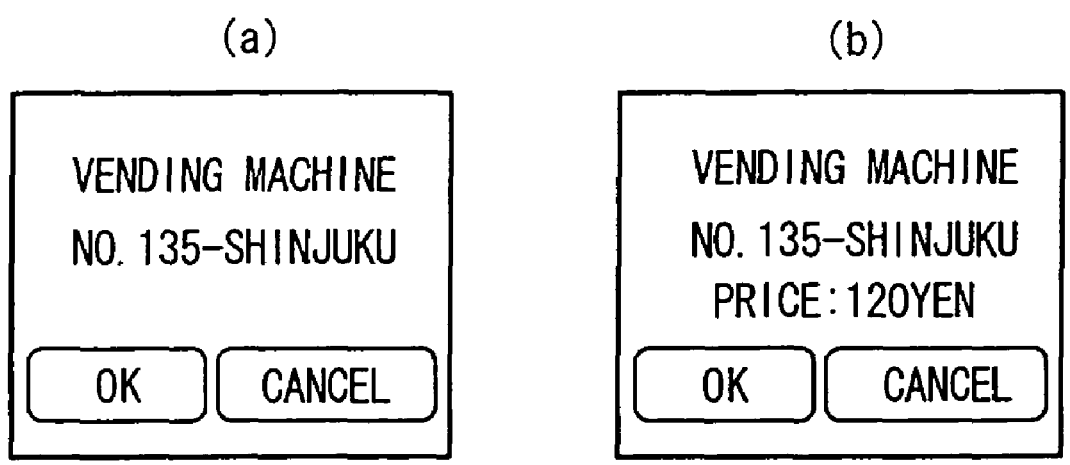
FIG. 37 shows examples of information indicated on a display unit 802 of a user terminal 20.

Referring to FIG. 36 and FIG. 37, settlement processing in the electronic settlement system applying the present embodiment will be described in the following. FIG. 36 is a flow chart showing a settlement processing in an electronic settlement system applying the fifth embodiment of the present invention. FIG. 37 shows examples of information indicated on a display unit 802 of a user terminal 20.

Referring to FIG. 36, the settlement processing will be described in the following. The user chooses the electronic settlement menu of the user terminal 20 (401), selects the start key 910 of the vending machine 16, so that the electronic settlement (400) starts. The vending machine 16 accesses the synchronizing server 30 (402). The vending machine 16 transmits to the synchronizing server 30 a cashier registration number that is unique to the vending machine 16.

The synchronizing server 30, corresponding to the access from the vending machine 16, starts to communicate with the vending machine 16. The synchronizing server 30 inquires the cashier terminal information based on the cashier registration number transmitted from the vending machine 16 (404). The processing from the cashier terminal information inquiry 404 processing to the user information inquiry 428 processing is the same as the processing from the cashier terminal information inquiry 104 processing to the user information inquiry 128 processing of the first embodiment shown in FIG. 5; therefore it will not be described here. In the synchronization indicating 420 processing, the vending machine 16 may have a synchronization indicator to light the synchronization indicator, or may indicate the synchronizing status by displaying characters on the display unit 908.

The synchronizing server 30 transmits a selling order to the vending machine 16 after the user information inquiry 428 (430). The vending machine 16, receiving the selling order from the synchronizing server 30, prompts the user to choose an item sold by the vending machine (432). When the user chooses an item, the vending machine 16 transmits to the synchronizing server 30 the purchase amount information (434).

The processing from the available limit inquiry 436 processing to the settlement processing 444 is the same as the processing from the available limit inquiry 136 processing to the settlement processing 144 of the first embodiment shown in FIG. 5; therefore it will not be described here.

When the settlement processing 444 is finished, the synchronizing server 30 notifies a settlement completion notification to the vending machine 16 (446). The vending machine 16 sends out the item that the user has chosen (448). The synchronizing server 30 transmits a receipt indicating the reception of the expense to the user terminal 20 (452). The user terminal 20 indicates the receipt (454).

The data communication of the vending machine 16 with the synchronizing server 30 as described above is all performed via the communication line 18. The data communication of the user terminal 20 with the synchronizing server 30 is performed via the radio communication channel 28 or the communication line 38. The data communication of the vending machine 16 with the user terminal 20 does not exist.

The vending machine 16 notifies the transaction ID from the vending machine 16 to the user terminal 20 (410) by displaying the transaction ID on the display unit. As another case of the embodiment, the vending machine 16 has an infrared communication unit as an example of a short range communication unit, in the notification of the transaction ID from the vending machine 16 to the user terminal 20 (410) processing, the transaction ID is transmitted from the infrared communication unit of the vending machine 16 to the infrared communication unit 808 of the user terminal 20 through the infrared communication. Thus, the user does not need to input the transaction ID to the user terminal 20 and a miss-input of the transaction ID may be avoided. Furthermore, as a means to transmit the transaction ID from the vending machine 16 to the user terminal 20, each of the vending machines 16 and the user terminals 20 has a wireless communication unit as an example of the short range communication unit. Using a wireless communication for portable apparatuses such as Blue tooth, the vending machines 16 and the user terminals 20 transmit and receive the transaction ID.

The electronic settlement system of the present embodiment differs from the first, second, third, and fourth embodiments because it does not perform the authentication of the user such as the visual authentication, the password authentication, the voice authentication, the iris or retina image authentication, the fingerprint authentication, and so on. A settlement using the vending machine 16 settles only a smaller amount, and the need for user authentication is less important. When a cellular phone is used for the user terminal 20, the uniqueness of the calling number of a cellular phone authenticates the user, as long as the owner of the cellular phone oneself uses the cellular phone. In the case of settlement for the smaller amount, the user authentication processing may be omitted without significant problems. Therefore, the electronic settlement system applying the present invention may select the authentication method depending on the purchase amount, selling style, and so on.

SIXTH EMBODIMENT

The electronic settlement system applying the sixth embodiment of the present invention will be described in the following. Applying the electronic settlement system of the present embodiment, a user may access the Internet using a computer, access an on-line shopping server on the Internet, purchase an item, and settle the value of the merchandise.

Figure 38:
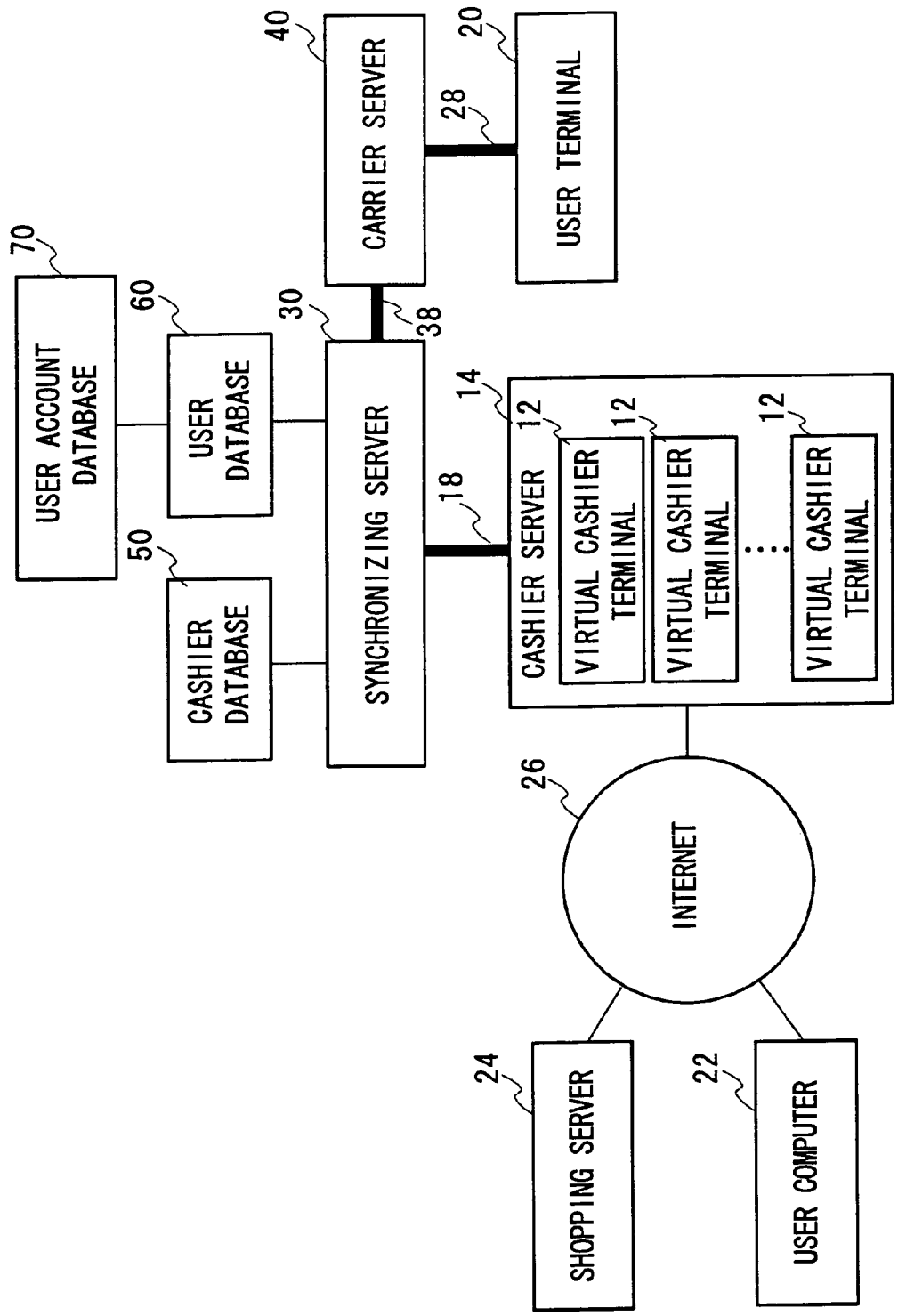
FIG. 38 is a block diagram showing a configuration of an electronic settlement system applying the sixth embodiment of the present invention.

FIG. 38 is a block diagram showing a configuration of an electronic settlement system applying the sixth embodiment of the present invention. The electronic settlement system of the present embodiment has a cashier terminal 14, a plurality of virtual cashier terminals 12 as examples of billing terminals, a user terminal 20 as an example of a paying terminal, a synchronizing server 30 as an example of a settlement device, a carrier server 40, a cashier database 50 as an example of a billing terminal database, a user database 60 as an example of a paying terminal database, a user account database 70, a shopping server 24, and a user computer 22.

The shopping server 24 is an on-line shopping server on the Internet 26. The user computer 22 is a user computer that connects to the Internet 26, and may access the shopping server 24 and perform the on-line shopping.

The components have the same numbers as in FIG. 14 and are the same as the second embodiment. Here, these components that have the same performance and construction as the second embodiment will not be described.

Figure 39:
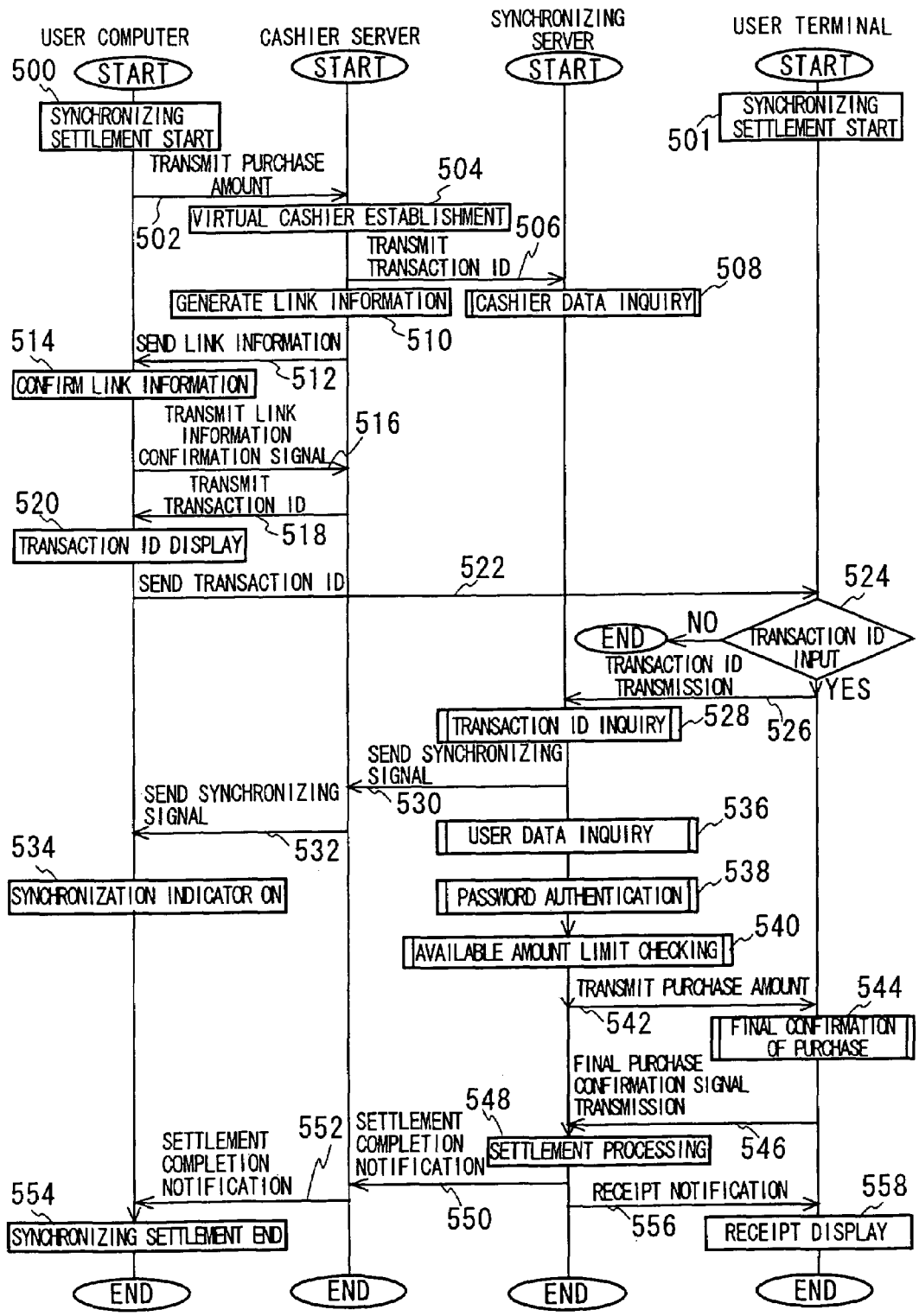
FIG. 39 is a flow chart showing a settlement processing in an electronic settlement system applying the sixth embodiment of the present invention.

Referring to FIG. 39 to FIG. 44, applying the electronic settlement system of the present embodiment, settlement processing of the electronic settlement performed by the user using the user terminal is described in the following. FIG. 39 is a flow chart showing a settlement processing in an electronic settlement system applying the fifth embodiment of the present invention. FIGS. 40 to 43 are flow charts showing processing of details in FIG. 39. FIG. 44 shows examples of information indicated on the user computer 22.

The user connects to the Internet 26 using the user computer 22, accesses the shopping server 24 on the Internet 26, and performs the on-line shopping. While on-line shopping, checking a web page on the Internet 26 for shopping in the shopping server 24, the user chooses an item. When the user has chosen the item, a web page shown in FIG. 44(a), which shows the chosen item and a purchase amount, is indicated on the display unit of the user computer 22. The user selects a key to direct the synchronizing settlement. Here, the synchronizing settlement processing is started (500). The user computer 22 accesses the cashier server 14, and transmits to the cashier server 14 purchase amount information including the purchase amount (502).

The cashier server 14 activates the virtual cashier terminal 12 (504). The virtual cashier terminal 12 is one of processing and an apparatus working as a cashier terminal. The virtual cashier terminal 12 may be one of a terminal device provided in the cashier server 14 and a program activated in the cashier server 14. The virtual cashier terminal 12 connects to the synchronizing server 30, sets a transaction ID as an example of a transaction identifying number which identifies the transaction, and transmits the transaction ID to the synchronizing server 30 (506).

Figure 40:
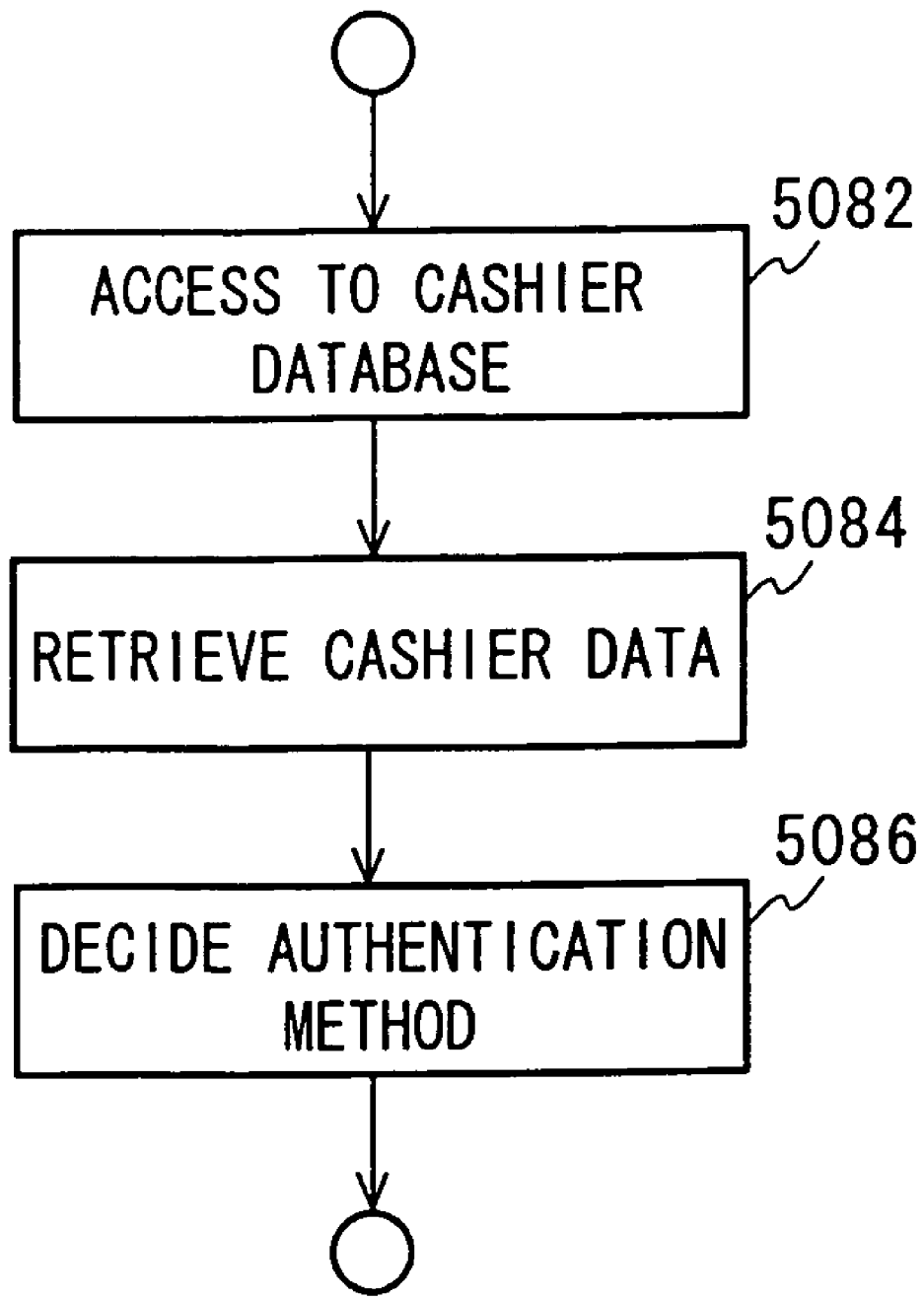
FIG. 40 is a flow chart showing cashier information inquiry 508 processing.

The synchronizing server 30 starts the connection to the virtual cashier terminal 12 corresponding to the access from the virtual cashier terminal 12, and inquires cashier information based on the cashier registration number transmitted from the virtual cashier terminal 12 (508). FIG. 40 is a flow chart showing the cashier information inquiry 508 processing. The cashier information inquiry 508 processing is the same as the cashier information inquiry 206 processing of the second embodiment shown in FIG. 17 therefore it will not be described here.

The cashier server 14 creates link information (510), and transmits the link information to the user computer 22 (512). The information shown in FIG. 44(b), which is created by cooperative processing with the cashier server 14, is indicated on the user computer 22. CGI (Common Gate Interface) may be used for coordinating the processing of the user computer 22 and the cashier server 14. The information shown in FIG. 44(b) includes "purchase detail" and "synchronizing".

When the user chooses "purchase detail", a list of purchased items and a purchase amount is indicated, so that the user may confirm the details of the purchase and purchase amount. "Synchronizing" is attached with the "link information" to the virtual cashier terminal 12 in the cashier server 14. Thus, the user computer 22, choosing "Synchronizing", may connect to a predetermined virtual cashier terminal 12 in the cashier server 14 (514).

When the user chooses "Synchronizing", the user computer 22 connects to the virtual cashier terminal 12, and transmits the link information confirmation signal to the virtual cashier terminal 12 (516). The virtual cashier terminal 12, receiving the link information confirmation signal from the user computer 22, transmits the set transaction ID to the user computer 22 (518). Receiving the transaction ID from the virtual cashier terminal 12, in the user computer 22 as shown in FIG. 44(c), a window for the cashier browser is activated. A virtual cashier terminal is displayed in the window of the cashier browser and a direction to input the transaction ID is displayed (520).

The user computer 22, indicating the transaction ID in the window of the cashier browser, notifies the user of the transaction ID (522). The user inputs to the user terminal 20 the transaction ID indicated in the window of the cashier browser of the user computer 22 (524). The user terminal 20 transmits the transaction ID inputted by the user to the synchronizing server 30 (526).

Figure 41:
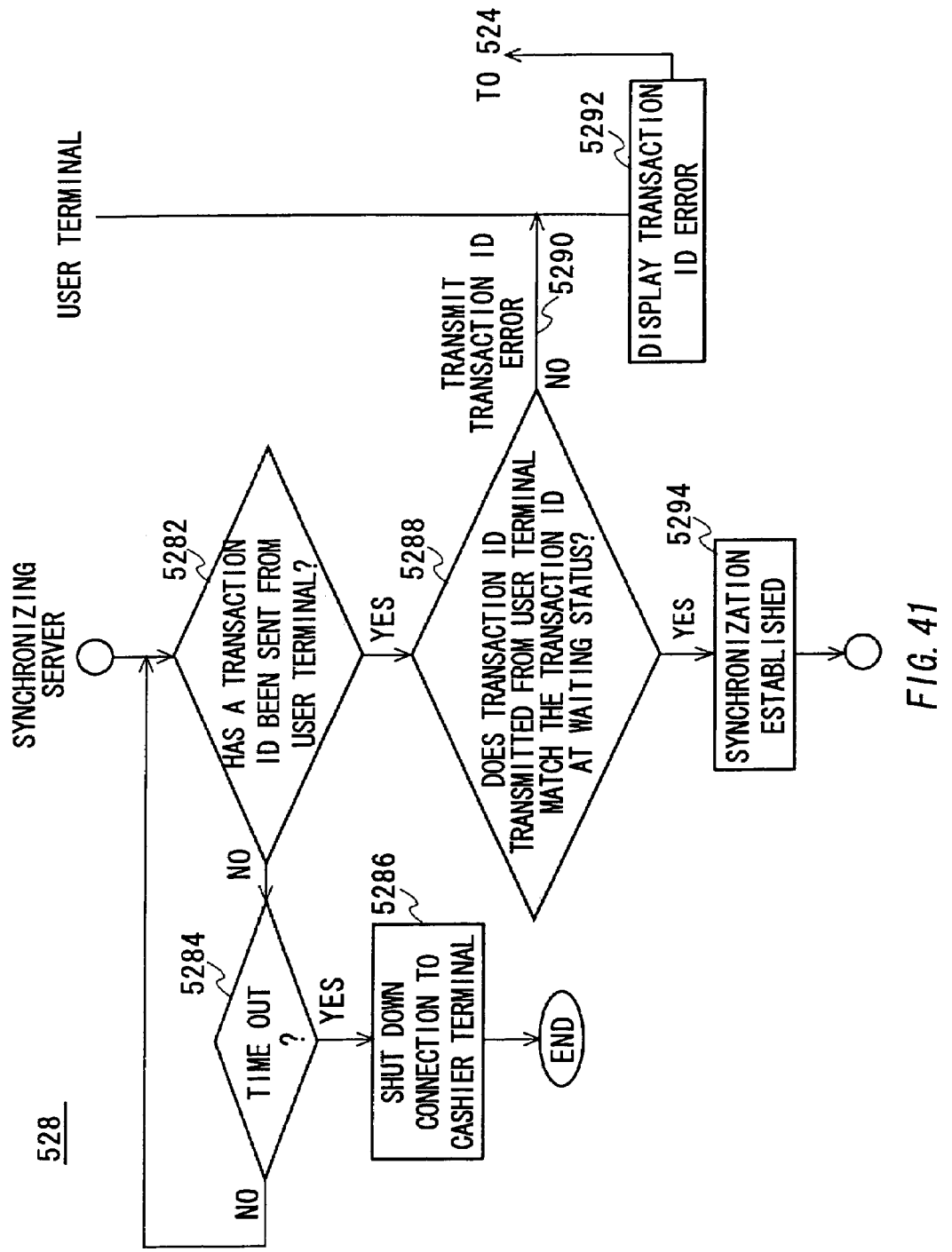
FIG. 41 is a flow chart showing a cashier number inquiry 528 processing.

The synchronizing server 30 verifies the transaction ID received from the virtual cashier terminal 12 in the processing 506 and the transaction ID received from the user terminal 20 in the processing 526. If these transaction IDs match, the synchronizing server 30 synchronizes the communication to the virtual cashier terminal 12 with the communication to the user terminal 20. FIG. 41 is a flow chart showing a cashier number inquiry 528 processing. The cashier number inquiry 528 processing is the same as the transaction ID inquiry 116 in the first embodiment shown in FIG. 7, therefore it will not be described here.

When the transaction ID inquiry is completed, the synchronizing server 30 transmits the synchronizing signal to the virtual cashier terminal 12 (530). The virtual cashier terminal 12, receiving the synchronizing signal from the synchronizing server 30, transmits to the user computer 22 the synchronizing signal (532). The user computer 22, receiving the synchronizing signal from the virtual cashier terminal 12, lights a synchronization indicator displayed in the virtual cashier terminal indicated in the cashier browser (534). Thus, the user may confirm the synchronizing status with the virtual cashier terminal 12.

Figure 42:
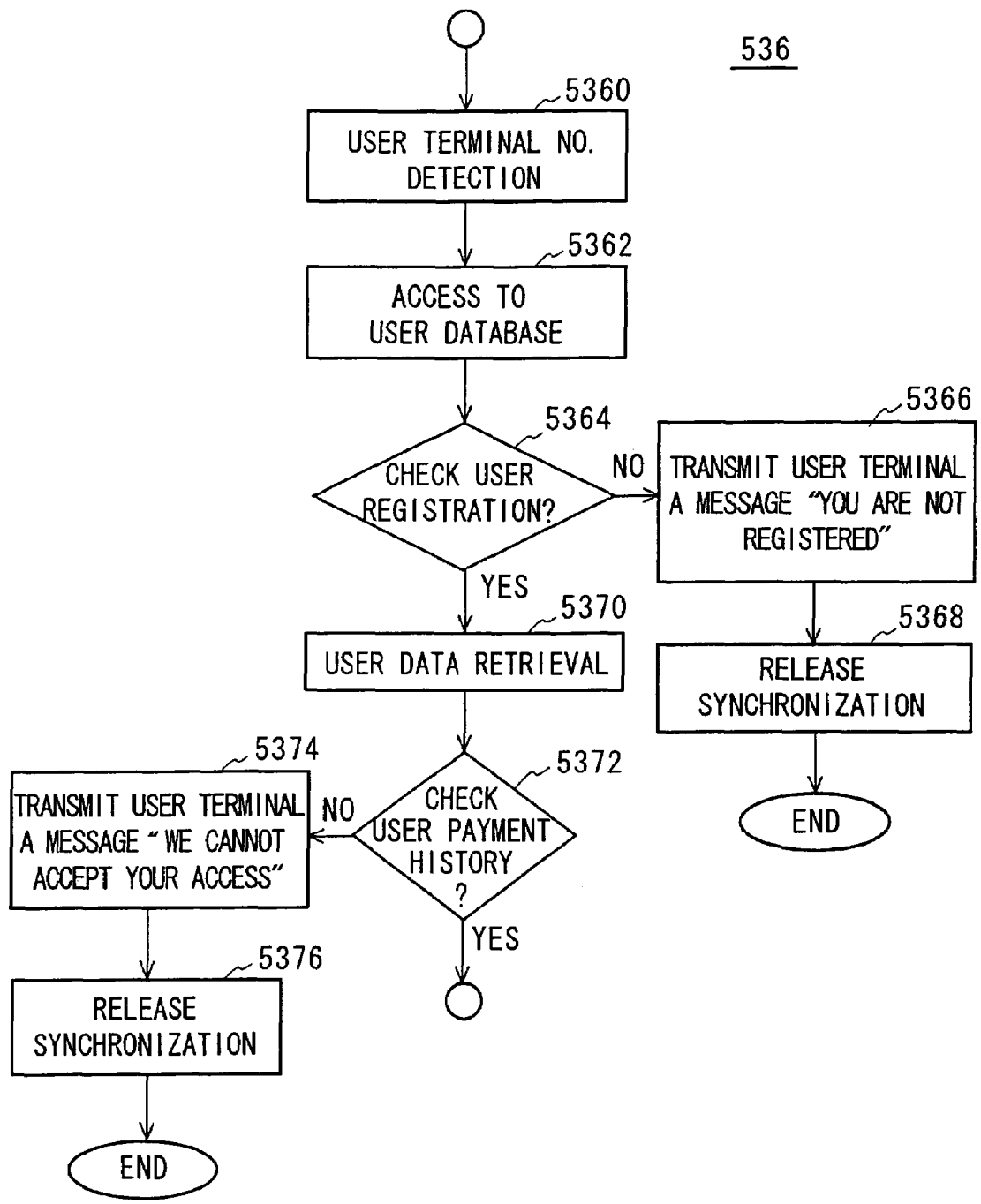
FIG. 42 is a flow chart showing a user information inquiry 536 processing.
Figure 43:
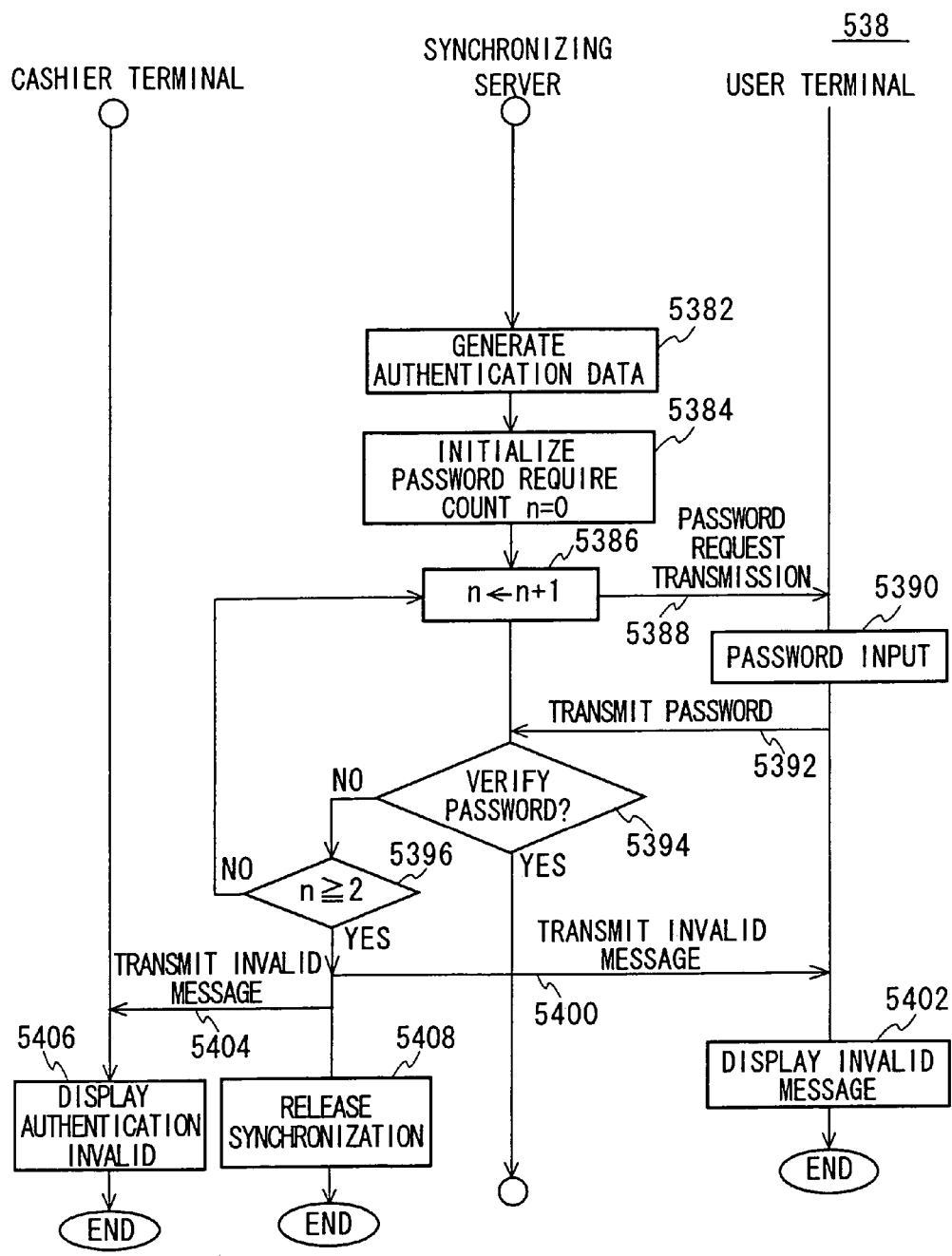
FIG. 43 is a flow chart showing a password authentication 538 processing.

The synchronizing server 30, after the transaction ID inquiry 528 processing, performs the user information inquiry 536 processing and the password authentication 538 processing. The user information inquiry 536 processing shown in FIG. 42 is the same as the user information inquiry 128 processing of the first embodiment shown in FIG. 8, therefore it will not be described here. The password authentication 538 processing shown in FIG. 43 is the same as the password authentication 210 processing of the first embodiment shown in FIG. 9, except including no visual authentication, therefore it will not be described here.

After the password authentication 538 processing, the synchronizing server 30 performs available limit inquiry 540 processing and the settlement 548 processing; and the user terminal 20 performs final purchase confirmation 544 processing. The processing is the same as the first embodiment, therefore it will not be described here.

The synchronizing server 30, after the settlement processing 548, transmits the settlement completion notification to the virtual cashier terminal 12 (550) and transmits a receipt to the user terminal 20. The virtual cashier terminal 12, receiving the settlement completion notification from the synchronizing server 30, transmits to the user computer 22 the settlement completion notification (552). The user computer 22 indicates notification of the settlement completion on the displayed information. The user, looking at the notification, may know when the settlement is completed with the virtual cashier terminal 12.

In the electronic settlement system of the present embodiment, the user, using a computer, accesses an on-line shopping server on the Internet, selects purchase items, and settles the merchandise transaction using a user terminal such as a cellular phone.

Using on-line shopping on the Internet, sending a credit card number as data via the Internet may cause a security problem. Conventionally, using a hyper enciphering method, the credit card number is sent in the enciphered code. Applying the electronic settlement system of the present embodiment, the selection of the purchasing item is performed on the Internet, but the settlement of merchandise value is performed safely using the cellular phone and so on. The electronic settlement system of the present embodiment does not need to directly send the personal information such as user identifying information or credit card information between the user terminal paying the settlement and the cashier terminal billing the settlement. Therefore, the user need not worry about personal information being leaked to the retailer, and privacy is protected.

SEVENTH EMBODIMENT

Figure 45:
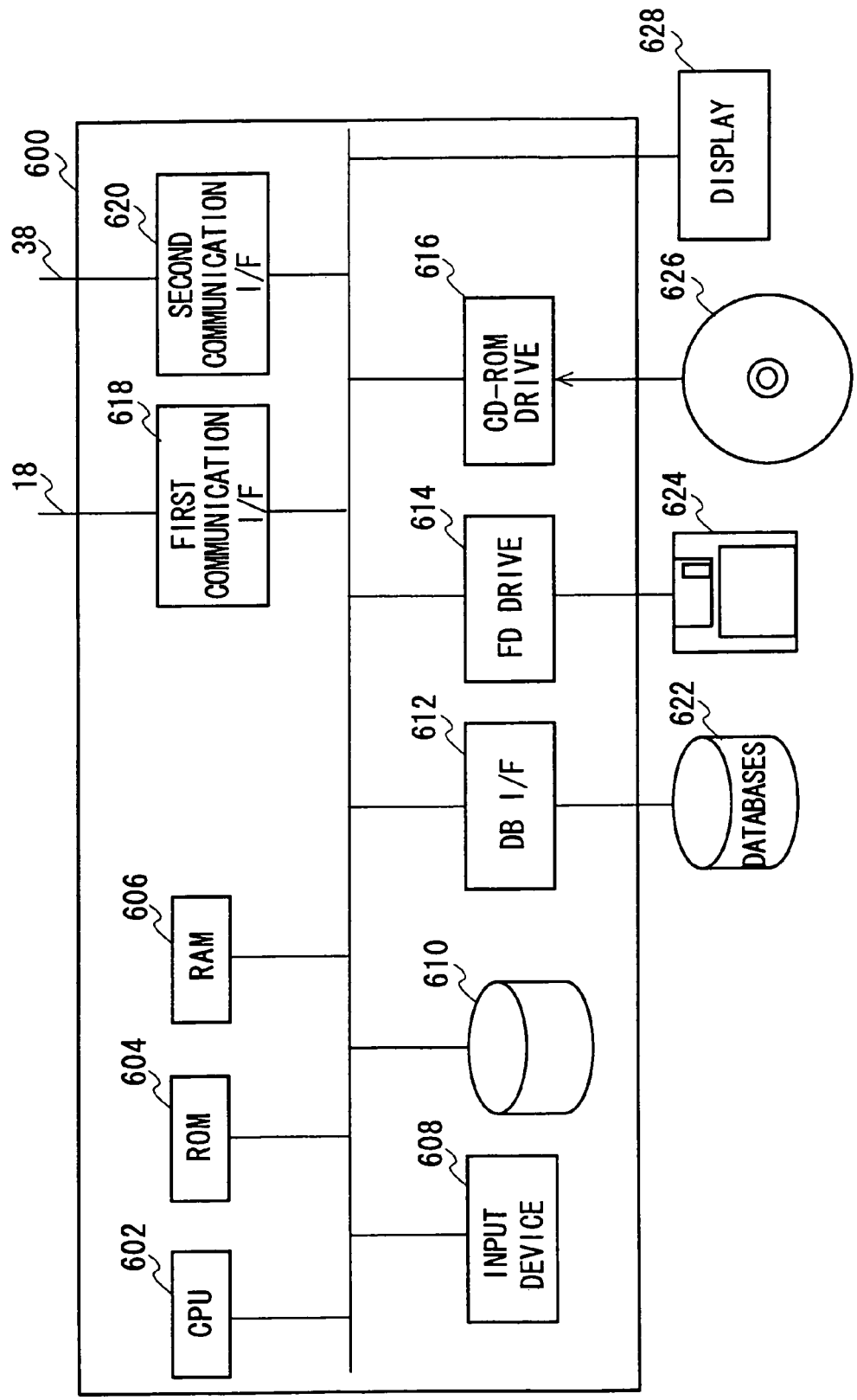
FIG. 45 shows a block diagram showing hardware architecture of a general-purpose computer 600.

The synchronizing server 30, as an example of the settlement apparatus in the electronic settlement system according to the first, second, third, fourth, fifth, and sixth embodiments, may be realized using a general-purpose computer. FIG. 45 is a block diagram showing a hardware configuration of a general-purpose computer 600. As shown in FIG. 45, a CPU 602 of the computer 600 is operated based on the programs stored in a ROM 604 and a RAM 606. Using an input device 608, an administrator of the synchronizing server 30 may input data or commands. Programs and setting information to operate the CPU 602 are stored in a hard disk drive 610 as an example of a storing device.

A floppy disk drive 614 reads data or programs from a floppy disk 624 and provides them to the CPU 602. A CD-ROM drive 616 reads data or programs from a CD-ROM 626 and provides them to the CPU 602. A first communication interface 618 connects to a communication line 18 and communicates data. A second communication interface 620 connects to a communication line 38 and communicates data. A database interface 612 connects to databases 622 and communicates data with the database. Furthermore, the synchronizing server 30 has an interface to connect with a display 628 so that the administrator may watch an operational status of the synchronizing server 30, and check the setting information using the display 628.

Figure 46:
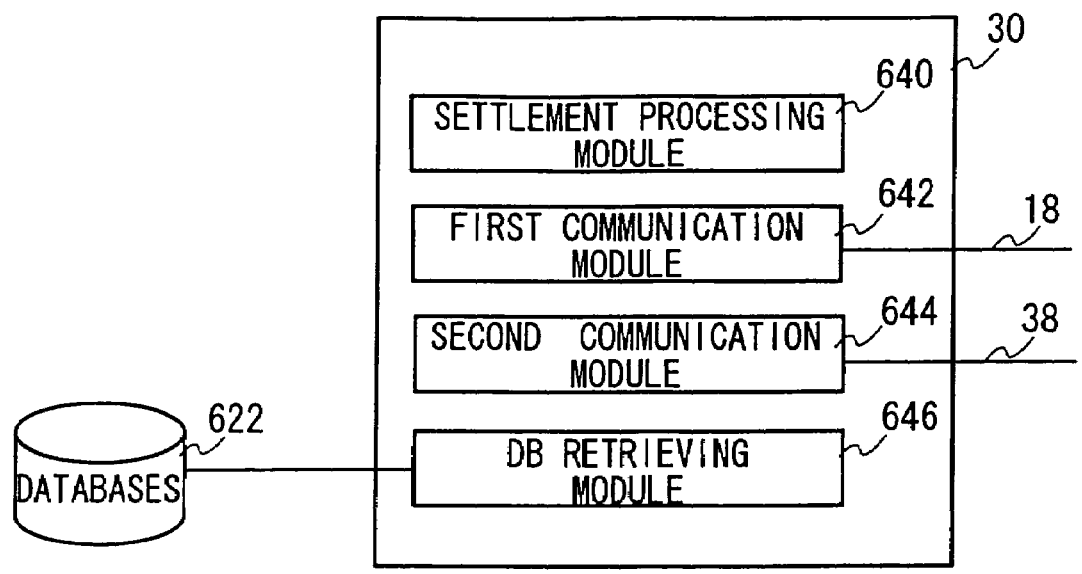
FIG. 46 is a block diagram showing a functional architecture of software executed on a CPU 602.

FIG. 46 is a block diagram showing a functional configuration of the software operating the CPU 602 shown in FIG. 45. This software is provided to users stored in a recording media such as a floppy disk 624 or a CD-ROM 626 and soon. The software stored in the recording media may be compressed or non-compressed. The software may be installed from the recording media to the hard disk drive 610, read out to the RAM 606, and executed by the CPU 602.

The software to be provided stored in the recording media, that is the software installed in the hard disk drive 610, for its functional configuration, has a settlement processing module 640, a first communication module 642, a second communication module 644, and a database retrieving module 646.

The processing, performed by the CPU 602 operating the computer 600, of the settlement processing module 640, the first communication module 642, the second communication module 644, and the database retrieve module 646, is the same as each of the settlement processing unit 80, the first communication unit 82, the second communication unit 84, and the database retrieving unit 86 in the synchronizing server 30 according to the first, second, third, fourth, fifth, and sixth embodiments; therefore these processing's will not be described here.

At least one of the floppy disk 624 and CD-ROM 626 shown in FIG. 45, as an example of the recording media, may store a part of, or all of, the function for the operation of the synchronizing server 30 as an example of the settlement apparatus applying the entire embodiment described in the present application. Furthermore, the synchronizing server 30 may replace a part of the operation of the cashier terminal 10 and the synchronizing server 30 may operate a part of the operation of the cashier terminal 10 of the above described embodiments. In such a case, the part of the operation of the cashier terminal 10 described in the above embodiments may be stored in the floppy disk 624 or the CD-ROM 626.

These programs may be read from the recording media to RAM directly and executed. These programs may be installed to the hard disk drive once, then read to RAM and executed. Furthermore, these above described programs may be stored in a single recording medium or a plurality of recording media. In other cases, these programs may be stored in an encoded form.

Besides a floppy disk and a CD-ROM, the following media may be used for a recording media; an optical recording media such as a DVD, a magnetic recording media such as an MD, a magnetic optical recording media such as a PD, a tape device, a semiconductor memory such as an IC card or a miniature card, and so on. In other cases, using a storage device such as a hard disk or a RAM provided in a server system for a recording media, connected to a private communication network or the Internet, the programs may be provided to the synchronizing server 30 via a communication network. Such recording media are used only for manufacturing the synchronizing server 30, so that it is obvious that manufacturing and distribution of such recording media as vocation constructs infringement of a patent based on the present application.

As described above, applying the electronic settlement system of the first embodiment, a clerk of the retailer authenticates the user with facial portrait data. In a case of an expensive settlement or the clerk is not able to ensure the user authentication, the clerk further requests the user to input a password, so that accuracy of authentication may be improved corresponding to the importance of a situation. The user, using a portable apparatus having a wireless communication function such as a cellular phone or a portable terminal, may settle a transaction simply, conveniently, and safely.

According to the electronic settlement system of the second embodiment, the user, who reads a magazine, a mail order catalog and so on, may order items and execute settlement electronically. The user also may confirm if the connected site is the correct mail order site he or she wanted by the link information displayed on his or her portable terminal before confirming his or her order. The retailer of the mail order, by appointing the authentication method, may settle after the user is authenticated by a password and so on.

According to the electronic settlement system of the third embodiment, the electronic settlement is performed after the user is authenticated with his or her voice. Thus, high accuracy authentication is ensured.

According to the electronic settlement system of the fourth embodiment, authentication of the user is performed by letting the user transmit identifying information image data of the user as an individual such as a facial portrait, an iris, a retina, or a fingerprint. Security of the electronic settlement is ensured. Applying image authentication, which differs from the voice authentication, using a data packet of communication facility attached to the cellular phone, a cellular phone does not need to be connected to the voice carrier, so that the authentication and the settlement may be performed in succession.

Applying the electronic settlement system of the fifth embodiment, the purchase and settlement using the vending machine may be performed simply and conveniently via networks.

Applying the electronic settlement system of the sixth embodiment, the user, using a computer, accesses the on-line shopping server in the Internet and selects a purchasing item. The user may settle the value of the purchased item using the user terminal such as a cellular phone. The selection of the purchasing item is performed on the Internet. The settlement of the value of purchase may be performed safely, using a cellular phone and soon. The user does not need to worry about personal information being leaked to the mail order retailer, so that privacy is protected.

The electronic settlement system of the present invention has the following advantages for retailers, mail order retailers, or on-line shopping retailers using the Internet. Based on the uniqueness of the calling telephone number of a cellular phone, a secure user authentication may be ensured. On the other hand, because the system has a selection of authentication methods, the accuracy of the authentication may be easily varied corresponding to a settlement amount or a situation of the settlement. In a case of a small amount settlement such as a purchase at a vending machine, omitting the user authentication, the system may authenticate the user based on the calling telephone number of the cellular phone and perform the settlement. In a case of a larger amount settlement such as a purchase at a jewelry store, the clerk may authenticate the user using facial portrait data, if the clerk is not sure enough, combining further authentication and so on, the accuracy of the authentication may be improved.

The electronic settlement system of the present invention has the following advantage for users. Carrying a cellular phone, which is a communication terminal with a very good portability, a transaction may be electronically settled anytime and anywhere; therefore the user does not need to carry cash, a credit card, a bank card, an IC money card, and so on. Furthermore, the user, using a data packet communication facility of the cellular phone, may check if the payment is withdrawn from his or her account, his or her available amount, his or her purchase history, and so on.

The electronic settlement system of the present invention has the following advantage for a credit card company. Applying the authentication method using a cellular phone may discourage a false use of stolen cards. Because a credit settlement may be performed electronically using a cellular phone, issuing a credit card or management of a credit card is no longer needed; costs may be reduced. Furthermore, using a combination authentication method, even in a case that a person responsible in the credit card company and so on moved data falsely, settlement accounts of users may be protected from false use.

Although the present invention has been described by way of exemplary embodiments, it should be understood that many changes and substitutions may be made by those skilled in the art without departing from the spirit and the scope of the present invention which is defined only by the appended claims.

INDUSTRIAL APPLICABILITY

It is obvious from the above description, according to the present invention, a settlement of a commercial transaction may be performed safely and conveniently via a communication network.

What is claimed is:

1. An authentication system for authenticating through a communication network, comprising:
    a first terminal connecting to the communication network and having an information indicting unit;
    a second terminal having a unique ID information and an input unit, said second terminal being located at a same site as said first terminal and connectable to said first terminal through the communication network, said second terminal being at least one of a cellular phone and a PDA; and
    an authentication apparatus communicating with said first and second terminals through the communication network, said authentication apparatus storing in advance said unique ID information of said second terminal, said authentication apparatus setting up an authentication ID information to be indicated on said indicating unit of said first terminal, said authentication apparatus receiving from said second terminal said unique ID information of said second terminal together with said authentication ID information indicated on said information indicating unit of said first terminal and inputted through said input unit of said second terminal at the same site as said first terminal, said authentication apparatus performing the authentication by synchronizing a communication with said first terminal and said second terminal when said unique ID information received from said second terminal is identical with that stored in said authentication apparatus in advance and when said authentication ID information received from said second terminal is identical with that set up by said authentication apparatus and sent to said first terminal,
    wherein said first and said second terminals send and receive messages therebetween via the authentication apparatus during synchronizing.

2. An authentication system according to claim 1, wherein said first terminal connects to said authentication apparatus via at least one of a commercial telephone line and a private line, and said second terminal connects to said authentication apparatus via a radiotelephone communication.

3. An authentication system according to claim 1, wherein said first terminal farther comprises a short range communication transmitting unit and said second terminal comprises a short range communication receiving unit for receiving the authentication ID information transmitted from said short range communication transmitting unit of said first terminal.

4. An authentication system according to claim 1, wherein said authentication apparatus presents said authentication ID information on the communication network.

5. An authentication system according to claim 1, wherein said authentication ID information relates to an order in the authentication.

6. An authentication system according to claim 1, wherein said input unit of said second terminal inputs said unique ID information thereof into said authentication apparatus and said authentication apparatus stores said unique ID information that is inputted by said input unit and said authentication ID information that is set up by said authentication apparatus in association with each other.

7. An authentication system according to claim 1, wherein said information indicating unit of said first terminal comprises at least one of a display and a speaker.

8. An authentication system according to claim 1, wherein said first terminal is a terminal for a plurality of unspecified users and said second terminal is a unique terminal for the user.

9. An authentication system according to claim 1, wherein said second terminal is a portable phone.

10. An authentication system according to claim 1, wherein said authentication apparatus synchronizes the communication with said first terminal and said second terminal one-to-one.

11. An authentication system according to claim 1, further comprising a plurality of second terminals and wherein said authentication apparatus synchronizes the communication with said first terminal and said second terminal one-to-many.

12. An authentication system according to claim 1, wherein said authentication apparatus permits said first terminal to perform a function and said authentication apparatus permits said second terminal to perform another function during the synchronization between said first terminal and said second terminal.

13. An authentication system according to claim 1, wherein said authentication apparatus permits a one way communication from said second terminal to said first terminal during the synchronization.

14. An authentication system according to claim 1, further comprising a plurality of first and second terminals, wherein said authentication apparatus sets up a plurality of authentication ID information different from each other, based on each instant of the current time, in accordance with each instruction from each of said first terminals.

15. An authentication system according to claim 1, wherein the authentication employs financial information that is not stored on said second terminal.

16. An authentication apparatus for authenticating through a communication network with a first terminal and a second terminal having a unique ID information, said second terminal being at least one of a cellular phone and a PDA, the authentication apparatus comprising:
    a second terminal database for storing said unique ID information of said second terminal in advance;
    a processing unit for setting up an authentication ID information to be indicated on said first terminal,
    a first communication unit for connecting to the first terminal via a first communication network, said first communication unit sending the authentication ID information to be indicated on said first terminal to said first terminal; and
    a second communication unit for connecting to the second terminal via a second communication network and receiving from said second terminal said unique ID information of said second terminal together with said authentication ID information that is indicated on said first terminal and inputted through said second terminal at the same site as said first terminal,
    wherein said processing unit performs the authentication by synchronizing a communication with said first terminal and said second terminal when said unique ID information received from said second terminal is identical with that stored in said second terminal database and when said authentication ID information received from said second terminal is identical with that set up by said processing unit and sent to said first terminal, wherein said first and said second terminals send and receive messages therebetween via the authentication apparatus during synchronizing.

17. An authentication apparatus according to claim 16, wherein said first communication unit connects to the first terminal via at least one of a commercial telephone line and a private line, and said second communication unit connects to the second terminal via radiotelephone communication.

18. An authentication apparatus according to claim 17, wherein said first communication unit receives a purchase amount of the authentication from the first terminal;
said second communication unit transmits said purchase amount to the second terminal so that the second terminal confirms said purchase amount, and receives a final purchase confirmation signal;
said processing unit performs a settlement processing after said second communication unit receives the final purchase confirmation signal from the second terminal;
said first communication unit transmits a settlement completion notification, which notifies completion of the settlement processing performed by said processing unit to the first terminal; and
said second communication unit transmits to the second terminal a receipt which notifies the receiving of said purchase amount of the settlement processed by said processing unit.

19. An authentication apparatus according to claim 18, further comprising a first terminal database storing information about the first terminal, wherein said first communication unit receives from the first terminal an identifying number to identify the first terminal, and said processing unit retrieves information about the first terminal from said first terminal database and confirms a registration of the first terminal, based on the identifying number.

20. An authentication apparatus according to claim 19, wherein said second communication unit transmits to the second terminal the information about the first terminal, for the second terminal to confirm the first terminal, retrieved from said first terminal database.

21. An authentication apparatus according to claim 20, wherein said second terminal database stores information about the second terminal, including information about a user of the second terminal, wherein said second communication unit detects a calling telephone number of the second terminal, and said processing unit retrieves said information about the user of the second terminal from said second terminal database based on the calling telephone number, and said processing unit inquires about a registration status of the user, a payment history of the user, and/or an available amount of the user.

22. An authentication apparatus according to claim 21, wherein said processing unit retrieves at least a part of attribute information of the user of the second terminal from said second terminal database, and said first communication unit transmits to the first terminal at least a part of the attribute information of the user of the second terminal.

23. An authentication apparatus according to claim 22, wherein when said second communication unit receives a message which demands a purchase history of the user of the second terminal, said processing unit retrieves said purchase history of the user from said second terminal database, and said second communication unit transmits the purchase history to the second terminal.

24. An authentication apparatus according to claim 22, wherein said first communication unit transmits to the first terminal a synchronization confirmation signal which indicates establishment of synchronization when the first terminal notifies said authentication ID information to the second terminal, and when the second terminal transmits to said authentication apparatus the same authentication ID information.

25. An authentication apparatus according to claim 16, wherein said first terminal farther comprises a short range communication transmitting unit and said second terminal comprises a short range communication receiving unit for receiving the authentication ID information transmitted from said short range communication transmitting unit of said first terminal.

26. An authentication apparatus according to claim 16, wherein said authentication apparatus presents said authentication ID information on the communication network.

27. An authentication apparatus according to claim 16, wherein said authentication ID information relates to an order in the authentication.

28. An authentication apparatus according to claim 16, wherein said second terminal database stores said unique ID information that is inputted by said input unit of said second terminal and said authentication ID information that is set up, in association with each other.

29. An authentication apparatus according to claim 16, wherein said processing unit synchronizes the communication with said first terminal and said second terminal one-to-one.

30. An authentication apparatus according to claim 29, further comprising a plurality of first and second terminals, wherein said processing unit sets up a plurality of authentication ID information different from each other, based on each instant of the current time, in accordance with each instruction from each of said first terminals.

31. An authentication apparatus according to claim 16, wherein said processing unit permits said first terminal to perform a function and said authentication apparatus permits said second terminal to perform another function during the synchronization.

32. An authentication apparatus according to claim 31, wherein said processing unit permits a one way communication from said second terminal to said first terminal during the synchronization.

33. An authentication apparatus according to claim 16, wherein the authentication employs financial information that is not stored on said second terminal.

34. A method of authenticating with an authentication system including a first terminal, a second terminal, said second terminal being at least one of a cellular phone and a PDA, and an authentication apparatus communicating with said first and second terminals through a communication network, said first terminal having a indicating unit, said second terminal having a unique ID information and an input unit, and said second terminal being located at the same site as said first terminal and being connectable to said first terminal through the communication network; the method comprising:
storing said unique ID information of said second terminal in said authentication apparatus;
connecting said first terminal with said authentication apparatus through the communication network;
setting up an authentication ID information to be indicated on said first terminal in said authentication apparatus;
sending said authentication ID information to said first terminal;
indicating said authentication ID information in said indicating unit of said first terminal; inputting said authentication ID information to said input unit of said second terminal at the same site as said first terminal;

receiving from said second terminal said unique ID information of said second terminal together with said authentication ID information indicated on said information indicating unit of said first terminal; and performing the authentication by synchronizing a communication with said first and said second terminals when said unique ID information received from said second terminal is identical with that stored in said authentication apparatus and when said authentication ID information received from said second terminal is identical with that from said setting up step sent to said first terminal, wherein said first and said second terminals send and receive messages therebetween via said authentication apparatus during synchronizing.

35. A method according to claim 34, further comprising inputting said unique ID information thereof from said input unit of said second terminal into said authentication apparatus, wherein said storing said unique ID information includes storing said authentication ID information in association with said unique ID information in advance.

36. A method according to claim 34, wherein the authentication system includes a plurality of first terminals and second terminals and said setting up the authentication ID information includes setting up a plurality of authentication ID information different from each other, based on each instant of the current time, in accordance with each instruction from each of said first terminals.

37. A method according to claim 34, further comprising permitting said first terminal to perform a function and permitting said second terminal to perform another function, during the synchronization.

38. A method according to claim 34, wherein said first terminal further comprises a short range communication transmitting unit and said second terminal comprises a short range communication receiving unit for receiving the authentication ID information transmitted from said short range communication transmitting unit of said first terminal.

39. A method according to claim 34, wherein the authentication employs financial information that is not stored on said second terminal.

40. A recording medium which stores a program for a computer for an authentication system including a first terminal, a second terminal that is at least one of a cellular phone and a PDA, and an authentication apparatus communicating with said first and second terminal through a communication network, said first terminal having an indicating unit, said second terminal having a unique ID information and an input unit, and said second terminal being located at a same site as said first terminal, the recording medium comprising:

a storing module which stores said unique ID information of said second terminal in said authentication apparatus;

a connecting module which connects said first terminal with said authentication apparatus through the communication network;

a setting up module which sets up an authentication ID information to be indicated on said first terminal in said authentication apparatus;

a sending module which sends said authentication ID information to said first terminal;

an indicating module for indicating said authentication ID information in said indicating unit of said first terminal;

an inputting module which inputs said authentication ID information to said input unit of said second terminal at the same site as said first terminal;

a receiving module which receives from said second terminal said unique ID information of said second terminal together with said authentication ID information indicated on said information indicating unit of said first terminal; and a performing module which performs the authentication by synchronizing a communication with said first terminal and said second terminal when said unique ID information received from said second terminal is identical with that stored in said authentication apparatus and when said authentication ID information received from said second terminal is identical with that set up by said setting up module and sent to said first terminal, wherein said first and said second terminals send and receive messages therebetween via the authentication apparatus during synchronizing.

41. A recording medium according to claim 40, wherein said first terminal farther comprises a short range communication transmitting unit and said second terminal comprises a short range communication receiving unit for receiving the authentication ID information transmitted from said short range communication transmitting unit of said first terminal.

42. A recording medium according to claim 40, wherein the authentication employs financial information that is not stored on said second terminal.

43. A method of authenticating with an authentication apparatus for authenticating through a communication network with a first terminal and a second terminal having unique ID information and that is at least one of a cellular phone and a PDA, the method comprising:

storing said unique ID information of said second terminal in advance;

connecting to the first terminal via a first communication network;

setting up an authentication ID information to be indicated on said first terminal;

connecting to the second terminal via a second communication network;

receiving from said second terminal said unique ID information of said second terminal together with said authentication ID information indicated on said first terminal and inputted through said second terminal at the same site as said first terminal; and performing the authentication by synchronizing a communication with said first terminal and said second terminal when said unique ID information received from said second terminal is identical with that stored in advance and when said authentication ID information received from said second terminal is identical with that set up set up in said setting up step and indicated on said first terminal, wherein said first and said second terminals send and receive messages therebetween via the authentication apparatus during synchronizing.

44. A method according to claim 43, wherein said storing said unique ID information of said second terminal includes storing both said unique ID information that is inputted by said input unit of said second terminal and said authentication ID information that is set up, in association with each other.

45. A method according to claim 43, wherein said connecting to the first terminal via the first communication network includes connecting a plurality of first terminals;

said connecting to the second terminal via a second communication network includes connecting a plurality of second terminals; and said setting up an authentication ID information includes setting up a plurality of authentication ID information different from each other, based on each instant of the current time, in accordance with each instruction from each of said first terminals.

46. A method according to claim 43, wherein said performing the authentication includes permitting said first terminal to perform at least a function and permitting said second terminal to perform another function during the synchronization.

47. A method according to claim 46, wherein said performing the authentication further includes permitting a one way communication from said second terminal to said first terminal during the synchronization.

48. A method according to claim 43, wherein said first terminal comprises a short range communication transmitting unit and said second terminal further comprises a short range communication receiving unit for receiving the authentication ID information transmitted from said short range communication transmitting unit of said first terminal.

49. A method according to claim 43, wherein the authentication employs financial information that is not stored on said second terminal.

50. A recording medium which stores a program for a computer for an authentication apparatus for authenticating through a communication network with a first terminal and a second terminal having unique ID information and that is at least one of a cellular phone and a PDA, the recording medium comprising:

a storing module which stores said unique ID information of said second terminal in advance;

a setting up module which sets up an authentication ID information to be indicated on said first terminal;

a first connecting module which connects the authentication apparatus to the first terminal via a first communication network;

a second connecting module which connects the authentication apparatus to the second terminal via a second communication network;

a receiving module which receives from said second terminal said unique ID information of said second terminal together with said authentication ID information indicated on said first terminal and inputted through said second terminal at the same site as said first terminal; and a performing module which performs the authentication by synchronizing a communication with said first terminal and said second terminal when said unique ID information received from said second terminal is identical with that stored in said storing module and when said authentication ID information received from said second terminal is identical with that set up by said setting up module and sent to said first terminal, wherein said first and said second terminals send and receive messages therebetween via the authentication apparatus during synchronizing.

51. A recording medium according to claim 50, wherein said first terminal comprises a short range communication transmitting unit and said second terminal further comprises a short range communication receiving unit for receiving the authentication ID information transmitted from said short range communication transmitting unit of said first terminal.

52. A recording medium according to claim 50, wherein the authentication employs financial information that is not stored on said second terminal.

* * * * *